(12) United States Patent
Xiong

(10) Patent No.: US 12,185,425 B2
(45) Date of Patent: Dec. 31, 2024

(54) METHOD AND APPARATUS FOR REALIZING NETWORK CAPABILITY OPENING, ELECTRONIC DEVICE AND STORAGE MEDIUM

(71) Applicant: Tencent Technology (Shenzhen) Company Limited, Guangdong (CN)

(72) Inventor: Chunshan Xiong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 477 days.

(21) Appl. No.: 17/674,349

(22) Filed: Feb. 17, 2022

(65) Prior Publication Data
US 2022/0174477 A1 Jun. 2, 2022

Related U.S. Application Data

(63) Continuation of application No. PCT/CN2020/128209, filed on Nov. 11, 2020.

(30) Foreign Application Priority Data

Mar. 15, 2020 (CN) .......................... 202010179045.5

(51) Int. Cl.
*H04W 8/24* (2009.01)
*H04W 28/06* (2009.01)
(52) U.S. Cl.
CPC ........... *H04W 8/24* (2013.01); *H04W 28/065* (2013.01)
(58) Field of Classification Search
CPC ..... H04W 8/24; H04W 28/065; H04W 24/02; H04L 43/08; H04L 65/752; H04L 65/80
See application file for complete search history.

(56) References Cited

U.S. PATENT DOCUMENTS 10,362,507 B2 7/2019 Dao
11,272,399 B2 3/2022 Deng
(Continued)

FOREIGN PATENT DOCUMENTS

CN 104854841 A 8/2015
CN 106664560 A 5/2017
(Continued)

OTHER PUBLICATIONS

Extended European Search Report, dated Oct. 24, 2022, pp. 1-12, issued in European Patent Application No. 20925912.6, European Patent Office, Munich, Germany.
(Continued)

*Primary Examiner* — Wutchung Chu
(74) *Attorney, Agent, or Firm* — Crowell & Moring

(57) ABSTRACT

This disclosure provides a method and an apparatus for implementing network capability exposure, an electronic device, and a computer-readable storage medium, belonging to communication technologies. The method includes: obtaining a downlink data packet, the downlink data packet including a network information obtaining request; transmitting the downlink data packet to a target user plane node; and receiving responsive information returned by the target user plane node in response to the network information obtaining request, the responsive information including network information requested by the network information obtaining request.

17 Claims, 20 Drawing Sheets

(56) References Cited

U.S. PATENT DOCUMENTS

| | | | |
|---|---|---|---|
| 11,399,293 | B2 | 7/2022 | Dao et al. |
| 2010/0291943 | A1* | 11/2010 | Mihaly .............. H04L 67/1008 |
| | | | 455/450 |
| 2015/0124622 | A1* | 5/2015 | Kovvali ................. H04L 45/38 |
| | | | 370/236 |
| 2016/0248682 | A1* | 8/2016 | Lee ....................... H04L 67/146 |
| 2019/0261213 | A1* | 8/2016 | Palnati ............. H04W 28/0284 |
| 2016/0344635 | A1* | 11/2016 | Lee .......................... H04L 47/20 |
| 2017/0150332 | A1* | 5/2017 | Palanisamy ............. H04W 4/70 |
| 2017/0317894 | A1 | 11/2017 | Dao et al. |
| 2017/0373950 | A1* | 12/2017 | Szilagyi ............. H04L 47/2416 |
| 2018/0097657 | A1* | 4/2018 | Dao .................... H04L 41/0893 |
| 2019/0215731 | A1* | 7/2019 | Qiao ...................... H04W 24/06 |
| 2019/0223047 | A1* | 7/2019 | Gundavelli ............. H04L 45/34 |
| 2019/0230681 | A1* | 7/2019 | Han ..................... H04W 72/542 |
| 2019/0306251 | A1* | 10/2019 | Talebi Fard .......... H04W 76/10 |
| 2019/0394682 | A1* | 12/2019 | Zhu ................... H04W 36/0033 |
| 2019/0394833 | A1 | 12/2019 | Talebi Fard et al. |
| 2021/0007172 | A1 | 1/2021 | Lu et al. |
| 2022/0407743 | A1* | 12/2022 | Takano ............... H04L 12/5601 |
| 2023/0354447 | A1* | 11/2023 | Talebi Fard .......... H04W 76/12 |

FOREIGN PATENT DOCUMENTS

| | | |
|---|---|---|
| CN | 109314710 A | 2/2019 |
| CN | 109417534 A | 3/2019 |
| CN | 109429348 A | 3/2019 |
| CN | 110383877 A | 10/2019 |
| CN | 110418395 A | 11/2019 |
| CN | 110769466 A | 2/2020 |
| CN | 111356157 A | 6/2020 |
| EP | 3 065 374 A1 | 9/2016 |
| WO | WO 2018/178241 A1 | 10/2018 |
| WO | WO 2021/184783 A1 | 9/2021 |

OTHER PUBLICATIONS

Chinese Office Action with English Translation, dated Jun. 29, 2024, pp. 1-24, issued in Chinese Patent Application No. 202010179045.5, State Intellectual Property Office, Beijing, China.

Huawei, HiSilicon, et al, Local NEF Selection and Reselection for Network Information Provisioning with low latency, Jan. 13-17, 2020, pp. 1-2, SA WG2 Temporary Document, S2-2000654, SA W62 Meeting #136AH, Incheon, South Korea.

Anonymous, 3rd Generation Partnership Project; Technical Specification Group Services and System Aspects; Procedures for the 5G System (SGS); Stage 2 (Release 16), Dec. 2019, pp. 1-558, 3GPP TS 23.502 V163.0, France.

Anonymous, 3rd Generation Partnership Project; Technical Specification Group Services and System Aspects; Study on enhancement of support for Edge Computing in 5G Core network (5GC) (Release 17), Jun. 2020, pp. 1-184, 3GPP TR 23.748 V0.4.0, France.

International Search Report and Written Opinion for priority application No. PCT/CN2020/128209 dated Feb. 5, 2021, 10p, in Chinese language.

English language translation of the International Search Report for priority application No. PCT/CN2020/128209 dated Feb. 5, 2021, 2p.

LG Electronics et al., "Correction of UE 5GSM Core-Network Capability," 3GPP TSG-SA WG2 #132 S2-1903490, Apr. 8-12, 2019, 17p, China.

Concise Explanation of Relevance for Written Opinion for PCT/CN2020/128209.

Search Report & Written Opinion for corresponding Chinese application No. 202010179045.5 dated Feb. 3, 2024, 15p, in Chinese language.

Huawei et al., "Solution for the KI#3: Network Information Provisioning to EAS with low latency", 3GPP TSG-WG SA2 Meeting #136AH, S2-2000361, dated Jan. 17, 2020, 5p, KR.

* cited by examiner

METHOD AND APPARATUS FOR REALIZING NETWORK CAPABILITY OPENING, ELECTRONIC DEVICE AND STORAGE MEDIUM

RELATED APPLICATION

This application is a continuation application of International Patent Application No. PCT/CN2020/128209, filed Nov. 11, 2020 and entitled "METHOD AND APPARATUS FOR REALIZING NETWORK CAPABILITY OPENING, ELECTRONIC DEVICE AND STORAGE MEDIUM," which claims priority to Chinese Patent Application No. 202010179045.5 filed on Mar. 15, 2020, both which are incorporated herein by reference in their entireties.

TECHNICAL FIELD

This disclosure relates to communication technologies, and relates to a method and an apparatus for implementing network capability exposure, an electronic device, and a computer-readable storage medium.

BACKGROUND

Network capability exposure is implemented based on a control plane in the related art. However, the network capability exposure based on a control plane is not applicable to network capability exposure with real-time change and low latency.

How to implement the support for network capability exposure with real-time change and low latency is a problem that urgently needs to be resolved at present.

Therefore, a novel method and apparatus for implementing network capability exposure, a novel electronic device, and a novel computer-readable storage medium are considered.

SUMMARY

Embodiments of this disclosure provide a method and an apparatus for implementing network capability exposure, an electronic device, and a computer-readable storage medium. Network capability exposure is implemented through a user plane, so that network capability exposure with real-time change and low latency can be supported.

Embodiments of this disclosure provide a method for implementing network capability exposure. The method includes: obtaining a downlink data packet, the downlink data packet including a network information obtaining request; transmitting the downlink data packet to a target user plane node; and receiving responsive information returned by the target user plane node in response to the network information obtaining request, the responsive information including network information requested by the network information obtaining request.

Embodiments of this disclosure provide a method for implementing network capability exposure. The method includes: receiving a downlink data packet transmitted by an application server, the downlink data packet including a network information obtaining request; generating responsive information in response to the network information obtaining request, the responsive information including network information requested by the network information obtaining request; and transmitting the responsive information to the application server.

Embodiments of this disclosure provide an apparatus for implementing network capability exposure. The apparatus includes: a downlink data obtaining unit, configured to obtain a downlink data packet, the downlink data packet including a network information obtaining request; a downlink data transmission unit, configured to transmit the downlink data packet to a target user plane node; and a responsive information receiving unit, configured to receive responsive information returned by the target user plane node in response to the network information obtaining request, the responsive information including network information requested by the network information obtaining request.

Embodiments of this disclosure provide an apparatus for implementing network capability exposure. The apparatus includes: a downlink data receiving unit, configured to receive a downlink data packet transmitted by an application server, the downlink data packet including a network information obtaining request; a responsive information generation unit, configured to generate responsive information in response to the network information obtaining request, the responsive information including network information requested by the network information obtaining request; and a responsive information transmission unit, configured to transmit the responsive information to the application server.

The embodiments of this disclosure provide a computer-readable storage medium, storing a computer program, the computer program being executed by a processor to implement the method for implementing network capability exposure in the foregoing embodiments.

The embodiments of this disclosure provide an electronic device, including: one or more processors; and a storage apparatus, configured to store one or more programs, the one or more programs, when executed by the one or more processors, causing the one or more processors to implement the method for implementing network capability exposure in the foregoing embodiments.

In the technical solutions provided in some embodiments of this disclosure, a user plane node obtains network information. In one aspect, with the presence of network information, only a small part of data in a user plane is added. Therefore, the entire system is subject to very small influence. In another aspect, data transmission in a user plane has very short latency. Therefore, network capability exposure with real-time change and low latency can be supported.

DESCRIPTION OF EMBODIMENTS

The block diagrams shown in the accompanying drawings are merely functional entities and do not necessarily correspond to physically independent entities. That is, these functional entities are implemented in a software form, these functional entities are implemented in one or more hardware modules or integrated circuits, or these functional entities are implemented in different networks and/or processor devices and/or microcontroller devices.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

Particularly, according to an embodiment of this disclosure, the processes described in the following by referring to the flowcharts may be implemented as computer software programs. For example, the embodiments of this disclosure include a computer program product, including a computer program carried on a computer-readable storage medium. The computer program includes program code for performing the method shown in the flowchart.

The computer-readable medium shown in the embodiments of this disclosure may be a computer-readable signal medium, a computer-readable storage medium, or any combination thereof.

Embodiments of this disclosure further provide a computer-readable storage medium. The computer-readable storage medium may be included in the electronic device described in the foregoing embodiments, or may exist alone and is not disposed in the electronic device. The computer-readable storage medium carries one or more programs, the one or more programs, when executed by the electronic device, causing the electronic device to implement the method described in the following embodiments. For example, the electronic device may implement steps shown in FIG. 6 to FIG. 9 and FIG. 17 to FIG. 22.

Figure 1:
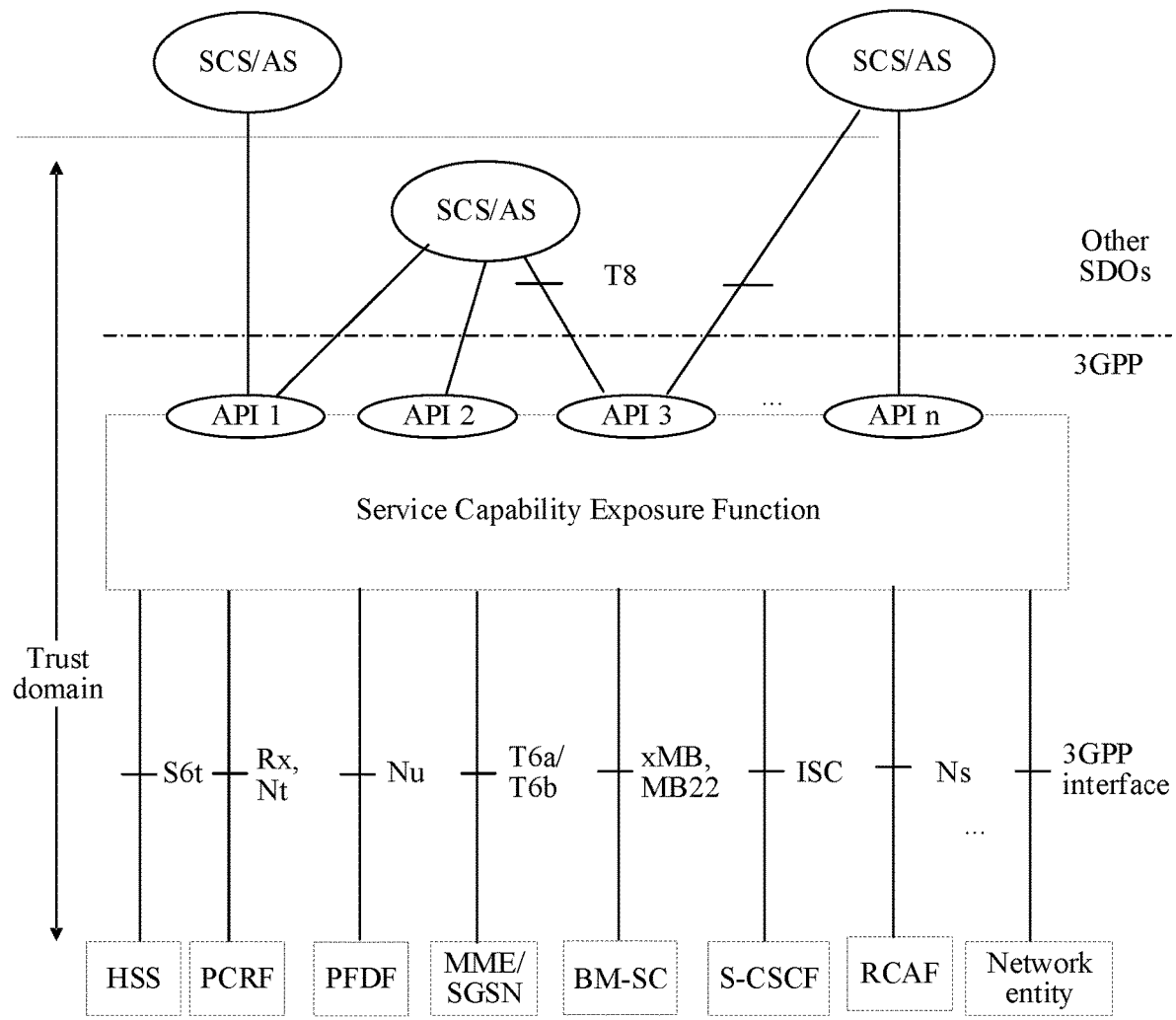
FIG. 1 is a schematic architectural diagram of network capability exposure defined in 4G in the related art.

FIG. 1 is a schematic architectural diagram of network capability exposure defined in the $4^{th}$ generation mobile communication technology (4G).

A 4G network capability exposure architecture shown in FIG. 1 is defined in architecture enhancements to facilitate communications with packet data networks and applications in 3rd Generation Partnership Project (3GPP) Protocol TS 23.682 defined in Machine to Machine (M2M) (a main manner in Internet of Things applications) in 4G.

FIG. 1 shows an architecture for service capability exposure in 3GPP, so that a 3GPP network can use 3GPP network interfaces to securely expose services and capabilities of the architecture to a Service Capability Server/Application Server (SCS/AS) of an external third-party service provider of a hosting application.

A network capability exposure architecture and interface in a roaming case are further defined in 3GPP Protocol TS 23.682.

Based on the network capability exposure architecture shown in FIG. 1, a lot of network capability exposure supporting M2M communication, for example, a device trigger, group message delivery, monitoring, and high latency communication (HLC), is defined in 3GPP Protocol TS 23.682, and nearly exists in all M2M functions and processes defined in 3GPP Protocol TS 23.682.

SDO in FIG. 1 stands for Service Data Object. API stands for Application Program Interface. It is assumed that there are n APIs, n being a positive integer greater than or equal to 1. SCEF stands for Service Capability Exposure Function. TRUST DOMAIN is marked in the figure. HSS stands for Home Subscriber Server. PCRF stands for Policy and Charging Rules Function. PFDF stands for Packet Flow Description Function. MME stands for Mobility Management Entity. SGSN stands for Serving General Packet Radio Service (GPRS) Support Node. BM-SC represents a node for controlling a Multimedia Broadcast/Multicast Service (MBMS) session. S-CSCF stands for Service-Call Session Control Function. RCAF stands for Radio Access Network (RAN) Congestion Awareness Function. Network Entity is marked in the figure.

In FIG. 1, T6a refers to a reference point used between an SCEF and a serving MME. T6b refers to a reference point used between the SCEF and an SGSN. T8 refers to a reference point used between the SCEF and the SCS/AS. S6t refers to a reference point used between the SCEF and an HSS. Rx refers to a reference point used between the SCEF and a PCRF. For the function of the Rx reference point, reference may be made to the specification TS 23.203. Ns refers to a reference point used between the SCEF and an RCAF. Nt refers to a reference point used by the SCEF and the PCRF. For the function of the Nt reference point, reference may be made to 3GPP Protocol TS 23.203. Nu is a reference point used by the SCEF to interact with the PFDF.

Figure 2:
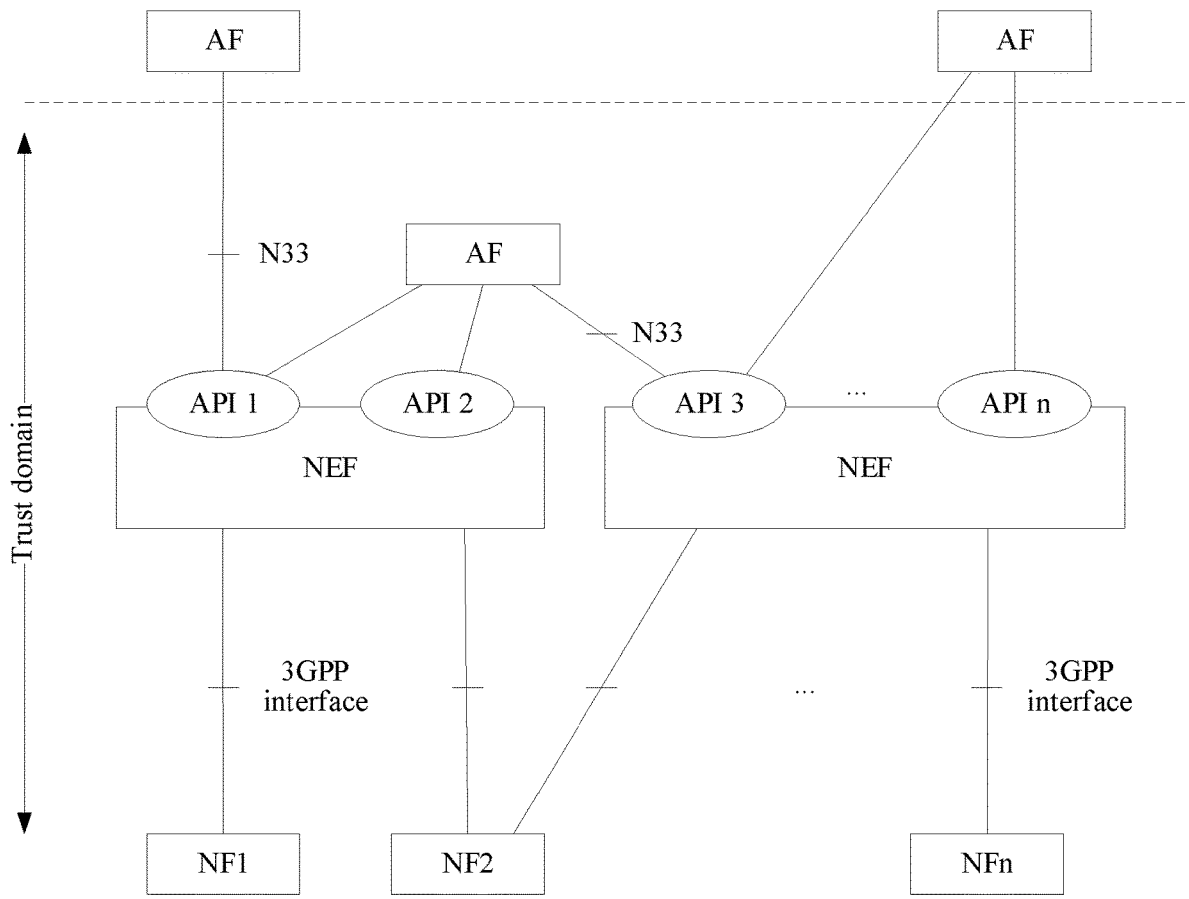
FIG. 2 is a schematic architectural diagram of network capability exposure in 5G in the related art.

FIG. 2 is a schematic architectural diagram of network capability exposure in 5G.

A capability exposure architecture (a non-roaming architecture for a network exposure function in reference point representation) shown in FIG. 2 is defined in 3GPP Protocol TS 23.501. A 5G network capability exposure architecture is evolved from 4G.

As shown in FIG. 2, a network exposure function (NEF) exposes network capabilities to an Application Function (AF) through an N33 interface. Specific exposed network capability is scattered in various specifications. The descriptions of all functions and use cases of network capability exposure are not collected in one specification.

However, the N33 interface is a service-based interface defined based on 5G. Some fundamental network capability exposure is given in external exposure of network capability of 3GPP Protocol TS 23.501, and use cases and procedures of some fundamental network capability exposure are given in network exposure of 3GPP Protocol TS 23.502. NF in FIG. 2 stands for Network Function.

Figure 3:
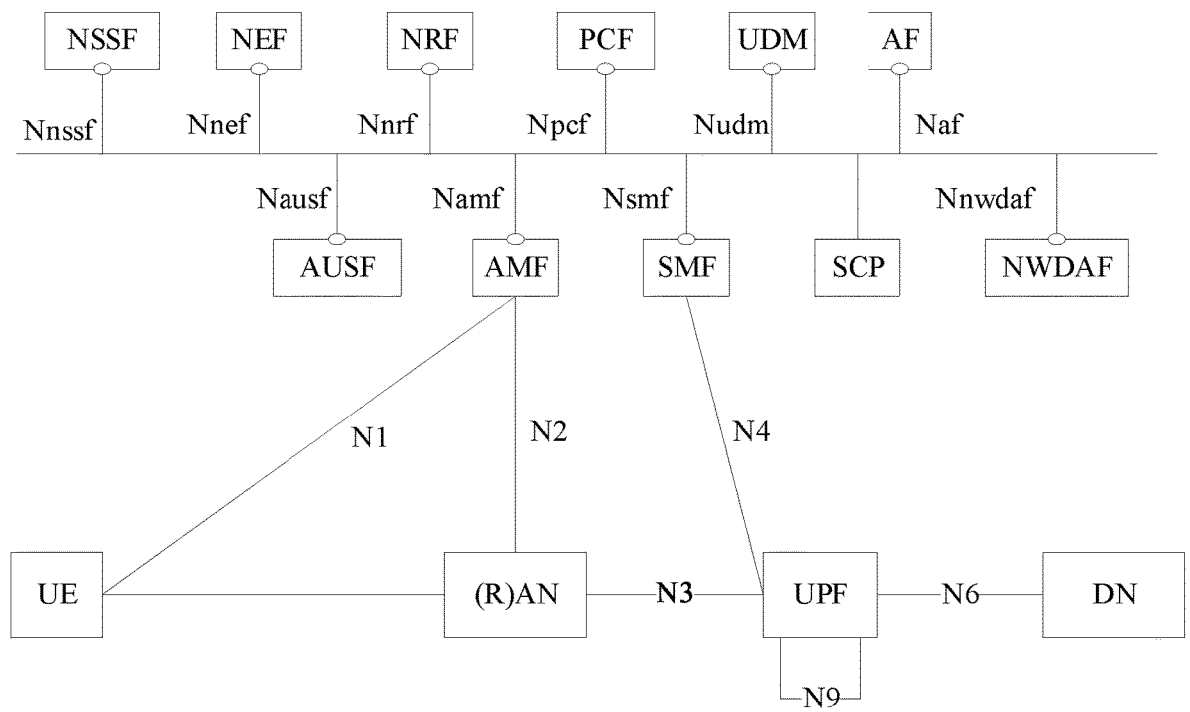
FIG. 3 is a schematic diagram of a service-based architecture in the related art.

FIG. 3 is a schematic diagram of a service-based architecture.

An architecture of a service-based interface is introduced into a 5G architecture. As shown in FIG. 3, compared with a 4G architecture, the benefit of a service-based architecture (SBA) is that one network function entity only focuses on a service provided by the network function entity. The service may be used by any other NF entity, so that the service can be atomized, thereby improving the scalability of a 5G system.

An interaction process of a service-based NF is described in detail in 3GPP Protocol TS 23.501 and 3GPP Protocol TS 23.502.

NWDAF stands for Network Data Analytics Function. An NWDAF can retrieve data of some users and networks from various NFs and Operation Administration and Maintenances (OAMs) (by using technologies such as big data, machine learning, and artificial intelligence), and obtains some specific features of the networks through analysis, for example, some features defined in 3GPP Protocol TS 23.288: slice load level information; observed service experience information; NF load information; network performance information; user equipment (UE, referred to as a terminal hereinafter) mobility information; UE communication information; expected UE behavioral parameters; UE abnormal behavior information; user data congestion information; and Quality of Service (QoS) sustainability, ten pieces of network information in total.

The NWDAF may expose the foregoing features obtained through analysis to the AF or any other NF (for example, an Access and Mobility Management Function (AMF), or a Session Management Function (SMF)). Signaling interaction and an exposure procedure of network data analysis of the NWDAF are standardized in 3GPP Protocol TS 23.288.

NSSF in FIG. 3 stands for Network Slice Selection Function. Nnssf refers to an Nnssf message transmitted to the NSSF. Nnef refers to an Nnef message transmitted to the NEF. NRF stands for Network Repository Function. Nnrf refers to an Nnrf message transmitted to the NRF. PCF stands for Policy Control Function. Npcf refers to an Npcf message transmitted to the PCF. UDM stands for Unified Data Management. Nudm refers to a Nudm message transmitted to the UDM. Naf refers to a Naf message transmitted to the AF. Namf refers to a Namf message transmitted to the AMF. Nsmf refers to a Nsmf message transmitted to the SMF. Nnwdaf refers to an Nnwdaf message transmitted to the NWDAF. AUSF stands for Authentication Server Function. Nausf refers to a Nausf message transmitted to the AUSF. SCP stands for Service Communication Proxy. UPF stands for User Plane Function. DN stands for Data Network. The UE and the AMF interact through an N1 interface. The AMF and the RAN interact through an N2 interface. The SMF and the UPF interact through an N4 interface. The RAN and the UPF interact through an N3 interface. The UPF and the DN interact through an N6 interface. UPFs interact through an N9 interface.

Figure 4:
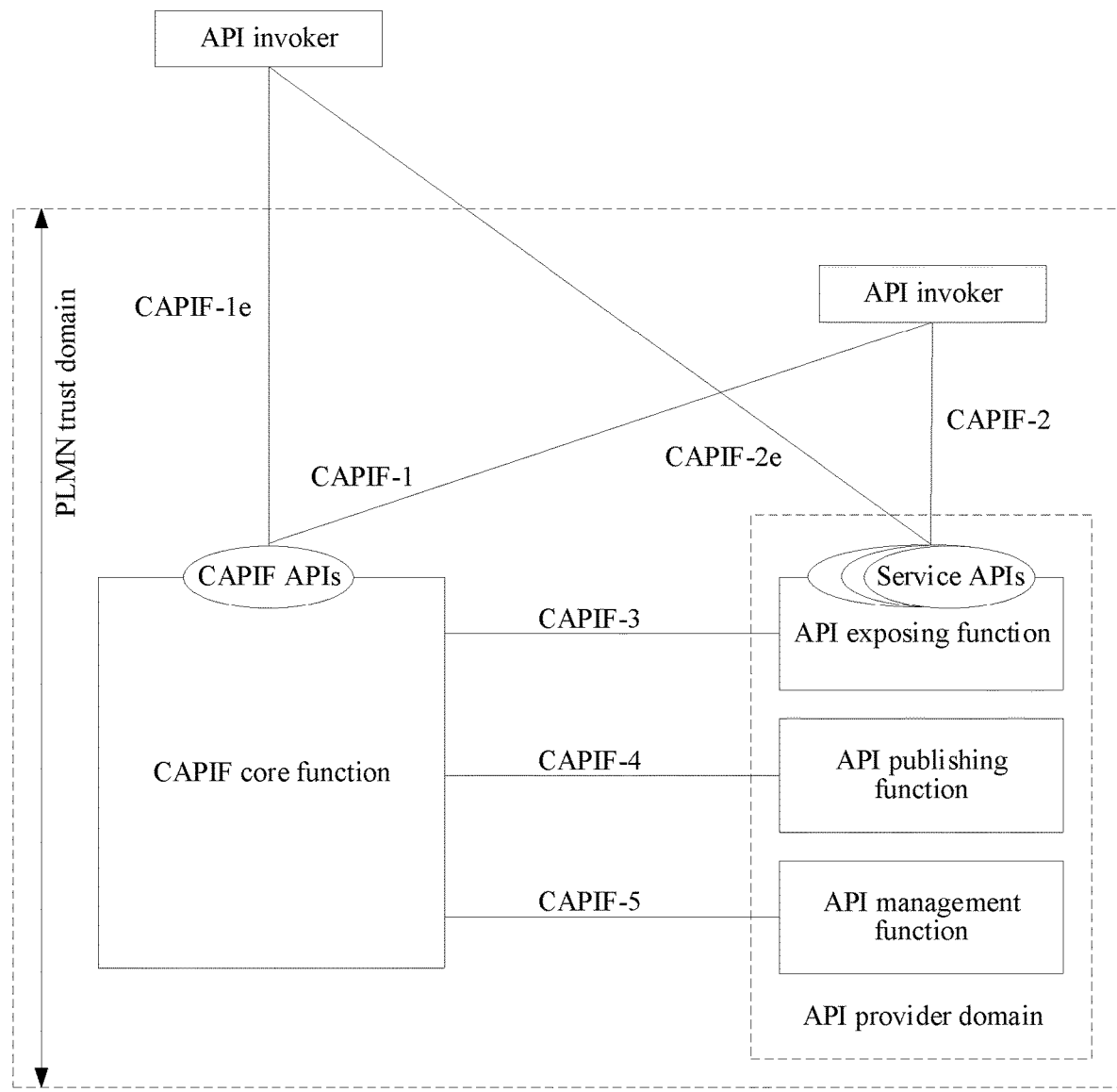
FIG. 4 is a schematic architectural diagram of a CAPIF in the related art.

FIG. 4 is a schematic architectural diagram of a common API framework (CAPIF). A common framework technology CAPIF of network capability exposure is defined in 3GPP Protocol TS 23.222. API is used to represent network capability exposure, and only the quote in communication is used, as shown in FIG. 4.

The following common functions of network capability exposure are defined in the CAPIF: publishing and implementation of a service API; security; OAM; onboarding; configuration; interconnection; identification; routing; registration; and various other functions. For the description and process of detailed functions, reference may be made to 3GPP Protocol TS 23.222.

In FIG. 4, a Public Land Mobile Network (PLMN) trust domain is an entity under sufficient security protection controlled by a PLMN operator or a trusted third party of a PLMN. The CAPIF is hosted in a PLMN operator network. An API invoker is usually provided by a third-party application provider that has a service agreement with a PLMN operator. The API invoker and the PLMN operator network may be located in the same trust domain. In a model based on a reference point, an API invoker in the PLMN trust domain interacts with the CAPIF through a CAPIF-1 and a CAPIF-2. An API invoker outside the PLMN trust domain interacts with the CAPIF through a CAPIF-1e and a CAPIF-2e. An API exposing function, an API publishing function, and an API management function in an API provider domain in the PLMN trust domain respectively interact with a CAPIF core function through a CAPIF-3, a CAPIF-4, and a CAPIF-5.

The basic definition of edge computing (EC) is given in 3GPP Protocol TS 23.501. An edge application server (EAS) and a packet data unit (PDU) Session Anchor (PSA) are deployed at positions near a user to reduce an interaction delay between the UE and the EAS, thereby improving the use experience of a user.

Figure 5:
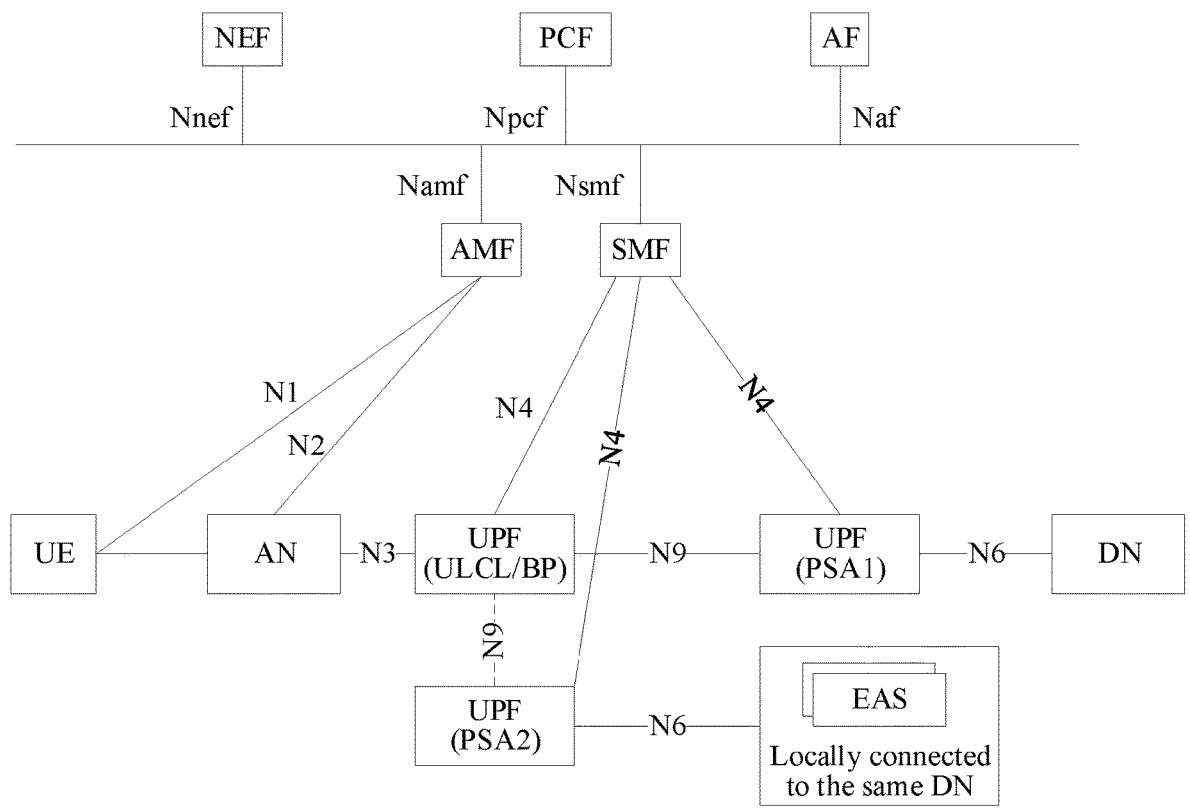
FIG. 5 is a schematic diagram of an EC architecture and a network capability exposure requirement in the related art.
Figure 6:
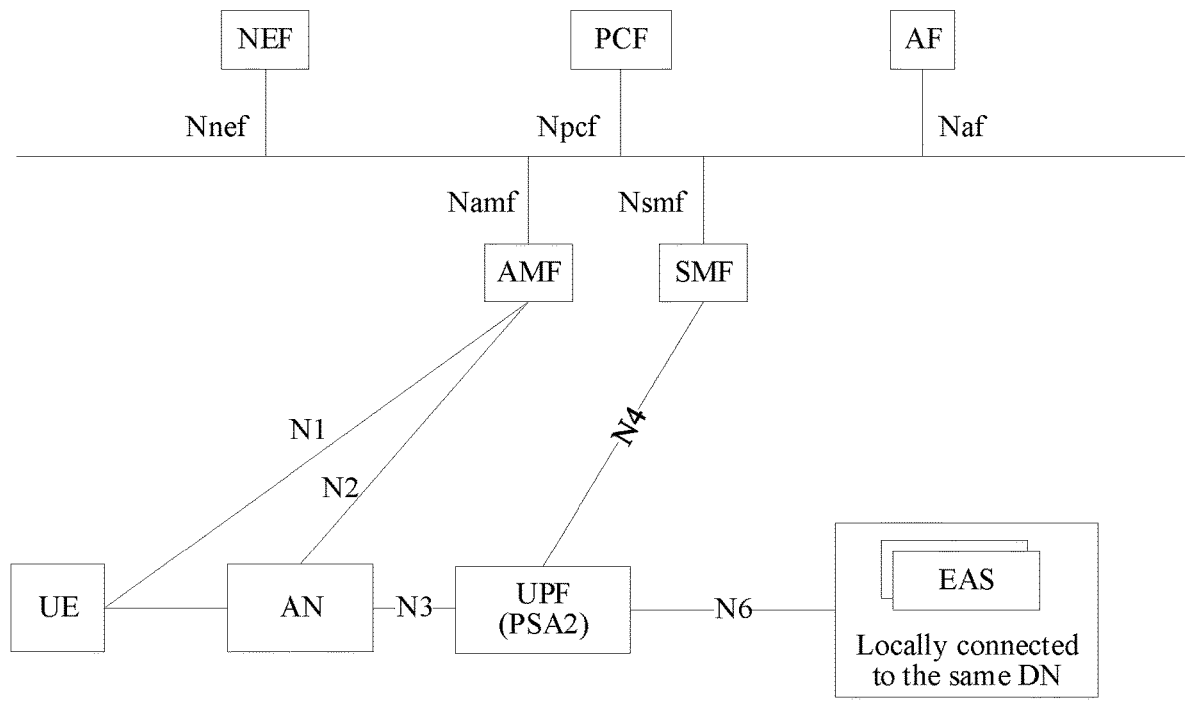
FIG. 6 is a schematic diagram of an EC architecture and a network capability exposure requirement in the related art.

An architecture implemented by two ECs shown in FIG. 5 and FIG. 6 is defined in 3GPP Protocol TR 23.748. An architecture of an EC in an application layer is defined in 3GPP Protocol TR 23.758. The 3GPP Protocols TR 23.748 and TR 23.758 define the EC in different dimensions and complement each other.

In the embodiments of this disclosure, the EC architecture in 3GPP Protocol TR 23.748 is used as a baseline of a solution of the embodiments for exemplary description. However, this disclosure is not limited thereto. In other embodiments, this disclosure may be extended to be applicable to the EC architecture in 3GPP Protocol TR 23.758.

In FIG. 5, the EAS is accessed by using an uplink classifier/branching point (UL CL/BP). In FIG. 6, the EAS is accessed without using an UL CL/BP.

In the related art in the foregoing FIG. 1 to FIG. 6, the used network capability exposure is implemented based on a control plane. The control plane is used for carrying signaling or control messages, and is discussed with respect to a user plane. The user plane is also referred to as a data plane or a forwarding plane and is used for carrying data traffic.

A solution based on a control plane is an out-of-band solution. That is, when the EAS/AS communicates with the UE, the EAS/AS generally needs to interact with the NEF or SCEF through the AF to obtain some information of a 5G or 4G network. Such a method has the following disadvantages:

In one aspect, the EAS/AS either has an function of an AF in this case or has an interface with the AF for interaction and the AF is demanded to interact with the 4G or 5G network. At present, this function is not provided in EASs/ASs of many Internet companies. As a result, the application range of this method is greatly reduced.

In another aspect, even if the EAS/AS has an function of an AF or has a function of interacting with an AF, when the AF transmits a request of the EAS/AS for requesting network capability exposure to the 4G or 5G network, the 4G or 5G network cannot associate the request of the AF with Internet Protocol (IP) data of an application that belongs to the UE and is currently located in a wireless network. For example, the 4G or 5G network cannot perceive with which QoS flow or Evolved Packet System (EPS) bearer of the UE the request of the AF is associated. This is a notification disadvantage of such an out-of-band solution.

In addition, even if the AF provides information of an IP flow of the UE, because there is Network Address Translation (NAT) in a network and some IP flows have relatively short time to live, the EAS/AS may continuously release old IP flows and establish new IP flows to implement the transmission of some small files (for example, various small object files on a webpage). Therefore, it is very difficult for the AF to follow dynamic changes of such an IP flow. The foregoing AF method may be effective only if one IP flow has a relatively long time to live.

Because wireless communication is subject to a fast-changing network status, a lot of control plane signaling may be caused if a wireless base station is to report changes in a transmission rate of the wireless base station. In this case, the out-of-band solution is not applicable to such network capability exposure with real-time change and low latency either.

Therefore, how to implement the support for network capability exposure with real-time change and low latency is a challenge. In particular, EC has a great demand for such a requirement of supporting network capability exposure with real-time change and low latency, or otherwise the advantages of EC cannot be reflected.

For example, the EAS/AS may perform real-time adjustment of a downlink rate according to a bandwidth of a wireless network (for example, in the case of games, videos, or high-definition speech), to reduce a freeze time and freeze quantity in applications on the UE, thereby improving Quality of Experience (QoE) for a user.

Figure 7:
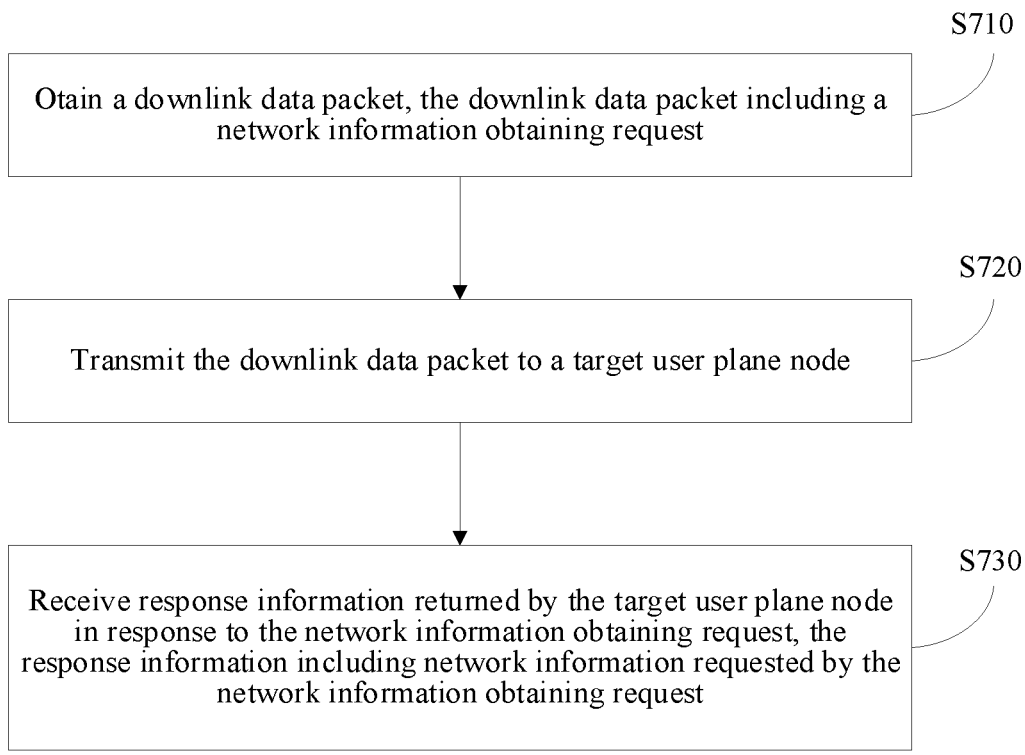
FIG. 7 is a schematic flowchart of a method for implementing network capability exposure according to an embodiment of this disclosure.

FIG. 7 is a schematic flowchart of a method for implementing network capability exposure according to an embodiment of this disclosure. The method provided in the embodiments of this disclosure may be performed by any electronic device having computing capability and capabilities, for example, an application server AS or an edge application server EAS.

In the embodiments of this disclosure, a capability is an abstraction of a complex underlying implementation and externally provides a development and execution environment. Capability exposure may be substantially considered as a novel network exposure mode. Based on the integration and utilization of telecommunication core network resources, a network capability exposure platform uses a unified multilayer exposure interface to expose telecommunication capabilities, gathers potential and innovative developers on the Internet, and encourages the developers to utilize these capabilities to keep creating better commercial applications and services to form a large batch of new mobile Internet applications and services.

As shown in FIG. 7, the method for implementing network capability exposure provided in the embodiments of this disclosure may include the following steps:

S710: Obtain a downlink data packet, the downlink data packet including a network information obtaining request.

In the embodiments of this disclosure, the network information obtaining request is a request that is transmitted by an EAS/AS (also represented as an (E)AS, which may indicate an EAS or an AS) and is used for obtaining requested network information from a target user plane node. For a specific manner of obtaining a downlink data packet, reference may be made to the following FIG. 8 to FIG. 10.

S720: Transmit the downlink data packet to a target user plane node.

In the embodiments of this disclosure, the EAS/AS may determine, according to current requested network information, which user plane node is to be used as a current target user plane node. The user plane node is a node for carrying data traffic and corresponds to a control plane node. The control plane node is a node for carrying signaling or control messages. In different communication networks, the user plane node and the control plane node may be different.

For example, in a 4G network, the control plane node may include an MME, an HSS, and a PCRF, or may include an SGW-C and a PGW-C. SGW stands for Service Gateway. SGW-C refers to SGW-Control. PGW stands for Public Data Network (PDN) GateWay (or packet gateway). PGW-C refers to PGW-Control. The user plane node part is included in the SGW and the PGW or an SGW-U and a PGW-U.

In another example, in a 5G network, the user plane node may include a terminal (UE), a radio access network (RAN, referred to as a base station), and a user plane gateway (which is described by using a UPF (user plane function) as an example here; however, the embodiments of this disclosure are not limited thereto). The UPF may be an I-UPF or a PSA UPF. A suitable UPF may be used according to different cases. In the following exemplary description, for example, the target user plane node is any one of UE, a RAN, or a UPF. However, the embodiments of this disclosure are not limited thereto. The UPF is responsible for forwarding traffic between the radio access network and the Internet, reporting traffic usage, implementing QoS policy, and the like, and corresponds to a user plane of an SGW/a PGW in 4G. The control plane node may include an AMF, an SMF, a PCF, a UDM, an AUSF, a NEF, an NRF, an NSSF, and the like.

S730: Receive responsive information returned by the target user plane node in response to the network information obtaining request, the responsive information including network information requested by the network information obtaining request.

In some embodiments, when the target user plane node is a terminal and the terminal returns the responsive information by using a data area of an Internet Control Message Protocol (ICMP) ECHO request packet, the method may further include: if it is detected that a length of the network information in the responsive information returned by the terminal exceeds a preset threshold, switching to using a user plane gateway or a base station to return the network information requested by the network information obtaining request.

In the embodiments of this disclosure, when data of an ICMP ECHO packet is used to transmit data, because a user plane of the UE needs to pass through an air interface, resources of a radio air interface are consumed. In this case, if the EAS/AS determines that the network information in the responsive information returned by the UE is relatively large, the EAS/AS stops using the UE to provide network capability exposure, but instead switches to using the UPF or the RAN to perform network capability exposure and changes a target identification (target ID) to the UPF or the RAN, thereby avoiding wasting resources of the air interface. For details, reference may be made to the content in the following embodiments.

In the method for implementing network capability exposure provided in the embodiments of this disclosure, a user plane node obtains network information. In one aspect, with the presence of network information, only a small part of data in a user plane is added. Therefore, the entire system is subject to very small influence. In another aspect, data transmission in a user plane has very short latency. Therefore, network capability exposure with real-time change and low latency can be supported.

The Internet Protocol (IP) is the most widely used communication protocol. An IP header of Internet Protocol version 4 (IPv4) is defined in (Request For Comments (RFC) 791 (an IP specification). Options included in an IP header are as follows:

RFC 791:
Options: variable
The options may appear or not in datagrams. They must be implemented by all IP modules (a host and gateways). What is optional is their transmission in any particular datagram, not their implementation.
In some environments the security option may be required in all datagrams.
The option field is variable in length. There may be zero or more options. There are two cases for the format of an option:
Case 1: A single octet of option-type.
Case 2: An option-type octet, an option-length octet, and the actual option-data octets.
The option-length octet counts option-type octet and option-length octet as well as option-data octets.
The option-type octet is viewed as having 3 fields:
1 bit copied flag,
2 bits option class, and
5 bits option number.
The copied flag indicates that this option is copied into all fragments on fragmentation.
0=not copied
1=copied
The option classes are:
0=control
1=reserved for future use
2=debugging and measurements
3=reserved for future use That is, an IP option has a total byte length or has option-type (1 byte)+option-length (1 byte)+option data (1 to 38 bytes). 8 bits (1 byte) of option-type includes three parts: a copied flag (1 bit), an option class (2 bits), and an option number (5 bits).

RFC 4727 (experimental values in IPv4, IPv6, ICMPv4, ICMPv6, User Datagram Protocol (UDP), and TCP headers) gives experimental values for IPv4 option-type, shown as follows.

RFC 4727:

| IPv4 Option Numbers (in-parameters initial section) (Section 2.5) | | | |
|---|---|---|---|
| Copy | Class | Number | Value |
| 0 | 0 | 30 | 30 |
| 0 | 2 | 30 | 94 |
| 1 | 0 | 30 | 158 |
| 1 | 2 | 30 | 222 |

For 3GPP, 3GPP may apply to the Internet Assigned Numbers Authority (IANA) for dedicated option-type (when the method provided in the embodiments of this disclosure enters the standard). Alternatively, 3GPP may continue using the experimental values defined in RFC 4727 (however, other IP applications may use the experimental values to cause a conflict).

Referring to the description in the following embodiments, options of one IPv4 header may at most transmit content of 38 bytes (40−2=38).

For IPv6, option-type 253 and option-type 254 are defined in RFC 3296 for use as experimental values. Details are no longer described herein. IPv4 is used for description in the following embodiments. The same method may also be applied to IPv6.

Data transmission that may use an IP option for network capability exposure in the embodiments of this disclosure is described below with reference to the embodiment in FIG. 8.

Figure 8:
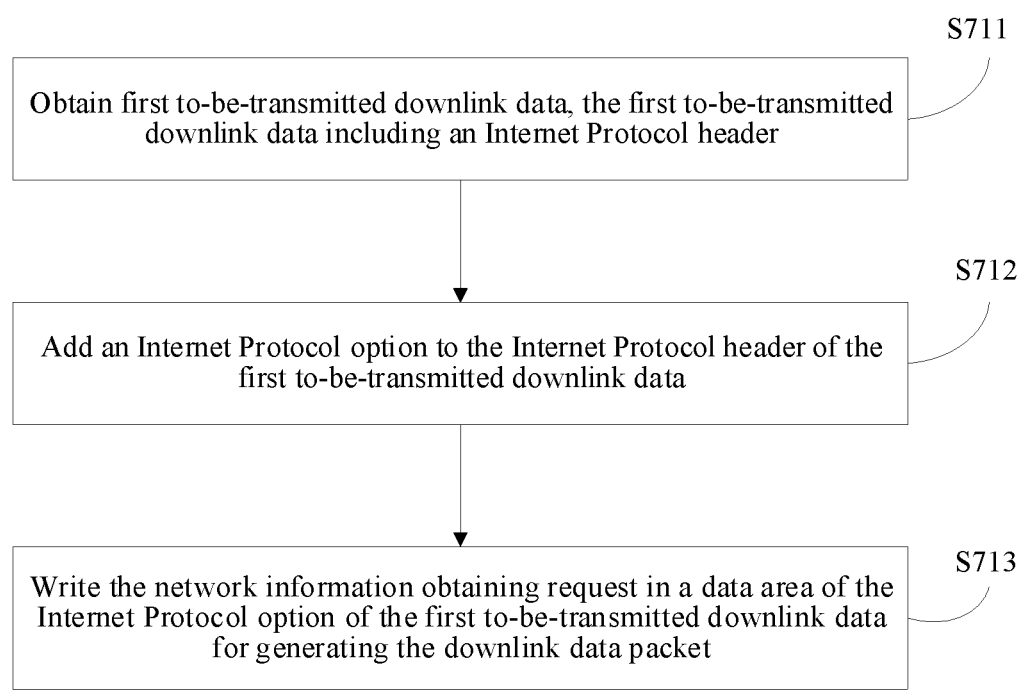
FIG. 8 is a schematic diagram of a processing process in an embodiment of step S710 in FIG. 7.

FIG. 8 is a schematic diagram of a processing process in an embodiment of step S710 in FIG. 7. As shown in FIG. 8, in the embodiments of this disclosure, the foregoing step S710 may further include the following steps:

S711: Obtain first to-be-transmitted downlink data, the first to-be-transmitted downlink data including an Internet Protocol header (IP header).

In the embodiments of this disclosure, the first to-be-transmitted downlink data may be any data that the EAS/AS currently prepares or needs to transmit to the UE. When the first to-be-transmitted downlink data is an IP packet, the IP packet includes an IP header.

S712: Add an Internet Protocol option to the Internet Protocol header of the first to-be-transmitted downlink data.

In the embodiments of this disclosure, an IP option is added to the IP header of the IP packet of the first to-be-transmitted downlink data.

S713: Write the network information obtaining request in a data area of the Internet Protocol option of the first to-be-transmitted downlink data for generating the downlink data packet.

In the embodiments of this disclosure, the network information obtaining request to be transmitted to the target user plane node is written in the data area or part of the IP option in the IP header of the IP packet of the first to-be-transmitted downlink data to generate a downlink data packet to be transmitted to the target user plane node.

For example, the IPv4 header is shown in the following Table 1:

TABLE 1

IPv4 header

| Version (4 bits) | Header Length (4 bits) | Type of Service (8 bits) | Total length (16 bits) | | |
|---|---|---|---|---|---|
| Identification (16 bits) | | | 0 | DF MF | Fragment Offset (13 bits) |
| Time to live (8 bits) | Protocol (8 bits) | Header checksum (16 bits) | | | |
| Source IP Address (32 bits) | | | | | |
| Destination IP Address (32 bits) | | | | | |
| Options (0-40 bytes) | | | | | |
| Data | | | | | |

In Table 1, DF represents a Don't Fragment label, indicating that a data packet does not allow fragmentation. If the length of the packet exceeds a processing capability of a network device and a different label is added, the network device discards the data packet. MF represents a More Fragments label, used for indicating that whether a data packet is fragmented. If the data packet is fragmented, the bit is 1. If the data packet is not fragmented, the bit is 0.

As can be seen from the foregoing Table 1, the IP header is at least 20 bytes. Because a maximum value of a Head Length in the IP header is 0x0F (hexadecimal), that is, 15, a total length of the IP header is 15*4=60 bytes. In this case, a maximum length of the IP option is 60−20=40 bytes.

If encryption and integrity protection is enabled for the first to-be-transmitted downlink data written in the network information obtaining request, the length of the downlink data packet includes the first to-be-transmitted downlink data after encryption and integrity protection+an integrity protection message authentication code (MAC). The MAC refers to a message authentication code for message integrity protection during interaction of network capability exposure. The MAC usually has 8 bytes or 4 bytes. In this case, an IP option can only transmit a network information obtaining request of 38−8=30 or 38−4=34 bytes.

Generally, the length of bytes that one IP option can provide is sufficient for the EAS or AS to transmit a control command (for example, the downlink data packet including the foregoing network information obtaining request) to the target user plane node. If the EAS or the AS transmits the downlink data packet including the foregoing network information obtaining request to the target user plane node, the length of 40 bytes provided by one IP option is insufficient. In this case, the first one or two bytes in the data of the IP option (whereas the embodiments of this disclosure are not limited thereto) are defined as a current position of the data, that is, used as a data pointer of the network information obtaining request. The provided network information obtaining request is fragmented into IP options of a plurality of IP packets. A data area of one IP option can provide 40−1 (option-type)−1 (option-length)−0/1/2 (data pointer)=38/37/36 bytes.

In addition, because the IP cannot ensure that an arrival sequence and a transmission sequence of data packets are consistent, a receiver may use a data pointer to implement recombination of data. However, if an IP packet in the middle is missing, the whole data may fail to be recombined. In this case, the EAS or AS needs to retransmit the downlink data packet including the foregoing network information obtaining request.

Therefore, in some embodiments, when the length of the foregoing network information obtaining request (if encryption and integrity protection is performed, the MAC after encryption and integrity protection further needs to be included. It is the same in the following embodiments) is greater than 38 bytes, the EAS or AS may alternatively use a data part or area of the ICMP ECHO packet to transmit the foregoing network information obtaining request. The data part or area of the ICMP ECHO packet may transmit a network information obtaining request of 1500 (a size of a data packet that can be provided by an entire Ethernet frame)−20 (a size of an IP header)−8 (a size of an ICMP header)=1472 bytes. Even if the encryption and integrity protection is enabled and the MAC occupies 8 bytes or 4 bytes, a network information obtaining request of 1472−8/4=1464/1468 bytes may still be transmitted, and the transmission efficiency is improved 1468/34=43 or 1464/30=49 times compared with an IP option.

The transmission control protocol (TCP) is the most widely used transport layer protocol. Options included in a TCP header are defined in RFC 793 (TCP does not distinguish between IPv4 or IPv6, and there is only one TCP header) as follows.

RFC 793:

Options: variable

Options may occupy space at the end of the TCP header and are a multiple of 8 bits in length. All options are included in the checksum. An option may begin on any octet boundary. There are two cases for the format of an option:

Case 1: a single octet of option-kind.

Case 2: an octet of option-kind, an octet of option-length, and the actual option-data octets.

Option-length counts the two octets of option-kind and option-length as well as option-data octets.

Note that the list of options may be shorter than the data offset field might imply. The content of the header beyond the End-of-option option must be header padding (i.e., zero).

A TCP must implement all options.

Currently defined options include (kind indicated in octal):

| Kind | Length | Meaning |
|---|---|---|
| 0 | — | End of option list. |
| 1 | — | No-operation. |
| 2 | 4 | Maximum Segment Size. |

That is, a TCP option has a total byte length, or has option-kind+option-length+option data, which is very similar to the foregoing option of IPv4.

TCP option-kind is given in RFC 4727 (experimental values in IPv4, IPv6, ICMPv4, ICMPv6, UDP, and TCP headers) for use as experimental values as follows.

RFC 4727:

| TCP Option Numbers (tcp-parameters) (Section 7.3) | | |
|---|---|---|
| Kind | Length | Meaning |
| 253 | N | RFC3692-style Experiment 1 (*) |
| 254 | N | RFC3692-style Experiment 2 (*) |

For 3GPP, 3GPP may apply to the IANA for dedicated option-kind (when the method provided in the embodiments of this disclosure enters the standard). 3GPP may continue using the experimental values defined in RFC 4727 (in this case, the RFC 6994 protocol needs to be used; see the content below).

RFC 6994:

This document extends the option structure for experimental codepoints (253, 254) with an experiment identifier (ExID), which is either 2 or 4 bytes in length. The ExID is used to differentiate experiments and is the first field after Kind and Length, as follows:

```
    0                   1                   2                   3
    0 1 2 3 4 5 6 7 8 9 0 1 2 3 4 5 6 7 8 9 0 1 2 3 4 5 6 7 8 9 0 1
   +---------------+---------------+-------------------+-----------------+
   |     Kind      |    Length     |        ExID       |
   +---------------+---------------+-------------------+-----------------+
   |   option contents...
   +---------------+---------------+-------------------+---
```

FIG. 2. TCP Experimental Option with a 16-Bit ExID

```
    0                   1                   2                   3
    0 1 2 3 4 5 6 7 8 9 0 1 2 3 4 5 6 7 8 9 0 1 2 3 4 5 6 7 8 9 0 1
   +---------------+---------------+-------------------+-----------------+
   |     Kind      |    Length     |        ExID       |
   +---------------+---------------+-------------------+-----------------+
   |   ExID (don't)                |   option contents...
   +---------------+---------------+-------------------+---
```

FIG. 3. TCP Experimental Option with a 32-Bit ExID

When two applications both use 253 or 254 of option-kind using TCP defined in RFC 4727, a mutual conflict may occur. One ExID (which may be 2 bytes or 4 bytes in length) is introduced in the beginning of option-data in RFC 6994. In this way, a probability of a conflict between two applications is greatly reduced. In addition, an application may report a used ExID to the IANA. In this way, other IP applications can no longer use the ExID that has been applied for. In this way, a possibility of a conflict is further reduced.

3GPP may continue using experimental values defined in RFC 4727 or may apply to the IANA for a dedicated ExID (when the method provided in the embodiments of this disclosure enters the standard).

Referring to the description of the following embodiments, similar to IPv4 header option, one TCP header option may at most transmit content of 38 bytes.

Data transmission that may use a TCP option to implement network capability exposure in the embodiments of this disclosure is described below with reference to FIG. 9.

Figure 9:
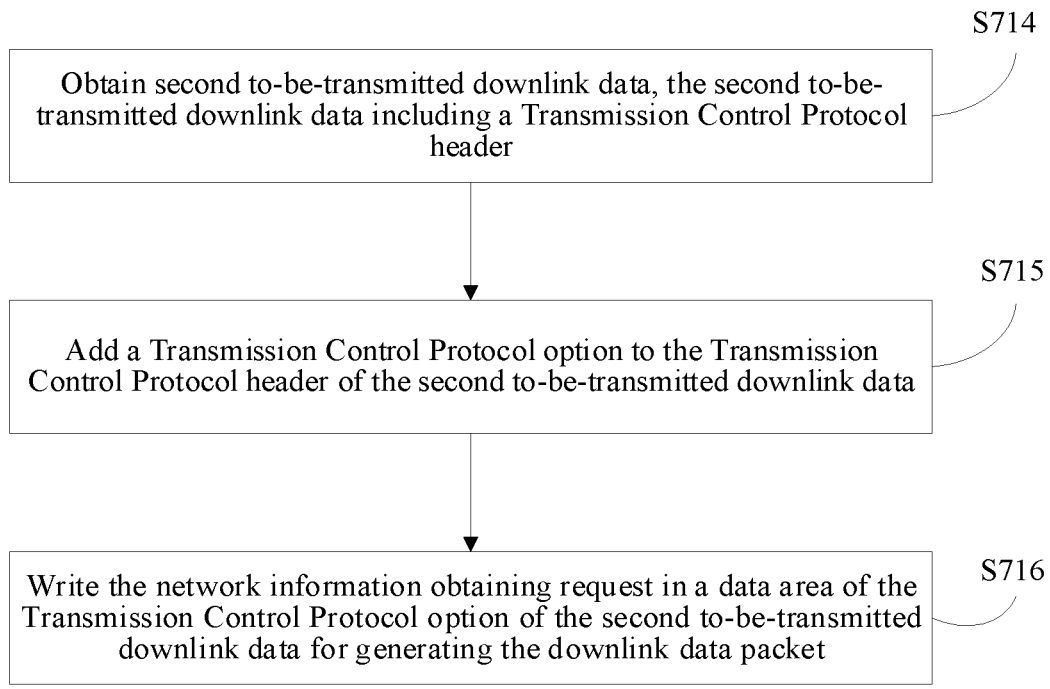
FIG. 9 is a schematic diagram of a processing process in an embodiment of step S710 in FIG. 7.

FIG. 9 is a schematic diagram of a processing process in an embodiment of step S710 in FIG. 7.

As shown in FIG. 9, in the embodiments of this disclosure, the foregoing step S710 may further include the following steps:

S714: Obtain second to-be-transmitted downlink data, the second to-be-transmitted downlink data including a Transmission Control Protocol header.

In the embodiments of this disclosure, the second to-be-transmitted downlink data may be any data that the EAS/AS currently prepares or needs to transmit to the UE. When the second to-be-transmitted downlink data is a TCP packet, the TCP packet includes a TCP header.

S715 Add a Transmission Control Protocol option to the Transmission Control Protocol header of the second to-be-transmitted downlink data.

In the embodiments of this disclosure, a TCP option is added to the TCP header of the TCP packet of the second to-be-transmitted downlink data.

S716: Write the network information obtaining request in a data area of the Transmission Control Protocol option of the second to-be-transmitted downlink data for generating the downlink data packet.

In the embodiments of this disclosure, the network information obtaining request to be transmitted to the target user plane node is written in the data area or part of the TCP option in the TCP header of the TCP packet of the second to-be-transmitted downlink data, to generate a downlink data packet to be transmitted to the target user plane node.

For example, the TCP header is shown in the following Table 2:

TABLE 2

| TCP header | | | | | | | | | |
|---|---|---|---|---|---|---|---|---|---|
| Source Port (16 bits) | | | | | | | Destination Port (16 bits) | | |
| Sequence number | | | | | | | | | |
| Acknowledgement number | | | | | | | | | |
| Header Length (4 bits) | Reserved bits (6 bits) | URG | ACK | PSH | RST | SYN | FIN | Window Size (Advertisement Window) | |
| Check sum | | | | | | | Urgent Pointer | | |
| Options (0-40 bytes) | | | | | | | | | |
| Data (Optional) | | | | | | | | | |

In the foregoing Table 2, URG stands for urgent, representing an urgent bit; ACK stands for acknowledgment, representing an acknowledgment bit; PSH stands for push, representing a push bit; RST stands for reset, representing a reset bit; SYN stands for synchronization, representing a request bit; and FIN stands for finish, representing a finish bit.

As can be seen, the TCP header has at least 20 bytes. Similar to an IP header, because a maximum value of a head length in a TCP header is 0x0F (hexadecimal), that is, 15, a total length of the TCP header is 15*4=60 bytes. In this case, a maximum length of the TCP Option is 60−20=40 bytes.

If encryption and integrity protection is enabled for the second to-be-transmitted downlink data written in the network information obtaining request, the length of the downlink data packet includes the second to-be-transmitted downlink data after encryption and integrity protection+an integrity protection MAC. The MAC usually has 8 bytes or 4 bytes. In this case, similar to an IP option, a TCP option can only transmit a network information obtaining request of 38−8=30 or 38−4=34 bytes.

Generally, the length of bytes that one TCP option can provide is sufficient for the EAS or AS to transmit a control command (for example, the downlink data packet including the foregoing network information obtaining request) to the target user plane node. If the EAS or the AS transmits the downlink data packet including the foregoing network information obtaining request to the target user plane node, the length of 40 bytes provided by one TCP option is insufficient. In this case, the first one or two bytes in the data of the TCP option (the embodiments of this disclosure are not limited thereto) are defined as a current position of the data, that is, used as a data pointer of the network information obtaining request, and the provided network information obtaining request is fragmented into TCP options of a plurality of TCP packets. A data area of one TCP option can provide 40−1 (option-type)−1 (option-length)−1/2 (data pointer)=37/36 bytes.

However, this is only based on that one option is added to each existing TCP packet. When data of network capability exposure is relatively long, many TCP packets may be demanded, and the data may last a relatively long time. In this case, it is better to use a method of data of the ICMP ECHO packet in the following embodiments.

In addition, because the TCP protocol can eventually implement sequential recombination of TCP packets, it can be indirectly ensured that a receiver sequentially receives the data of network capability exposure (a downlink data packet including the foregoing network information obtaining request, in which a loss of a TCP packet in a transmission process is included, and a TCP option is better than an IP option in this aspect).

Therefore, in some embodiments, when the length of the foregoing network information obtaining request is greater than 38 bytes, the EAS or AS may alternatively use a data part or area of the ICMP ECHO packet to transmit the foregoing network information obtaining request. If encryption and integrity protection is performed, the MAC after encryption and integrity protection further needs to be included. It is the same in the following embodiments. A data part or area of the ICMP ECHO packet may transmit a network information obtaining request of 1472−8/4=1464/1468 bytes. The transmission efficiency is improved 1468/34=43 or 1464/30=49 times a TCP option.

In the embodiments in FIG. 8 and FIG. 9, when the EAS or AS transmits the downlink data packet including the network information obtaining request to the target user plane node (for example, the UE/RAN/UPF), if at this time there is no first to-be-transmitted downlink data or second to-be-transmitted downlink data that may be transmitted, one of the solutions is keeping waiting until there is first to-be-transmitted downlink data or second to-be-transmitted downlink data that may be transmitted.

However, for a relatively long downlink network information obtaining request, this method may still encounter the foregoing problem of repeated transmission. For this, for a case in which the length of the network information obtaining request is greater than 38 bytes, instead of waiting for available first to-be-transmitted downlink data and second to-be-transmitted downlink data, a method of a data part or area of the foregoing ICMP ECHO packet is directly used, and Data is used for transmitting the network information obtaining request.

In addition, an empty TCP packet (that is, a packet that does not transmit actual user data) of one or more ACKs may be transmitted, and a part of data of network capability exposure is transmitted in each empty TCP packet. In this way, no problem is caused to a TCP connection. However, in some TCP protocol stacks, after empty TCP packets (that is, ACK numbers of TCP packets) are repeated three times, the EAS/AS reduces a rate of transmitting actual TCP data packets to the UE, affecting experience for a user.

In addition, an option of a downlink (DL) dummy IP packet may be used to transmit the foregoing network information obtaining request. Description is provided below with reference to the embodiment in FIG. 10.

In the following embodiments, it is proposed to use the ICMP (see RFC 792) of IPv4 such as an ECHO reply of an ECHO of ICMPv4 to transmit data of network capability exposure, so that the transmission efficiency can be greatly improved, and the functions of sorting and recombination can be implemented.

Echo or Echo Reply Message:

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |     Type      |     Code      |          Checksum             |
   +-+-+-+-+-+-+-+-+-+-+-+-+-+-+-+-+-+-+-+-+-+-+-+-+-+-+-+-+-+-+-+-+
   |           Identifier          |        Sequence Number        |
   +-+-+-+-+-+-+-+-+-+-+-+-+-+-+-+-+-+-+-+-+-+-+-+-+-+-+-+-+-+-+-+-+
   |     Data ...
   +-+-+-+-+-
```

Type
8 for echo message; and
0 for echo reply message.
Code
0
Identifier
If code=0, an identifier to aid in matching echoes and replies, may be zero.
Sequence Number
If code=0, a sequence number to aid in matching echoes and replies may be zero.
Description
The data received in the echo message must be returned in the echo reply message.
The identifier and sequence number may be used by the echo sender to aid in matching the replies with the echoes. For example, the identifier might be used like a port in TCP or UDP to identify a session, and the sequence number might be incremented on each ECHO sent. The echoer returns these same values in the echo reply.

It also proposed in the embodiments of this disclosure to use an option in an IP header of an ICMP ECHO to transmit data (only 38 bytes can be transmitted). In this case, the IP packet (an ECHO including ICMP) is referred to as an IP Dummy packet. However, this is not to be confused with a method of using data in an ICMP ECHO to transmit a network information obtaining request or network data information.

As can be seen with reference to the following embodiments, a message header of an ECHO/ECHO reply of the ICMP has only 8 bytes, and an IP header is usually added (the ICMP is transmitted on the IP). Therefore, data that may be transmitted is usually 1500−20−8=1472 bytes, and is much more than data (38 bytes) that can be transmitted by an IP option or a TCP option, and the efficiency is 1472/38=39 times that of a TCP packet or IP packet (including an IP dummy packet) option.

Type/Code=8/0 indicates an ECHO (an ECHO request), and Type/Code=0/0 indicates an ECHO reply. An identifier and a sequence number (SN) of an ECHO are not limited in any way in the specification. However, an identifier and an SN of the ECHO reply need to respectively have the same values as an identifier and an SN of a corresponding ECHO.

Figure 10:
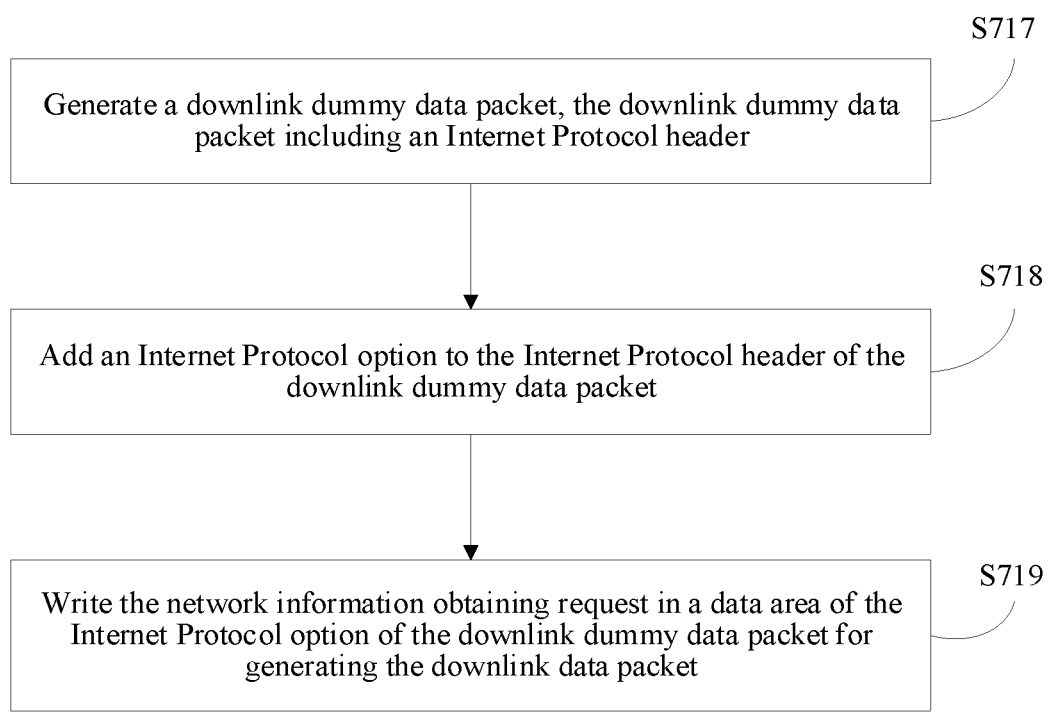
FIG. 10 is a schematic diagram of a processing process in an embodiment of step S710 in FIG. 7.

The embodiment in FIG. 10 describes data transmission of network capability exposure implemented by using a dummy IP packet and the ICMP.

FIG. 10 is a schematic diagram of a processing process in an embodiment of step S710 in FIG. 7. As shown in FIG. 10, in the embodiments of this disclosure, the foregoing step S710 may further include the following steps:

S717: Generate a downlink dummy data packet, the downlink dummy data packet including an Internet Protocol header.

RFC 792:

```
             IP header (20 bytes)
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
    Type         Code           Checksum
+-+-+-+-+-+-+-+-+-+-+-+-+-+-+-+-+-+-+-+-+-+-+-+-+-+-+-+-+-+-+-+-+
     Identifier              Sequence Number
+-+-+-+-+-+-+-+-+-+-+-+-+-+-+-+-+-+-+-+-+-+-+-+-+-+-+-+-+-+-+-+-+
     Data. . .
+-+-+-+-+-+-
```

As can be seen, the IP header has 20 bytes, and the ICMP header has 8 bytes (including the foregoing Type, Code, Checksum, Identifier, and Sequence Number). According to RFC 792, for an ECHO of the ICMP, Type/Coder=8/0, and for the ECHO reply, Type/Coder=0/0. An extended header may be a variable ID (SN).

S718: Add an Internet Protocol option to the Internet Protocol header of the downlink dummy data packet.

When the EAS or AS transmits the downlink data packet including the network information obtaining request to the target user plane node such as the UE/RAN/UPF, if at this time there is no first to-be-transmitted downlink data or second to-be-transmitted downlink data that may be transmitted, as discussed above, one of the solutions is keeping waiting until there is first to-be-transmitted downlink data or second to-be-transmitted downlink data. However, there may be neither first to-be-transmitted downlink data nor second to-be-transmitted downlink data within a relatively long time. In this case, a method for generating a DL dummy IP packet is used, and an option of the DL dummy IP is used to transmit data related to the network information obtaining request.

S719: Write the network information obtaining request in a data area of the Internet Protocol option of the downlink dummy data packet for generating the downlink data packet.

For example, one DL dummy IP packet is generated. For example, in the following embodiments, an example in which the DL dummy IP packet is an ICMP ECHO packet is used for description; however, the embodiments of this disclosure are not limited thereto. An ICMP ECHO is transmitted (once or a plurality of times), and an identifier in an ECHO transmitted each time is set to a port number of UDP or TCP. An SN is set to an incrementing sequence number. After the UE/RAN/UPF receives an ECHO that is transmitted by the EAS/AS and has an IP option part including the foregoing network information obtaining request, the UE/RAN/UPF may return one corresponding ECHO reply representing acknowledgment of reception to the EAS/AS. The EAS/AS may compare the SN and the identifier of the received ECHO reply with the SN and the identifier of the ECHO. If the SNs and the identifiers are both the same, it indicates that UE/RAN/UPF has received the ICMP ECHO packet. In this way, option data (including the foregoing network information obtaining request) in an IP header of the ICMP ECHO packet is received by the target user plane node such as the UE/RAN/UPF. If the ECHO reply returned by the target user plane node is not received within a predetermined time, the EAS/AS retransmits the ECHO again and adds the corresponding network information obtaining request to an option of an IP header. An SN and an identifier of the transmitted ECHO are kept consistent with the previous SN and identifier.

However, the method in the foregoing embodiments still has low efficiency. Because a DL dummy IP option or an IP option or an TCP option can transmit content of only 38 bytes each time, in some embodiments, another method may be used. Because an ICMP ECHO may include data of 1500−20−8=1472 bytes, the data of the network information obtaining request may be transmitted as a data part in the ECHO. The transmission efficiency at this time is far higher than a method of a DL dummy IP option or an IP option or a TCP option that can transmit only 38 bytes each time. A method of ID+SN and SN+1 each time may be applied at the same time to implement repeated ECHO transmission: If an ECHO reply is not received within a particular time (ID+SN are compared to determine whether the ECHO reply is received), the ECHO is retransmitted (during retransmission, an ID+SN value is an ID+SN value of the retransmitted ECHO packet), thereby implementing reliable and sequential transmission of the network information obtaining request. Because an SN of a new ECHO packet each time is added by 1, the receiver may receive a sequence of data according to SNs.

Therefore, when the length of the data of network capability exposure does not exceed 38 bytes (if encryption and integrity protection is performed, a MAC after encryption and integrity protection further needs to be included. It is the same in the following embodiments), a method of a DL dummy IP option or an IP option or a TCP option may be selected for use. When the length of the data of network capability exposure exceeds 38 bytes and is less than 1472 bytes, a method of an ICMP ECHO and an ECHO reply may be run once. When the length of the data of network capability exposure exceeds 1472 bytes, a method of an ICMP ECHO and an ECHO reply with incrementing SNs may be run repeatedly to implement reliable and sequential transmission of the network information obtaining request.

The method provided in the embodiments of this disclosure is described below by using an EC as a reference architecture. In fact, the method provided in the embodiments of this disclosure is applicable to a 2G network, a 3G network, a 4G network, a 5G network, or any other wireless network.

UE, a wireless base station (a RAN, radio access network) or a PSA, a SGW, a user plane serving gateway (an SGW-User, an SGW-U), a GGSN, an intermediate-UPF (an I-UPF), a UPF, a PGW, a user plane PDN gateway (a PGW-User, a PGW-U), and the like can all upload data to the EAS or AS. However, because of the mobility of the UE, changes in the base station, the SGW, and the I-UPF may be caused. Therefore, an unchangeable user plane node such as UE and a PSA (that is, a UPF) or a PGW-U is used as an example for description. However, because information about a wireless network provided by a base station (a RAN) is informative, the base station is used as an example to describe how a moved node continues to provide network capability exposure to the EAS or AS.

Figure 11:
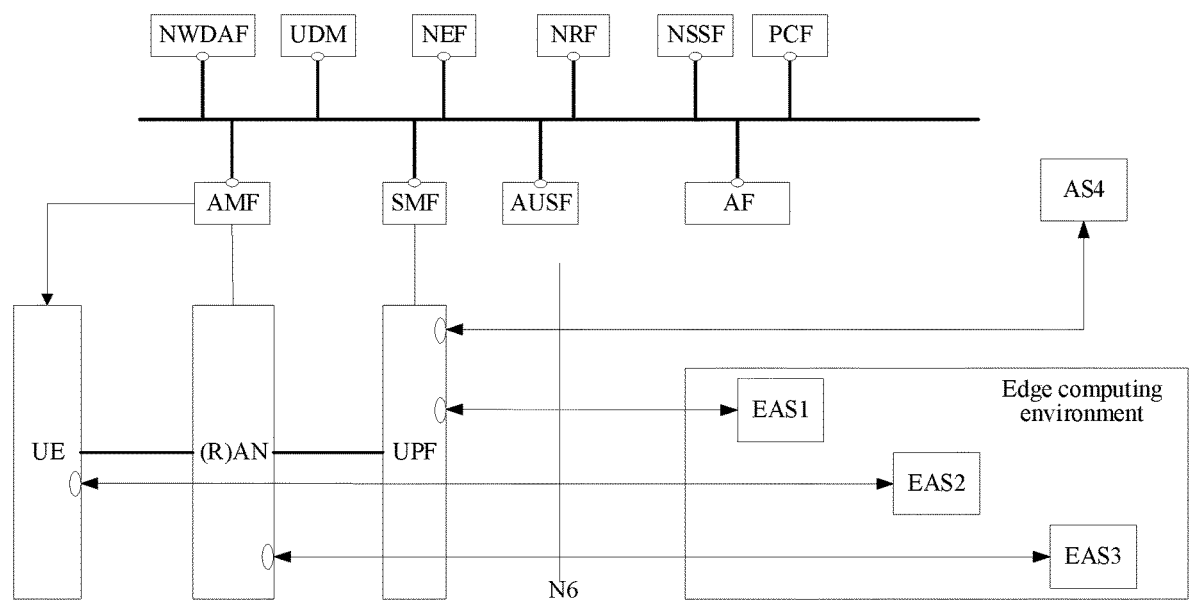
FIG. 11 is a schematic architectural diagram of in-band network capability exposure based on a user plane according to an embodiment of this disclosure.

FIG. 11 is a schematic architectural diagram of in-band network capability exposure based on a user plane according to an embodiment of this disclosure.

As shown in FIG. 11, it is assumed that EASs 1, 2, and 3 are application servers deployed in an edge computing environment. The EASs 1, 2, and 3 separately perform communication of network capability exposure with the UPF.

The edge computing environment is only a platform representing an AS for implementing edge computing. In a standardization stage, the name may be changed.

AS4 refers to an Internet application, which may be a service of an operator or a third-party AS (for example, a server of a search engine company or a game server of an Internet company). FIG. 11 only shows that the AS4 and the UPF performs interaction of network capability exposure. However, the embodiments of this disclosure are not limited thereto. Like the EASs 1, 2, and 3, the AS4 may also interact with the UE, the RAN, and the UPF.

To simplify description below, it is assumed that both the AS and the EAS can perform network capability interaction with the UE, RAN, and UPF.

Continuing to refer to FIG. 11, when network information requested by the AS or EAS from the UE/RAN/UPF cannot be obtained by the UE/RAN/UPF but can be obtained by other NFs, the UE/RAN/UPF may interact with these NFs (for example, AMFs, and SMFs) to obtain the network information from these NFs. IF there is no interface for direct interaction between the UE/RAN/UPF and these NFs, the UE and RAN may obtain the network information from other NFs through the AMF, and the UPF may obtain the network information from other NFs through the SMF. Related implementations are provided in the following embodiments.

In the embodiments of this disclosure, another non-user plane node (for example, a control plane node) of the network exposes some network capabilities to the EAS or AS through a network node such as the UE, the base station, the PSA (the PGW/PGW-U or the GGSN), so that network capability exposure of the entire network can be implemented. For example, other NFs may provide the network information to the EAS or AS through the SMF or AMF.

Because uplink data of IP and TCP data directly reaches the EAS or AS and downlink data of the EAS or AS directly reaches the PSA, the base station, and the UE, the EAS or AS can directly interact with the PSA, the base station, and the UE to implement in-band capability exposure. In addition, with the data of network capabilities, only a small part of data in a user plane is increased, and there is very slight impact on the entire system, and a transmission delay of data in the user plane is very small.

Figure 12:
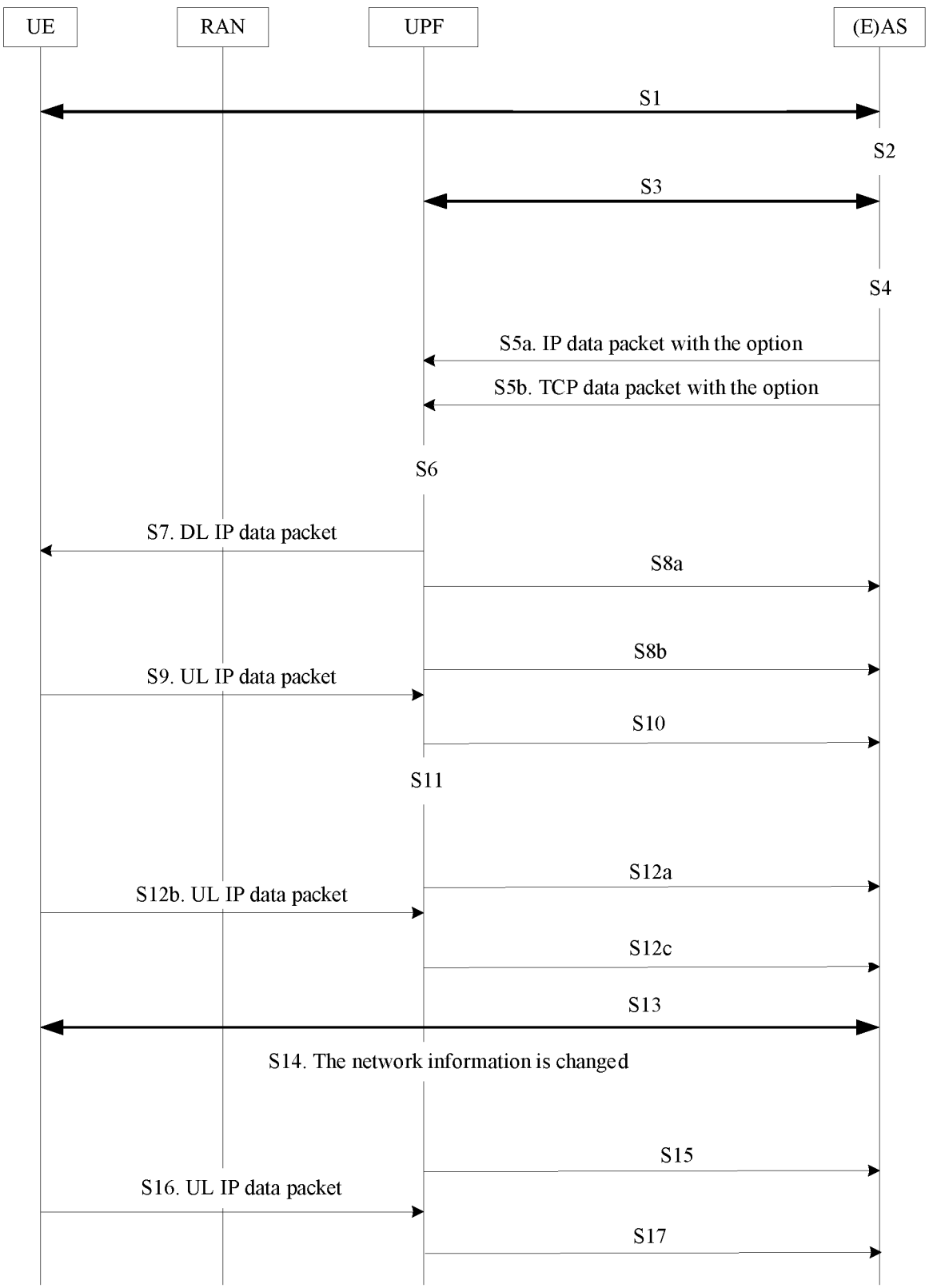
FIG. 12 is a schematic flowchart of an application server obtaining network information based on a UPF according to an embodiment of this disclosure.

FIG. 12 is a schematic flowchart of an application server obtaining network information based on a UPF according to an embodiment of this disclosure. FIG. 12 describes that the UPF uses ICMP/an IP option/a TCP option to implement transmission of requested network information. FIG. 12 may include the following steps:

Step S1: UE establishes a PDU session. An IP address is assigned to the UE. An IP connection is established with an (E)AS through the IP address. A transmitted IP flow may pass through a RAN and a UPF to reach the (E)AS.

Step S2: Assume that the (E)AS determines to request network information from the UPF, and transmits a network information obtaining request to the UPF.

In the embodiments of this disclosure, the (E)AS determines a provider to request to provide the network information, and the provider is determined according to currently requested network information. For example, if the requested network information is related to an application or a terminal, the (E)AS may request the UE to provide the network information. If the requested network information is related to a wireless case, the (E)AS may request the RAN to provide the network information. If the requested network information does not belong to the foregoing two cases, the (E)AS may request the UPF to provide the network information.

Step S3: This step is optional. The (E)AS and the UPF perform mutual verification, negotiate a security algorithm (a shared algorithm), and use a shared security key (a shared key). In the following embodiments, an example in which the (E)AS and the UPF use a secure interaction and transmission manner with encryption and integrity protection is used for description.

Step S4: Generate a DL dummy IP packet or add an option to an IP header or a TCP header of DL data. A data area of the option includes request information. The request information refers to information related to the network information obtaining request. For example, the request information may include a target ID, a request type, and request parameters. The target ID refers to a current target from which network information is requested. The request type refers to a type of network information that is currently requested. The request parameters refer to some other parameters for requesting to obtain network information, and are determined according to requested network information.

There are the following cases:

If the (E)AS has to-be-transmitted DL data, the (E)AS may add an option to a header of a downlink IP packet, or if the downlink IP packet is a TCP packet, the (E)AS may add an option to a TCP packet header instead. A data part of the IP option or the TCP option includes a target ID (=a UPF), a request type, and request parameters.

If the (E)AS does not have any to-be-transmitted downlink data, the (E)AS may generate a DL dummy IP packet (for example, an ICMP ECHO, where a data part in the ICMP ECHO in this case does not have any specific content) or an empty TCP packet (only a TCP header does not have any user data).

In addition, the (E)AS may wait until there is a downlink data packet to continue to perform the following steps:

Step S5a: If an option is added to a DL IP header to transmit the network information obtaining request in the foregoing step S4, the (E)AS may transmit a DL IP data packet to the UPF. The DL IP data packet carries an option, and a data part of the IP option includes option-type, a target ID, a request type, request parameters, and a MAC. Option-type may use 30/94/158/222 mentioned above or use a specific value applied to the IANA in 3GPP. The target ID=the UPF. In addition, it is assumed that encryption and integrity protection needs to be performed for the interaction for determining network capability exposure in the foregoing step S3.

Step S5*b*: If the IP packet is a TCP packet, the (E)AS determines to use a TCP option to transmit the network information obtaining request. That is, an option is added to a DL TCP header to transmit the network information obtaining request in the foregoing step S4, the (E)AS may transmit a DL TCP data packet to the UPF. The DL TCP data packet carries an option, and a data part of the TCP option includes option-kind, a target ID, a request type, request parameters, and a MAC. Option-kind may use 253/254 mentioned above or use a specific value applied to the LANA in 3GPP, and may use one ExID (RFC 6994; it is the same below). Data processing in the TCP option is the same as that in Step S5*a*.

Step S6: After receiving the DL IP packet or the DL TCP packet transmitted by the (E)AS, the DL IP packet or the DL TCP packet is examined as follows:

First, it is determined whether the DL IP packet or the DL TCP packet includes an option. If there is an option, it is examined whether option-type (IPv4) or option-kind (TCP) is specified in the specification.

Second, it is examined whether a target ID in the DL IP packet or the DL TCP packet indicates a UPF. If yes, the UPF performs the following steps. If not, the UPF does not perform specific processing described in the embodiments of this disclosure on the DL IP packet or the DL TCP packet. The DL IP packet or the DL TCP packet continues to be transmitted to the RAN.

Third, if security encryption and integrity protection are performed, security verification is performed by using a MAC in the DL IP packet or the DL TCP packet. If security verification succeeds, the following steps continue to be performed. If security verification fails, the steps stop being performed.

Fourth, it is determined, according to the request type in the DL IP packet or the DL TCP packet, whether the UPF supports the request type. If the UPF supports the request type, the subsequent process is continued. Otherwise, the UPF performs no special processing. The subsequent steps are no longer performed.

Step S7: The UPF deletes a corresponding option in the DL IP or TCP packet, then transmits the DL IP or TCP packet in a downlink direction. That is, the UPF transmits the DL IP data packet (which does not include the foregoing option) to the UE through the RAN.

In FIG. 12, the UPF may record IP five-tuple information of the DL IP packet or DL TCP packet and an identification field in the IP header. When the UPF subsequently provides the network information to the (E)AS, the IP five-tuple information and the identification field in the IP header need to be recorded.

Step S8: If the UPF may and need to provide the network information at once, the UPF determines the size of the provided network information.

Step S8*a*: If the UPF determines that the length of the network information (including a MAC after integrity processing; it is the same below) is greater than a first length (assuming that the first length is 38 bytes), the UPF generates one ICMP ECHO packet, for example, generates an ICMP ECHO packet and a data part includes responsive information and may further include a target ID.

A source address (for example, a source IP address) of the generated ICMP ECHO packet may be set as a destination address (for example, a destination IP address) in the IP five-tuple information recorded in the foregoing step S7, and a destination address (for example, a destination IP address) of the ICMP ECHO packet may be set as a source address (for example, a source IP address) in the IP five-tuple information recorded in the foregoing step S7

In the ICMP ECHO packet, type/code=8/0, and the identifier uses a specific value, for example, a destination port number of a UDP or TCP packet in the IP five-tuple information recorded in the foregoing step S7. If the IP five-tuple information recorded in the foregoing step S7 is neither a UDP nor a TCP packet, an identifier of the ICMP ECHO packet may use the identification in the IP five-tuple information recorded in the foregoing step S7. For a sequence number of the ICMP ECHO packet, if the UPF has not been used, the UPF takes a specific value, for example, generates a random value.

In FIG. 12, to avoid using the same random value for different IP flows, the UPF may use the IP five-tuple information recorded in the foregoing step S7 to generate a random value. Then the UPF transmits responsive information including the network information obtained by the UPF to the (E)AS.

In FIG. 12, if the UPF determines that the length of the network information (including a MAC after integrity processing; it is the same below) is greater than a second length (assuming that the second length is 1472 bytes), the UPF needs to transmit the remaining network information. In this case, the Type/Code and the identifier in the ICMP ECHO packet may be kept consistent with those in the foregoing embodiments, and only the SN is sequentially incremented by 1 until the transmission of the obtained network information is completed.

The UPF may determine, within a predetermined time by using an ECHO reply, which ICMP ECHO packets are accurately received by the (E)AS. If the UPF does not receive a corresponding ECHO reply returned by the (E)AS, the previous ICMP ECHO packet may be retransmitted. In this case, a header of the ICMP ECHO packet still needs to be kept the same as that of an ECHO message to be retransmitted.

Step S8*b*: If the UPF determines that the length of the network information (including a MAC after integrity processing; it is the same below) is less than or equal to 38 bytes, the UPF may generate one UL dummy IP packet or an empty TCP packet. The UL dummy IP packet or the empty TCP packet carries an option. The option includes the responsive information.

For example, in the case of the UL dummy IP packet, the option may include option-type, a target ID, and responsive information. A source IP address of the UL dummy IP packet may be set as a destination IP address in the IP five-tuple information recorded in the foregoing step S7, and a destination IP address in the UL dummy IP packet may be set as a source IP address in the IP five-tuple information recorded in the foregoing step S7. Then an IP option is added. Option-type may take 30/94/158/222 mentioned above or use a specific value applied to the LANA in 3GPP. Then it is set that the target ID=the UPF, indicating that a response comes from the UPF. The responsive information includes the network information provided by the UPF. If encryption and integrity protection is activated, the responsive information further includes a MAC.

In addition, if the length of the network information is less than or equal to 38 bytes, the UPF may alternatively select to generate an empty UL TCP packet. A source IP address of the empty UL TCP packet may be set as the source IP address in the IP five-tuple information recorded in the foregoing step S7, and a destination IP address of the empty UL TCP packet may be set as the source IP address in the IP five-tuple information recorded in the foregoing step S7. A destination port of the empty UL TCP packet may be set as a TCP source port in the IP five-tuple information recorded in the foregoing step S7, and a source port of the empty UL TCP packet may be set as a TCP destination port in the IP five-tuple information recorded in the foregoing step S7. Then a TCP option is added. Option-kind may take 253/254 mentioned above or use a specific value applied to the IANA in 3GPP. In addition, ExID may be used. Then it is set that the target ID=the UPF, indicating that a response comes from the UPF. The responsive information includes the provided network information. If encryption and integrity protection is activated, the responsive information further includes a MAC.

In FIG. 12, if the UPF determines that the length of the network information (including a MAC after integrity processing; it is the same below) is less than or equal to 38 bytes and the UPF determines to wait for subsequent uplink data to carry the network information, the foregoing step S8 may be skipped.

In FIG. 12, if the UPF cannot provide the network information at once, for example, the UPF needs to interact with the SMF and obtains the network information provided by the SMF or other NFs from the SMF, the UPF may initiate interaction with the SMF, step S8 and the following step S10 are skipped.

Step S9: The UPF receives an uplink (UL) IP data packet transmitted by the UE through the RAN.

Step S10: When receiving the UL IP packet, the UPF may add option-type, the target ID, and the responsive information to data of an option of the UL IP packet. That is, the UPF adds the network information to be provided to the IP option of the uplink IP packet. Alternatively, if the UL IP packet is at the same time a UL TCP packet, the network information to be provided by the UPF may be added to a TCP option of the uplink TCP packet. In this case, transmitted content is the same as that in the foregoing step S8b.

Only one IP option is added, a checksum in the IP header needs to be recalculated, and all other information is kept unchanged. Alternatively, only one TCP option is added, a checksum in the TCP header needs to be recalculated, and all other information is kept unchanged.

In FIG. 12, if IP fragmentation is caused after the option is added, the UPF may continue to wait for subsequent uplink IP/TCP packets. Generally, most uplink TCP packets are only TCP ACK packets, and IP fragmentation is not caused by the addition of an option. If there is no available uplink IP/TCP packet, that is, if there is still no appropriate uplink IP/TCP packet for adding an option to transmit the network information after the UPF has waited for a particular time, the method in the foregoing step S8a may be used to generate an ICMP packet or the method in the foregoing step S8b is used to generate a UL IP dummy packet or an empty TCP packet to transmit the network information.

In FIG. 12, if the UPF currently has no network information that can be provided (for example, the UPF is still waiting for a response from the SMF), the UPF may perform no special processing on the uplink data received in the foregoing step S9 (for example, continues to upload the uplink data to the (E)AS). In this case, the foregoing step S10 is skipped. Similarly, before the foregoing step S11, the UPF may receive a plurality of pieces of uplink data in the foregoing step S9. In this case, the UPF performs no special processing (for example, continues to upload the uplink data to the (E)AS)

Step S11: The UPF interacts with an SMF to obtain the network information from another NF. When receiving the network information provided by the SMF or another NF, the UPF continues to perform the following steps:

Step S12a: If the UPF determines to provide the obtained network information to the (E)AS at once or the length of the network information is greater than 38 bytes, the method defined in the foregoing step S8a or step S8b may be used to generate an ICMP ECHO packet or a UL dummy packet or an empty TCP packet to carry an option. The option includes the responsive information. For example, the option may include option-type, the target ID, and the responsive information. The responsive information includes the network information obtained by the UPF from the SMF or another NF.

Step S12b: When the UPF determines to add the obtained network information to the uplink data packet for transmission to the (E)AS, the methods in the foregoing step S9 and step S10 may be used, that is, the UPF receives the UL IP data packet from the UE through the RAN. Next, step S12c is performed, so that the received UL IP or TCP data packet carries an option. Data in the option includes the responsive information, for example, may include option-type, the target ID, and the responsive information. The responsive information includes the network information obtained by the UPF from the SMF or another NF.

Step S13: The UE and the (E)AS may continue with uplink and downlink transmission of IP packets.

In FIG. 12, if a command (the network information obtaining request of the downlink data packet) transmitted by the (E)AS to the UPF includes requesting the UPF to report network information once every period of time (for example, a time interval may be set) or transmit updated network information to the (E)AS again if the network information is changed, before a time point is reached or when a network information status does not change, the UE and the (E)AS continue with IP communication. In this case, the UPF performs no specific processing.

In the request information in the downlink data packet transmitted by the (E)AS to the UPF, the EAS may specify a target (for example, the UPF, the SMF, or another NF) of which network information is to be obtained; and may further specify whether the UPF directly returns the network information to the EAS or transmits the network information to the EAS after processing after the network information is received; and may further specify whether to return the network information in a one-off process or a plurality of times. For the content included in the request information, reference may be made to related content in a control plane.

Step S14: When the time interval demanded by the (E)AS ends or the network information status is changed, the UPF needs to upload the updated network information again. In this case, the processing of step S15 (generating an ICMP ECHO packet or a UL dummy IP packet or an empty TCP packet with an option, and the option includes option-type, the target ID, and the responsive information), step S16 (the UPF receives the UL IP data packet transmitted from the UE through the RAN), and step S17 (the UL IP or TCP data packet carries an option, and the option includes the responsive information (option-type, the target ID, and the responsive information)) is the same as that of the foregoing step S12a, step S12b, and step S12c.

If encryption and integrity protection is enabled, the length of the network information includes the network information after processing+an integrity protection MAC. The MAC usually has 8 bytes or 4 bytes. In this case, a UL IP option, a UL dummy IP option or the UL TCP option can only transmit network information of 38−8/4=30/34 bytes. Data of the ICMP ECHO may transmit network information of 1472−8/4=1464/1468 bytes. The transmission efficiency of network information is improved 1468/34=43 or 1464/30=49 times.

Methods for obtaining network information by using UE, a RAN or a UPF are not defined in the 3GPP specification. The methods are separately provided in FIG. 13, FIG. 15, and FIG. 17 below. The basic ideas in the methods are similar. That is, network information may be obtained through an AMF or an SMF. For specific steps, reference may be made to the following embodiments.

Figure 13:
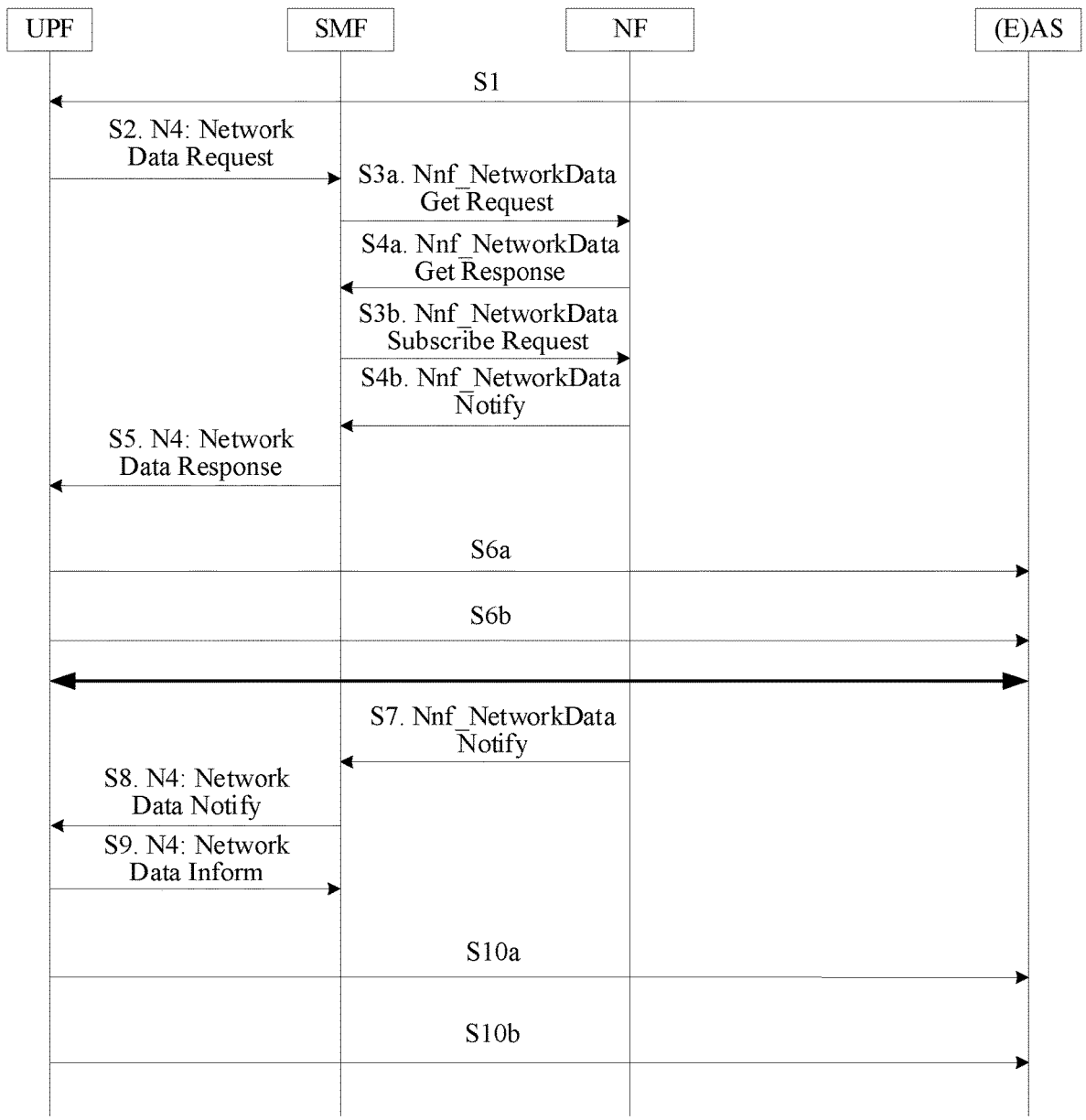
FIG. 13 is a schematic flowchart of obtaining network information by using a UPF according to an embodiment of this disclosure.

FIG. 13 is a schematic flowchart of obtaining network information by using a UPF according to an embodiment of this disclosure. FIG. 13 shows a process in which the UPF obtains network information and provides the network information to an (E)AS.

In FIG. 13, when the UPF can provide network information (for example, a measured delay of communication between the UPF and UE, and a total transmission rate of the UE) demanded by the (E)AS, the UPF does not need to interact with the SMF. When the UPF only needs to acquire network information on the SMF and provide the network information to the (E)AS, the following steps S3 (including steps S3a and S3b), S4 (including steps S4a and S4b), and S7 in FIG. 13 are skipped.

FIG. 13 only shows an example in which the UPF obtains network information from an NF through an SMF. In an actual case, the UPF may need to obtain network information from different NFs through the SMF, and gathers the network information to report the gathered network information to the (E)AS. That is, steps S2 to S5 in FIG. 13 may be performed a plurality of times, and only the NFs are different.

FIG. 13 may include the following steps:

Step S1: An example in which the (E)AS transmits a downlink IP data packet to the UPF is used for description. The downlink IP data packet carries an option (option-type, a target ID, a request type, request parameters, and a MAC). However, the embodiments of this disclosure are not limited thereto. For specific implementation, reference may be made to the foregoing steps S1 to S10 in FIG. 12.

Steps S2 to S5 correspond to foregoing step S11 in FIG. 12. Steps S2 to S5 are described below in detail.

Step S2: The UPF transmits an N4 message to the SMF to transmit a network data request. The N4 message requests the SMF to obtain a network data request currently demanded by the (E)AS. The N4 message may include a request type (that is, a type of currently requested network information, the foregoing request type) and a request parameter (the foregoing request parameters) in a network information obtaining request transmitted by the (E)AS to the UPF. That is, N4: Network Data Request (a request type and request parameters). The request parameters may include, for example, a valid time, times, and the like.

The N4 message is a new message name proposed in the embodiments of this disclosure. Therefore, the name of the message name and for example, parameters, of the N4 message may be defined in the 3GPP standard. However, a corresponding function of the N4 message is to request the SMF to obtain network information.

Step S3a: The corresponding SMF transmits Nnf_NetworkData Get Request (a request type and request parameters) to another NF (a target NF, that is, another NF from which the SMF currently requests to obtain network information), that is, an Nnf_NetworkData Get Request message includes a type of currently requested network information (a request type) and a request parameter.

Step S4a: The target NF returns Nnf_NetworkData Get Response (network data information) to the SMF in response to Nnf_NetworkData Get Request transmitted by the SMF. The network data information represents network information returned by the another NF to the SMF.

Nnf_NetworkData Get Request/Nnf_NetworkData Get Response in Step S3a and Step S4a are a one-off interaction process. That is, the request parameters currently transmitted by the (E)AS to the UPF neither specify that the UPF needs to return network information to the (E)AS once every period of time nor specify that the UPF needs to automatically return updated network information to the (E)AS if the network information is changed, for example, through the foregoing valid time, times, and/or the like.

Step S3b: The corresponding SMF transmits an Nnf_NetworkData Subscribe Request message (a request type and request parameters) to the target NF.

Step S4b: The target NF returns Nnf_NetworkData Notify (network data information) to the SMF in response to the Nnf_NetworkData Subscribe Request message transmitted by the SMF.

In Step S3b and Step S4b in FIG. 13, a current network information status is reviewed. If the network information status is changed, the target NF may continuously provide updated network information to the SMF.

The meanings and processing of parameters in Nnf_NetworkData Subscribe Request and Nnf_NetworkData Notify are similar to those in step S3a and step S4a in FIG. 13.

When receiving the Nnf_NetworkData Subscribe Request message, the target NF reports a current network information status to the SMF at once. The SMF may request related network analysis information from an NWDAF. Reference may be made to the foregoing 10 pieces of network information listed in FIG. 3. For the request and response messages as well as names and specific parameters thereof, reference may be made to 3GPP Protocol TS 23.288.

Nnf_NetworkData Subscribe Request and Nnf_NetworkData Notify are not a one-off interaction process. In the following step S7 in FIG. 13, when finding that network information is changed, the target NF continuously reports updated network information to the SMF. This process may last till the times and/or the valid time set by the SMF.

Step S5: When receiving the network information returned by the target NF, the SMF transfers the network information to the UPF through the N4 message, that is, transmits the N4 message to the UPF. The N4 message includes a network data response, that is, N4: Network Data Response (network data information).

When the network data request in Step S2 in FIG. 13 shows that network information needs to be continuously obtained, the SMF uses the manner of step S3b and step S4b in FIG. 13, whereas step S3a and step S4a in FIG. 13 may generally be used for obtaining some static data or configurations.

If network data information may be directly provided by the SMF, steps S3 and S4 in FIG. 13 are skipped.

In step S6a in FIG. 13, the UPF generates a data part of an ICMP ECHO packet or a UL dummy IP packet with an option (option-type, a target ID, and responsive information) or an empty TCP packet with an option (option-kind, a target ID, and responsive information), and returns the same to the (E)AS. The target ID=the UPF. The responsive information includes the network data information.

In step S6b in FIG. 13, the UPF may generate a UL IP data packet with an option (option-type, a target ID, and responsive information) or a TCP data packet with an option (option-kind, a target ID, and responsive information), and returns the same to the (E)AS. The target ID=the UPF. The responsive information includes the network data information.

For specific implementation of steps S6*a* and S6*b* in FIG. 13, reference may be made to the foregoing steps S12*a*, S12*b*, and S12*c* in FIG. 12.

For steps S7 to S9 in FIG. 13, reference may be made to the foregoing step S14 in FIG. 12. Step S7 to S9 in FIG. 13 are described below.

Step S7: When detecting that the network information is changed, the target NF transmits Nnf_NetworkData Notify (network data information) to the SMF to provide new network data information, that is, the updated network information to the SMF. The network data information refers to the updated network information. (For many examples, reference may be made to the 3GPP Protocol TS 23.288).

If network data information is directly provided by the SMF, step S7 in FIG. 13 is skipped.

Step S8: When receiving the network information returned by the target NF, the SMF transfers the network information to the UPF through the N4 message, that is, the SMF transmits the N4 message to the UPF. The N4 message includes a network data response, that is, N4: Network Data Response (network data information).

Step S9: The UPF acknowledges that the network information is received. That is, after receiving the network information or the updated network information transmitted by the SMF, the UPF transmits an N4 message to the SMF: Network Data Notify, to notify the SMF that the UPF has received the network information transmitted by the SMF, for example, N4: Network Data Notify acknowledge.

When the network data information transmitted by the SMF to the UPF is relatively large, because an N4 interface can transmit a very large amount of data in a one-off process, steps S8 and S9 in FIG. 13 do not need to be repeatedly performed.

For steps S10*a* to S10*b* in FIG. 13, reference may be made to the foregoing steps S15 to S17 in FIG. 12.

Figure 14:
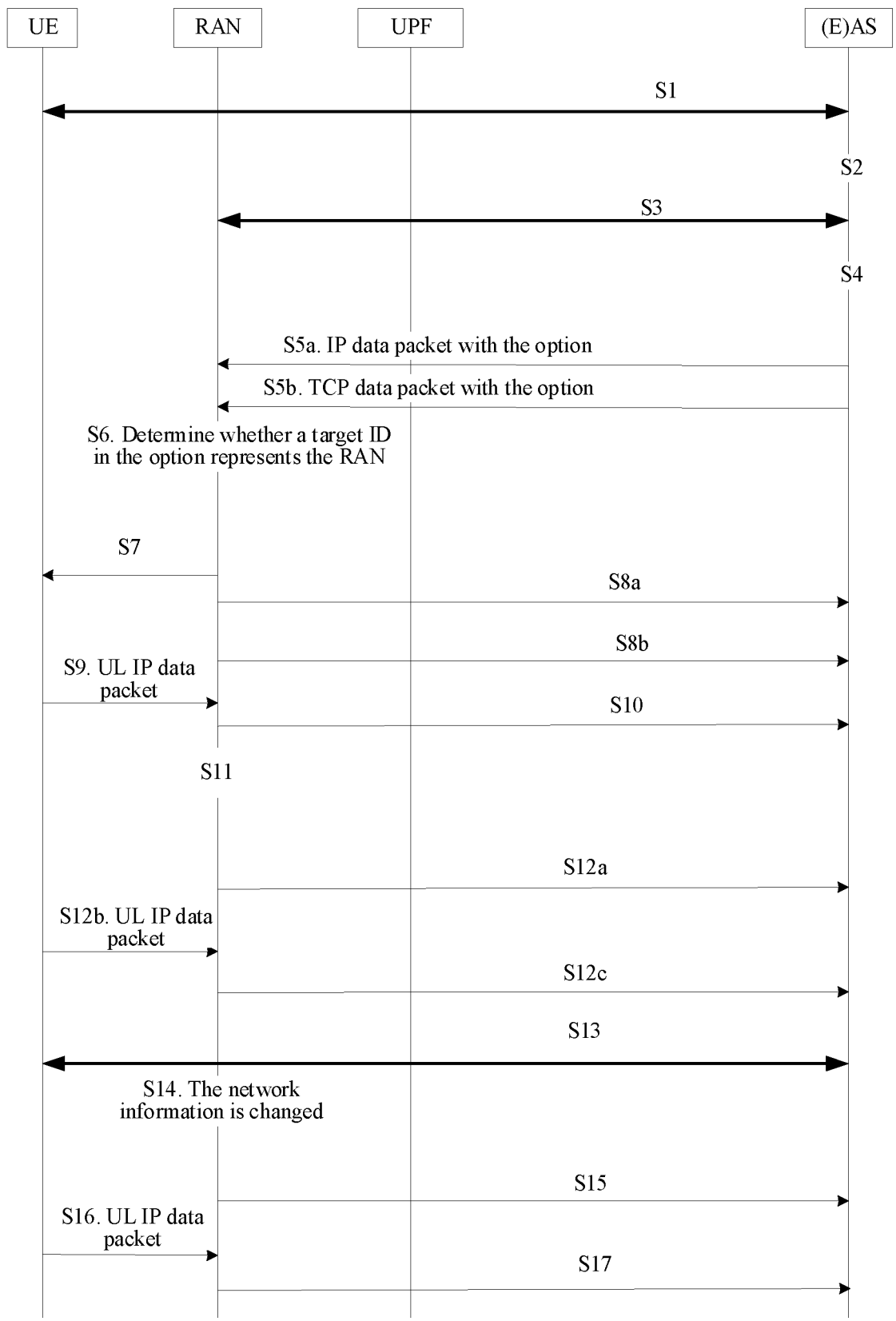
FIG. 14 is a schematic flowchart of an application server obtaining network information based on a RAN according to an embodiment of this disclosure.

FIG. 14 is a schematic flowchart of an application server obtaining network information based on a RAN according to an embodiment of this disclosure. FIG. 14 describes that the RAN uses ICMP/an IP option/a TCP option to implement transmission of requested network information. The embodiment of this disclosure may include the following steps:

Step S1: UE establishes a PDU session. An IP address is assigned to the UE. An IP connection is established with an (E)AS through the IP address. A transmitted IP flow may pass through a RAN and a UPF to reach the (E)AS.

Step S2: Assume that the (E)AS determines to request network information from the RAN, and transmits a network information obtaining request to the RAN through the UPF.

Step S3: This step is optional. The (E)AS and the RAN perform mutual verification, negotiate a security algorithm (a shared algorithm), and use a shared security key (a shared key). In the following embodiments, an example in which the (E)AS and the RAN use a secure interaction and transmission manner with encryption and integrity protection is used for description.

Step S4: Generate a DL dummy IP packet or add an option to an IP header or a TCP header of DL data. A data area of the option includes request information. The request information refers to information related to the network information obtaining request. For example, the request information may include a target ID, a request type, and request parameters. The target ID refers to a current target from which network information is requested. The request type refers to a type of network information that is currently requested. The request parameters refer to some other parameters for requesting to obtain network information, and are determined according to requested network information.

There are the following cases:

If the (E)AS has to-be-transmitted DL data, the (E)AS may add an option to a header of a downlink IP packet, or if the downlink IP packet is a TCP packet, the (E)AS may add an option to a TCP packet header instead. A data part of the IP option or the TCP option includes a target ID (=a RAN), a request type, and request parameters.

If the (E)AS does not have any to-be-transmitted downlink data, the (E)AS may generate a DL dummy IP packet (for example, an ICMP ECHO; a data part in the ICMP ECHO in this case does not have any specific content) or an empty TCP packet.

In addition, the (E)AS may wait until there is a downlink data packet to continue to perform the following steps:

Step S5*a*: If an option is added to a DL IP header to transmit the network information obtaining request in the foregoing step S4, the (E)AS may transmit a DL IP data packet to the RAN. The DL IP data packet carries an option, and a data part of the IP option includes option-type, a target ID, a request type, request parameters, and a MAC. Option-type may use 30/94/158/222 mentioned above or use a specific value applied to the IANA in 3GPP. The target ID=the RAN. In addition, it is assumed that encryption and integrity protection needs to be performed for the interaction for determining network capability exposure in the foregoing step S3.

Step S5*b*: If the IP packet is a TCP packet, the (E)AS determines to use a TCP option to transmit the network information obtaining request. That is, an option is added to a DL TCP header to transmit the network information obtaining request in the foregoing step S4, the (E)AS may transmit a DL TCP data packet to the RAN. The DL TCP data packet carries an option, and a data part of the TCP option includes option-kind, a target ID, a request type, request parameters, and a MAC. Option-kind may use 253/254 mentioned above or use a specific value applied to the LANA in 3GPP, and may use one ExID (RFC 6994; it is the same below). Data processing in the TCP option is the same as that in Step S5*a*.

Step S6: After receiving the DL IP packet or the DL TCP packet transmitted by the (E)AS, the RAN examines the DL IP packet or the DL TCP packet as follows:

First, it is determined whether the DL IP packet or the DL TCP packet includes an option. If there is an option, it is examined whether option-type (IPv4) or option-kind (TCP) is specified in the specification.

Second, it is examined whether a target ID in the DL IP packet or the DL TCP packet indicates a RAN. If yes, the RAN performs the following steps. If not, the RAN does not perform specific processing described in the embodiments of this disclosure on the DL IP packet or the DL TCP packet. The DL IP packet or the DL TCP packet continues to be transmitted to the UE.

Third, if security encryption and integrity protection are performed, security verification is performed by using a MAC in the DL IP packet or the DL TCP packet. If security verification succeeds, the following steps continue to be performed. If security verification fails, the steps stop being performed.

Fourth, it is determined, according to the request type in the DL IP packet or the DL TCP packet, whether the RAN supports the request type. If the RAN supports the request type, the subsequent process is continued. Otherwise, the RAN performs no special processing. The subsequent steps are no longer performed.

The DL IP packet or the DL TCP packet that is transmitted by the (E)AS and is received by the RAN is forwarded by the UPF. Therefore, after receiving the DL IP packet or the DL TCP packet, the UPF examines the DL IP packet or the DL TCP packet. In this case, the target ID points to the RAN. The UPF does not perform any special processing on the DL IP packet or the DL TCP packet and continues to transmit the DL IP packet or the DL TCP packet to the RAN.

Step S7: The RAN deletes a corresponding option in the DL IP or TCP packet, then transmits the DL IP or TCP packet in a downlink direction. That is, the RAN transmits the DL IP data packet (which does not include the foregoing option) to the UE.

In FIG. 14, the RAN may record IP five-tuple information of the DL IP packet or DL TCP packet and an identification field in the IP header. When the RAN subsequently provides the network information to the (E)AS, the IP five-tuple information and the identification field in the IP header need to be recorded.

Step S8: If the RAN may and need to provide the network information at once, the RAN determines the size of the provided network information.

Step S8a: If the RAN determines that the length of the network information (including a MAC after integrity processing; it is the same below) is greater than a first length (assuming that the first length is 38 bytes), the RAN generates one ICMP ECHO packet, for example, generates an ICMP ECHO packet and a data part includes responsive information and may further include a target ID.

A source address (for example, a source IP address) of the generated ICMP ECHO packet may be set as a destination address (for example, a destination IP address) in the IP five-tuple information recorded in the foregoing step S7, and a destination address (for example, a destination IP address) of the ICMP ECHO packet may be set as a source address (for example, a source IP address) in the IP five-tuple information recorded in the foregoing step S7

In the ICMP ECHO packet, type/code=8/0, and the identifier uses a specific value, for example, a destination port number of a UDP or TCP packet in the IP five-tuple information recorded in the foregoing step S7. If the IP five-tuple information recorded in the foregoing step S7 is neither a UDP nor a TCP packet, an identifier of the ICMP ECHO packet may use the identification in the IP five-tuple information recorded in the foregoing step S7. For a sequence number of the ICMP ECHO packet, if the RAN has not been used, the RAN takes a specific value, for example, generates a random value.

In FIG. 14, to avoid using the same random value for different IP flows, the RAN may use the IP five-tuple information recorded in the foregoing step S7 to generate a random value. Then the RAN transmits responsive information including the network information obtained by the UPF to the (E)AS.

In FIG. 14, if the RAN determined that the length of the network information (including a MAC after integrity processing; it is the same below) is greater than a second length (assuming that the second length is 1472 bytes), the RAN needs to transmit the remaining network information. In this case, the Type/Code and the identifier in the ICMP ECHO packet may be kept consistent with those in the foregoing embodiments, and only the SN is sequentially incremented by 1 until the transmission of the obtained network information is completed.

The RAN may determine, within a predetermined time by using an ECHO reply, which ICMP ECHO packets are accurately received by the (E)AS. If the RAN does not receive a corresponding ECHO reply returned by the (E)AS, the previous ICMP ECHO packet may be retransmitted. In this case, a header of the ICMP ECHO packet still needs to be kept the same as that of an ECHO message to be retransmitted.

Step S8b: If the RAN determines that the length of the network information (including a MAC after integrity processing; it is the same below) is less than or equal to 38 bytes, the RAN may generate one UL dummy IP packet or an empty TCP packet. The UL dummy IP packet or the empty TCP packet carries an option. The option includes the responsive information.

For example, in the case of the UL dummy IP packet, the option may include option-type, a target ID, and responsive information. A source IP address of the UL dummy IP packet may be set as a destination IP address in the IP five-tuple information recorded in the foregoing step S7, and a destination IP address in the UL dummy IP packet may be set as a source IP address in the IP five-tuple information recorded in the foregoing step S7. Then an IP option is added. Option-type may take 30/94/158/222 mentioned above or use a specific value applied to the IANA in 3GPP. Then it is set that the target ID=the RAN, indicating that a response comes from the RAN. The responsive information includes the network information provided by the RAN. If encryption and integrity protection is activated, the responsive information further includes a MAC.

In addition, if the length of the network information is less than or equal to 38 bytes, the RAN may alternatively select to generate an empty UL TCP packet. A source IP address of the empty UL TCP packet may be set as the source IP address in the IP five-tuple information recorded in the foregoing step S7, and a destination IP address of the empty UL TCP packet may be set as the source IP address in the IP five-tuple information recorded in the foregoing step S7. A destination port of the empty UL TCP packet may be set as a TCP source port in the IP five-tuple information recorded in the foregoing step S7, and a source port of the empty UL TCP packet may be set as a TCP destination port in the IP five-tuple information recorded in the foregoing step S7. Then a TCP option is added. Option-kind may take 253/254 mentioned above or use a specific value applied to the IANA in 3GPP. In addition, ExID may be used. Then it is set that the target ID=the RAN, indicating that a response comes from the RAN. The responsive information includes the provided network information. If encryption and integrity protection is activated, the responsive information further includes a MAC.

In FIG. 14, if the RAN determines that the length of the network information (including a MAC after integrity processing; it is the same below) is less than or equal to 38 bytes and the RAN determines to wait for subsequent uplink data to carry the network information, the foregoing step S8 may be skipped.

In FIG. 14, if the RAN cannot provide the network information at once, for example, the RAN needs to interact with the AMF and obtains the network information provided by the AMF or other NFs from the AMF, the RAN may initiate interaction with the AMF, step S8 and the following step S10 are skipped.

Step S9: The RAN receives the UL IP data packet transmitted by the UE.

Step S10: When receiving the UL IP packet, the RAN may add option-type, the target ID, and the responsive information to data of an option of the UL IP packet. That is, the RAN adds the network information to be provided to the IP option of the uplink IP packet. Alternatively, if the UL IP packet is at the same time a UL TCP packet, the network information to be provided by the RAN may be added to a TCP option of the uplink TCP packet. In this case, transmitted content is the same as that in the foregoing step S8*b*.

Only one IP option is added, a checksum in the IP header needs to be recalculated, and all other information is kept unchanged. Alternatively, only one TCP options as added, a checksum in the TCP header needs to be recalculated, and all other information is kept unchanged.

In FIG. 14, if IP fragmentation is caused after the option is added, the RAN may continue to wait for subsequent uplink IP/TCP packets. Generally, most uplink TCP packets are only TCP ACK packets, and IP fragmentation is not caused by the addition of an option. If there is no available uplink IP/TCP packet, that is, if there is still no appropriate uplink IP/TCP packet for adding an option to transmit the network information after the RAN has waited for a particular time, the method in the foregoing step S8*a* may be used to generate an ICMP packet or the method in the foregoing step S8*b* is used to generate a UL IP dummy packet or an empty TCP packet to transmit the network information.

In FIG. 14, if the RAN currently has no network information that can be provided (for example, the RAN is still waiting for a response from the AMF), the RAN may perform no special processing on the uplink data received in the foregoing step S9 (for example, continues to upload the uplink data to the (E)AS). In this case, the foregoing step S10 is skipped. Similarly, before the foregoing step S11, the RAN may receive a plurality of pieces of uplink data in the foregoing step S9. In this case, the UPF performs no special processing (for example, continues to upload the uplink data to the (E)AS)

Step S11: The RAN interacts with an AMF to obtain the network information from another NF. When receiving the network information provided by the AMF or another NF, the RAN continues to perform the following steps:

Step S12*a*: If the RAN determines to provide the obtained network information to the (E)AS at once or the length of the network information is greater than 38 bytes, the method defined in the foregoing step S8*a* or step S8*b* may be used to generate an ICMP ECHO packet or a UL dummy packet or an empty TCP packet to carry an option. The option includes the responsive information. For example, the option may include option-type, the target ID, and the responsive information. The responsive information includes the network information obtained by the RAN from the AMF or another NF.

Step S12*b*: When the RAN determines to add the obtained network information to the uplink data packet for transmission to the (E)AS, the methods in the foregoing step S9 and step S10 may be used, that is, the RAN receives the UL IP data packet from the UE. Next, step S12*c* is performed, so that the received UL IP or TCP data packet carries an option. Data in the option includes the responsive information, for example, may include option-type, the target ID, and the responsive information. The responsive information includes the network information obtained by the RAN from the AMF or another NF.

Step S13: The UE and the (E)AS may continue with uplink and downlink transmission of IP packets.

In FIG. 14, if a command (the network information obtaining request of the downlink data packet) transmitted by the (E)AS to the RAN includes requesting the RAN to report network information once every period of time (for example, a time interval may be set) or transmit updated network information to the (E)AS again if the network information is changed, before a time point is reached or when a network information status does not change, the UE and the (E)AS continue with IP communication. In this case, the RAN performs no specific processing.

In the request information in the downlink data packet transmitted by the (E)AS to the RAN, the (E)AS may specify a target (for example, the RAN, the AMF, or another NF) of which network information is to be obtained; and may further specify whether the RAN directly returns the network information to the (E)AS or transmits the network information to the (E)AS after processing after the network information is received; and may further specify whether to return the network information in a one-off process or a plurality of times. For the content included in the request information, reference may be made to related content in a control plane.

Step S14: When the time interval demanded by the (E)AS ends or the network information status is changed, the RAN needs to upload the updated network information again. In this case, the processing of step S15 (generating an ICMP ECHO packet or a UL dummy IP packet or an empty TCP packet with an option, and the option includes option-type, the target ID, and the responsive information), step S16 (the RAN receives the UL IP data packet transmitted from the UE), and step S17 (the UL IP or TCP data packet carries an option, and the option includes the responsive information (option-type, the target ID, and the responsive information)) in FIG. 14 is the same as that of the foregoing step S12*a*, step S12*b*, and step S12*c* in FIG. 14.

In the foregoing steps S8*b*, S10, S12*a*, S12*c*, S15, and S17 in FIG. 14, the UPF does not perform any special processing on a packet with option-type or option-kind in the uplink IP packet or TCP packet (defined as a packet for obtaining network information or network capability exposure) and continues to transmit the packet to the (E)AS.

Figure 15:
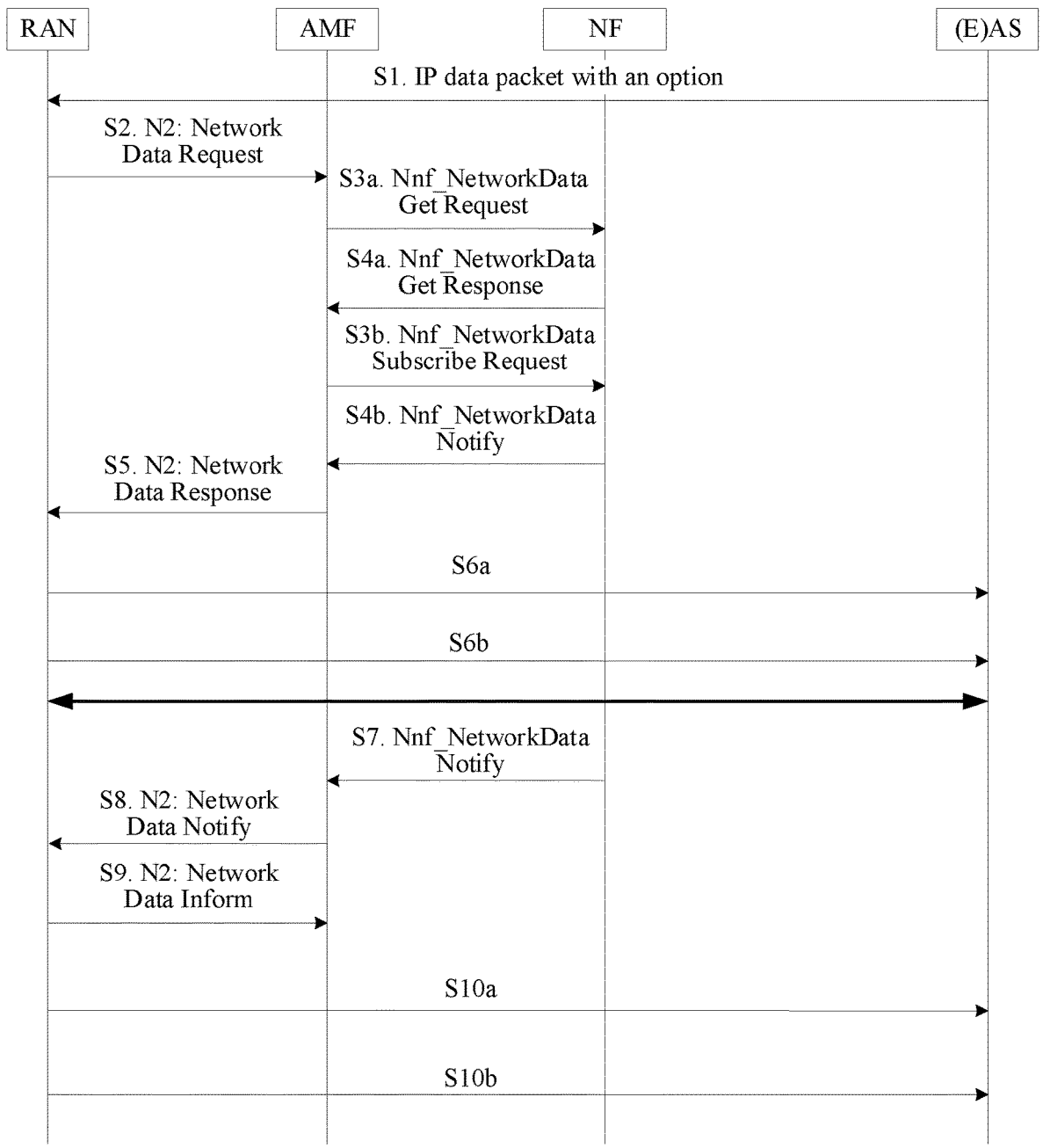
FIG. 15 is a schematic flowchart of obtaining network information by using a RAN according to an embodiment of this disclosure.

FIG. 15 is a schematic flowchart of obtaining network information by using a RAN according to an embodiment of this disclosure. FIG. 15 shows a process in which the RAN obtains network information and provides the network information to an (E)AS.

In FIG. 15, when the RAN can provide network information (for example, the RAN may measure a current transmission rate of a radio air interface, obtain a current quantity of UEs connected to a base station, and the like) demanded by the (E)AS, the RAN does not need to interact with the AMF. In addition, a lot of network capability exposure is related to an air interface on the RAN. Therefore, the RAN generally directly provides measurement data of the RAN as network information to the (E)AS without needing to requesting network information from the AMF.

When the RAN only needs to acquire network information on the AMF and provide the network information to the (E)AS, the following steps S3 (including steps S3*a* and S3*b*), S4 (including steps S4*a* and S4*b*), and S7 in FIG. 15 are skipped.

FIG. 15 only shows an example in which the RAN obtains network information from an NF through an AMF. In an actual case, the RAN may need to obtain network information from different NFs through the AMF, and gathers the network information to report the gathered network information to the (E)AS. That is, steps S2 to S5 in FIG. 15 may be performed a plurality of times, and only the NFs are different.

FIG. 15 may include the following steps:

Step S1: An example in which the (E)AS transmits a downlink IP data packet to the RAN is used for description. The downlink IP data packet carries an option (option-type, a target ID, a request type, request parameters, and a MAC). However, this disclosure is not limited thereto. For specific implementation, reference may be made to the foregoing steps S1 to S10 in FIG. 14.

Steps S2 to S5 correspond to foregoing step S11 in FIG. 14. Steps S2 to S5 are described below in detail.

Step S2: The RAN transmits an N2 message to the AMF to transmit a network data request. The N2 message requests the AMF to obtain a network data request currently demanded by the (E)AS. The N2 message may include a request type (that is, a type of currently requested network information, the foregoing request type) and a request parameter (the foregoing request parameters) in a network information obtaining request transmitted by the (E)AS to the RAN. That is, N2: Network Data Request (a request type and request parameters). The request parameters may include, for example, a valid time, times, and the like.

The N2 message is a new message name proposed in the embodiments of this disclosure. Therefore, the name of the message name and specific parameters of the N2 message may be defined in the 3GPP standard. However, a corresponding function of the N2 message is to request the AMF to obtain network information.

Step S3a: The corresponding AMF transmits Nnf_NetworkData Get Request (a request type and request parameters) to another NF (a target NF, that is, another NF from which the AMF currently requests to obtain network information), that is, an Nnf_NetworkData Get Request message includes a type of currently requested network information (a request type) and a request parameter.

Step S4a: The target NF returns Nnf_NetworkData Get Response (network data information) to the AMF in response to Nnf_NetworkData Get Request transmitted by the AMF. The network data information represents network information returned by the another NF to the AMF.

Nnf_NetworkData Get Request/Nnf_NetworkData Get Response in Step S3a and Step S4a are a one-off interaction process. That is, the request parameters currently transmitted by the (E)AS to the RAN neither specify that the RAN needs to return network information to the (E)AS once every period of time nor specify that the RAN needs to automatically return updated network information to the (E)AS if the network information is changed, for example, through the foregoing valid time, times, and/or the like.

Step S3b: The corresponding AMF transmits an Nnf_NetworkData Subscribe Request message (a request type and request parameters) to the target NF.

Step S4b: The target NF returns Nnf_NetworkData Notify (network data information) to the AMF in response to the Nnf_NetworkData Subscribe Request message transmitted by the AMF.

In Step S3b and Step S4b in FIG. 15, a current network information status is reviewed. If the network information status is changed, the target NF may continuously provide updated network information to the AMF.

The meanings and processing of parameters in Nnf_NetworkData Subscribe Request and Nnf_NetworkData Notify are similar to those in step S3a and step S4a in FIG. 15.

When receiving the Nnf_NetworkData Subscribe Request message, the target NF reports a current network information status to the AMF at once. The AMF may request related network analysis information from an NWDAF. Reference may be made to the foregoing 10 pieces of network information listed in FIG. 3. For the request and response messages as well as names and specific parameters thereof, reference may be made to 3GPP Protocol TS 23.288.

Nnf_NetworkData Subscribe Request and Nnf_NetworkData Notify are not a one-off interaction process. In the following step S7 in FIG. 15, when finding that network information is changed, the target NF continuously reports updated network information to the AMF. This process may last till the times and/or the valid time set by the AMF.

Step S5: When receiving the network information returned by the target NF, the AMF transfers the network information to the RAN through the N2 message, that is, transmits the N2 message to the RAN. The N2 message includes a network data response, that is, N2: Network Data Response (network data information).

When the network data request in Step S2 in FIG. 15 shows that network information needs to be continuously obtained, the AMF uses the manner of step S3b and step S4b in FIG. 15, whereas step S3a and step S4a in FIG. 15 may generally be used for obtaining some static data or configurations.

If network data information may be directly provided by the AMF, steps S3 and S4 in FIG. 15 are skipped.

In step S6a in FIG. 15, the RAN generates a data part of an ICMP ECHO packet or a UL dummy IP packet with an option (option-type, a target ID, and responsive information) or an empty TCP packet with an option (option-kind, a target ID, and responsive information), and returns the same to the (E)AS. The target ID=the RAN. The responsive information includes the network data information.

In step S6b in FIG. 15, the RAN may generate a UL IP data packet with an option (option-type, a target ID, and responsive information) or a TCP data packet with an option (option-kind, a target ID, and responsive information), and returns the same to the (E)AS. The target ID=the RAN. The responsive information includes the network data information.

For specific implementation of steps S6a and S6b in FIG. 15, reference may be made to the foregoing steps S12a, S12b, and S12c in FIG. 14.

For steps S7 to S9 in FIG. 15, reference may be made to the foregoing step S14 in FIG. 14. Step S7 to S9 in FIG. 15 are described below.

Step S7: When detecting that the network information is changed, the target NF transmits Nnf_NetworkData Notify (network data information) to the AMF to provide new network data information, that is, the updated network information to the AMF. The network data information refers to the updated network information. (For many examples, reference may be made to the 3GPP Protocol TS 23.288).

If network data information is directly provided by the AMF, step S7 in FIG. 15 is skipped.

Step S8: When receiving the network information returned by the target NF, the AMF transfers the network information to the RAN through the N2 message, that is, the AMF transmits the N2 message to the RAN. The N2 message includes a network data response, that is, N2: Network Data Response (network data information).

Step S9: The RAN acknowledges that the network information is received. That is, after receiving the network information or the updated network information transmitted by the AMF, the RAN transmits an N2 message to the AMF: Network Data Notify, to notify the AMF that the RAN has received the network information transmitted by the AMF, for example, N2: Network Data Notify acknowledge.

When the network data information transmitted by the AMF to the RAN is relatively large, because an N2 interface can transmit a very large amount of data in a one-off process, steps S8 and S9 in FIG. 15 do not need to be repeatedly performed.

For steps S10a to S10b in FIG. 15, reference may be made to the foregoing steps S15 to S17 in FIG. 14.

Figure 16:
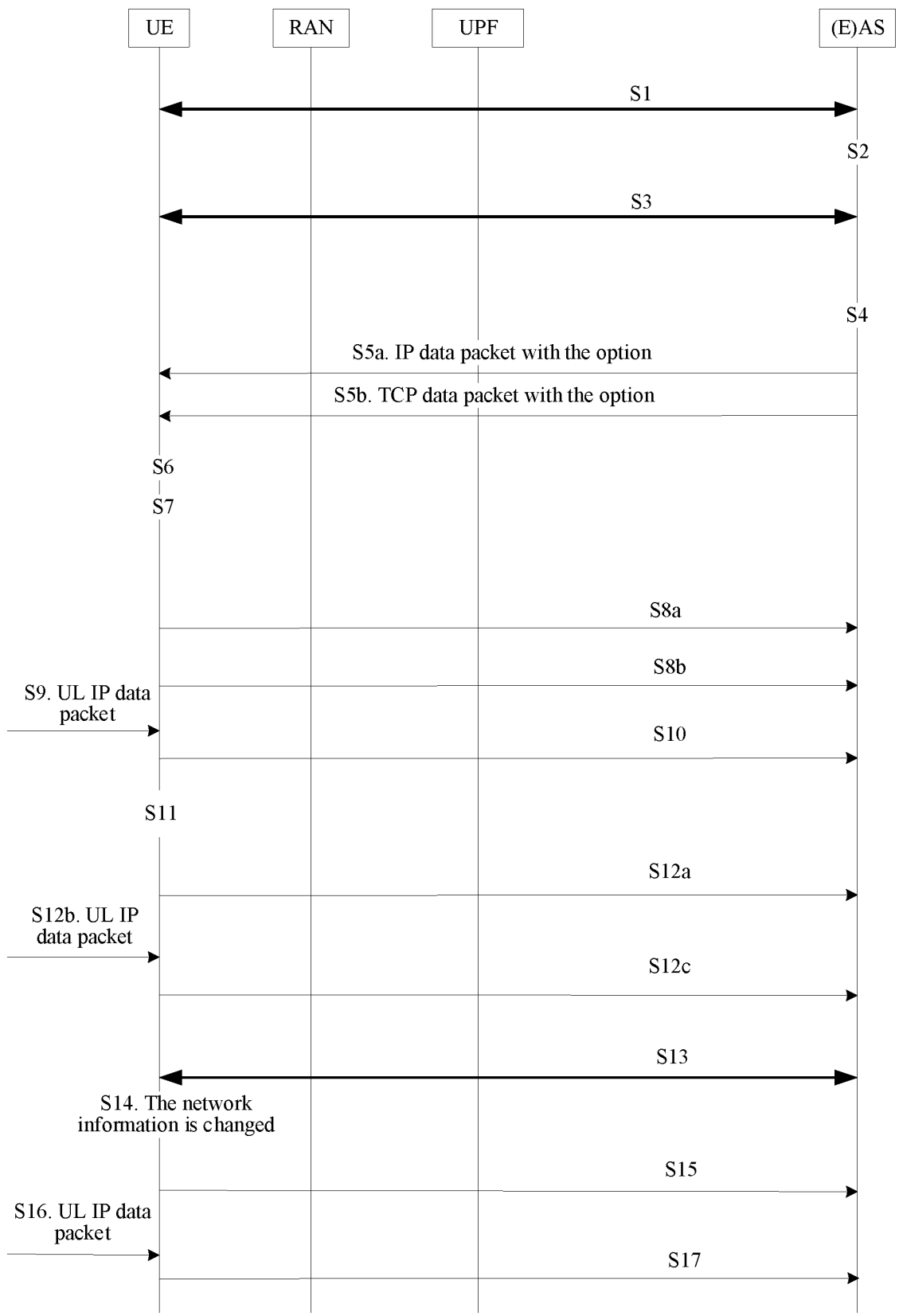
FIG. 16 is a schematic flowchart of an application server obtaining network information based on UE according to an embodiment of this disclosure.

FIG. 16 is a schematic flowchart of an application server obtaining network information based on UE according to an embodiment of this disclosure. FIG. 16 describes that the UE uses ICMP/an IP option/a TCP option to implement transmission of requested network information. FIG. 16 may include the following steps:

Step S1: UE establishes a PDU session. An IP address is assigned to the UE. An IP connection is established with an (E)AS through the IP address. A transmitted IP flow may pass through a RAN and a UPF to reach the (E)AS.

Step S2: Assume that the (E)AS determines to request network information from the UE, and transmits a network information obtaining request to the UE through the UPF and the RAN.

Step S3: This step is optional. The (E)AS and the UE perform mutual verification, negotiate a security algorithm (a shared algorithm), and use a shared security key (a shared key). In the following embodiments, an example in which the (E)AS and the UE use a secure interaction and transmission manner with encryption and integrity protection is used for description.

Step S4: Generate a DL dummy IP packet or add an option to an IP header or a TCP header of DL data. A data area of the option includes request information. The request information refers to information related to the network information obtaining request. For example, the request information may include a target ID, a request type, and request parameters.

There are the following cases:

If the (E)AS has to-be-transmitted DL data, the (E)AS may add an option to a header of a downlink IP packet, or if the downlink IP packet is a TCP packet, the (E)AS may add an option to a TCP packet header instead. A data part of the IP option or the TCP option includes a target ID (=a RAN), a request type, and request parameters.

If the (E)AS does not have any to-be-transmitted downlink data, the (E)AS may generate a DL dummy IP packet (for example, an ICMP ECHO; a data part in the ICMP ECHO in this case does not have any specific content) or an empty TCP packet.

In addition, the (E)AS may wait until there is a downlink data packet to continue to perform the following steps:

Step S5a: If an option is added to a DL IP header to transmit the network information obtaining request in the step S4 in FIG. 16, the (E)AS may transmit a DL IP data packet to the UE. The DL IP data packet carries an option, and a data part of the IP option includes option-type, a target ID, a request type, request parameters, and a MAC. Option-type may use 30/94/158/222 mentioned above or use a specific value applied to the IANA in 3GPP. The target ID=the UE. In addition, it is assumed that encryption and integrity protection needs to be performed for the interaction for determining network capability exposure in the foregoing step S3.

Step S5b: If the IP packet is a TCP packet, the (E)AS determines to use a TCP option to transmit the network information obtaining request. That is, an option is added to a DL TCP header to transmit the network information obtaining request in the foregoing step S4, the (E)AS may transmit a DL TCP data packet to the UE. The DL TCP data packet carries an option, and a data part of the TCP option includes option-kind, a target ID, a request type, request parameters, and a MAC. Option-kind may use 253/254 mentioned above or use a specific value applied to the LANA in 3GPP, and may use one ExID (RFC 6994; it is the same below). Data processing in the TCP option is the same as that in Step S5a.

Step S6: After receiving the DL IP packet or the DL TCP packet transmitted by the (E)AS, the UE examines the DL IP packet or the DL TCP packet as follows:

First, it is determined whether the DL IP packet or the DL TCP packet includes an option. If there is an option, it is examined whether option-type (IPv4) or option-kind (TCP) is specified in the specification.

Second, it is examined whether a target ID in the DL IP packet or the DL TCP packet indicates UE. If yes, the UE performs the following steps. If not, the UE does not perform specific processing described in the embodiments of this disclosure on the DL IP packet or the DL TCP packet. After the option is deleted from the DL IP packet or the DL TCP packet, the DL IP packet or the DL TCP packet continues to be transmitted to an upper layer.

Third, if security encryption and integrity protection are performed, security verification is performed by using a MAC in the DL IP packet or the DL TCP packet. If security verification succeeds, the following steps continue to be performed. If security verification fails, the steps stop being performed.

Fourth, it is determined, according to the request type in the DL IP packet or the DL TCP packet, whether the UE supports the request type. If the UE supports the request type, the subsequent process is continued. Otherwise, the UE performs no special processing. The subsequent steps are no longer performed.

The DL IP packet or the DL TCP packet that is transmitted by the (E)AS and is received by the UE is forwarded by the UPF and the RAN. Therefore, after receiving the DL IP packet or the DL TCP packet, the UPF and the RAN examine the DL IP packet or the DL TCP packet. In this case, the target ID points to the UE. The UPF and the RAN do not perform any special processing on the DL IP packet or the DL TCP packet.

Step S7: The UE deletes the corresponding option in the DL IP or TCP packet, and then transfers the DL IP or TCP packet to the upper layer.

In FIG. 16, the UE may record IP five-tuple information of the DL IP packet or DL TCP packet and an identification field in the IP header. When the UE subsequently provides the network information to the (E)AS, the IP five-tuple information and the identification field in the IP header need to be recorded.

Step S8: If the UE may and need to provide the network information at once, the UE determines the size of the provided network information.

Step S8a: If the UE determines that the length of the network information (including a MAC after integrity processing; it is the same below) is greater than a first length (assuming that the first length is 38 bytes), the UE generates one ICMP ECHO packet, for example, generates an ICMP ECHO packet and a data part includes responsive information and may further include a target ID.

A source address (for example, a source IP address) of the generated ICMP ECHO packet may be set as a destination address (for example, a destination IP address) in the IP five-tuple information recorded in the foregoing step S7, and a destination address (for example, a destination IP address) of the ICMP ECHO packet may be set as a source address (for example, a source IP address) in the IP five-tuple information recorded in the foregoing step S7

In the ICMP ECHO packet, type/code=8/0, and the identifier uses a specific value, for example, a destination port number of a UDP or TCP packet in the IP five-tuple information recorded in the foregoing step S7. If the IP five-tuple information recorded in the foregoing step S7 is neither a UDP nor a TCP packet, an identifier of the ICMP ECHO packet may use the identification in the IP five-tuple information recorded in the foregoing step S7. For a sequence number of the ICMP ECHO packet, if the UE has not been used, the UE takes a specific value, for example, generates a random value.

In FIG. 16, to avoid using the same random value for different IP flows, the UE may use the IP five-tuple information recorded in the foregoing step S7 to generate a random value. Then the UE transmits responsive information including the network information obtained by the UPF to the (E)AS.

In FIG. 16, if the UE determined that the length of the network information (including a MAC after integrity processing; it is the same below) is greater than a second length (assuming that the second length is 1472 bytes), the UE needs to transmit the remaining network information. In this case, the Type/Code and the identifier in the ICMP ECHO packet may be kept consistent with those in the foregoing embodiments, and only the SN is sequentially incremented by 1 until the transmission of the obtained network information is completed.

The UE may determine, within a predetermined time by using an ECHO reply, which ICMP ECHO packets are accurately received by the (E)AS. If the UE does not receive a corresponding ECHO reply returned by the (E)AS, the previous ICMP ECHO packet may be retransmitted. In this case, a header of the ICMP ECHO packet still needs to be kept the same as that of an ECHO message to be retransmitted.

Step S8b: If the UE determines that the length of the network information (including a MAC after integrity processing; it is the same below) is less than or equal to 38 bytes, the UE may generate one UL dummy IP packet or an empty TCP packet. The UL dummy IP packet or the empty TCP packet carries an option. The option includes the responsive information.

For example, in the case of the UL dummy IP packet, the option may include option-type, a target ID, and responsive information. A source IP address of the UL dummy IP packet may be set as a destination IP address in the IP five-tuple information recorded in the foregoing step S7, and a destination IP address in the UL dummy IP packet may be set as a source IP address in the IP five-tuple information recorded in the foregoing step S7. Then an IP option is added. Option-type may take 30/94/158/222 mentioned above or use a specific value applied to the LANA in 3GPP. Then it is set that the target ID=the UE, indicating that a response comes from the UE. The responsive information includes the network information provided by the RAN. If encryption and integrity protection is activated, the responsive information further includes a MAC.

In addition, if the length of the network information is less than or equal to 38 bytes, the UE may alternatively select to generate an empty UL TCP packet. A source IP address of the empty UL TCP packet may be set as the source IP address in the IP five-tuple information recorded in the foregoing step S7, and a destination IP address of the empty UL TCP packet may be set as the source IP address in the IP five-tuple information recorded in the foregoing step S7. A destination port of the empty UL TCP packet may be set as a TCP source port in the IP five-tuple information recorded in the foregoing step S7, and a source port of the empty UL TCP packet may be set as a TCP destination port in the IP five-tuple information recorded in the foregoing step S7. Then a TCP option is added. Option-kind may take 253/254 mentioned above or use a specific value applied to the IANA in 3GPP. In addition, ExID may be used. Then it is set that the target ID=the UE, indicating that a response comes from the UE. The responsive information includes the provided network information. If encryption and integrity protection is activated, the responsive information further includes a MAC.

In FIG. 16, if the UE determines that the length of the network information (including a MAC after integrity processing; it is the same below) is less than or equal to 38 bytes and the UE determines to wait for subsequent uplink data to carry the network information, the foregoing step S8 may be skipped.

In FIG. 16, if the UE cannot provide the network information at once, for example, the UE needs to interact with the AMF and obtains the network information provided by the AMF or other NFs from the AMF, the UE may initiate interaction with the AMF, step S8 and the following step S10 are skipped.

Step S9: The UE receives the UL IP data packet.

Step S10: When receiving the UL IP packet, the UE may add option-type, the target ID, and the responsive information to data of an option of the UL IP packet. That is, the UE adds the network information to be provided to the IP option of the uplink IP packet. Alternatively, if the UL IP packet is at the same time a UL TCP packet, the network information to be provided by the RAN may be added to a TCP option of the uplink TCP packet. In this case, transmitted content is the same as that in the foregoing step S8b.

Only one IP option is added, a checksum in the IP header needs to be recalculated, and all other information is kept unchanged. Alternatively, only one TCP options as added, a checksum in the TCP header needs to be recalculated, and all other information is kept unchanged.

In FIG. 16, if IP fragmentation is caused after the option is added, the UE may continue to wait for subsequent uplink IP/TCP packets. Generally, most uplink TCP packets are only TCP ACK packets, and IP fragmentation is not caused by the addition of an option. If there is no available uplink IP/TCP packet, that is, if there is still no appropriate uplink IP/TCP packet for adding an option to transmit the network information after the UE has waited for a particular time, the method in the foregoing step S8a may be used to generate an ICMP packet or the method in the foregoing step S8b is used to generate a UL IP dummy packet or an empty TCP packet to transmit the network information.

In FIG. 16, if the UE currently has no network information that can be provided (for example, the UE is still waiting for a response from the AMF), the UE may perform no special processing on the uplink data received in the foregoing step S9 (for example, continues to upload the uplink data to the (E)AS). In this case, the foregoing step S10 is skipped. Similarly, before the foregoing step S11, the UE may receive a plurality of pieces of uplink data in the foregoing step S9. In this case, the UPF performs no special processing (for example, continues to upload the uplink data to the (E)AS)

Step S11: The UE interacts with an AMF to obtain the network information from another NF. When receiving the network information provided by the AMF or another NF, the UE continues to perform the following steps:

Step S12a: If the UE determines to provide the obtained network information to the (E)AS at once or the length of the network information is greater than 38 bytes, the method defined in the foregoing step S8a or step S8b may be used to generate an ICMP ECHO packet or a UL dummy packet or an empty TCP packet to carry an option. The option includes the responsive information. For example, the option may include option-type, the target ID, and the responsive information. The responsive information includes the network information obtained by the UE from the AMF or another NF.

Step S12b: When the UE determines to add the obtained network information to the uplink data packet for transmission to the (E)AS, the methods in the foregoing step S9 and step S10 may be used, that is, the UE receives the UL IP data packet. Next, step S12c is performed, so that the received UL IP or TCP data packet carries an option. Data in the option includes the responsive information, for example, may include option-type, the target ID, and the responsive information. The responsive information includes the network information obtained by the UE from the AMF or another NF.

Step S13: The UE and the (E)AS may continue with uplink and downlink transmission of IP packets.

In the embodiments of this disclosure, if a command (the network information obtaining request of the downlink data packet) transmitted by the (E)AS to the UE includes requesting the UE to report network information once every period of time (for example, a time interval may be set) or transmit updated network information to the (E)AS again if the network information is changed, before a time point is reached or when a network information status does not change, the UE and the (E)AS continue with IP communication. In this case, the UE performs no specific processing.

In the request information in the downlink data packet transmitted by the (E)AS to the UE, the (E)AS may specify a target (for example, the UE, the AMF, or another NF) of which network information is to be obtained; and may further specify whether the UE directly returns the network information to the (E)AS or transmits the network information to the (E)AS after processing after the network information is received; and may further specify whether to return the network information in a one-off process or a plurality of times. For the content included in the request information, reference may be made to related content in a control plane.

Step S14: When the time interval demanded by the (E)AS ends or the network information status is changed, the UE needs to upload the updated network information again. In this case, the processing of step S15 (generating an ICMP ECHO packet or a UL dummy IP packet or an empty TCP packet with an option, and the option includes option-type, the target ID, and the responsive information), step S16 (the UE receives the UL IP data packet), and step S17 (the UL IP or TCP data packet carries an option, and the option includes the responsive information (option-type, the target ID, and the responsive information)) in FIG. 16 is the same as that of the foregoing step S12a, step S12b, and step S12c in FIG. 16.

In the foregoing steps S5a and S5b in FIG. 16, the UPF and the RAN also need to examine whether the target ID points to themselves. When finding that the target ID does not point to themselves, the UPF and the RAN continue to transmit the packet to the UE. In the foregoing steps S8b, S10, S12a, S12c, S15, and S17 in FIG. 16, the UPF and the RAN do not perform any special processing on a packet with option-type or option-kind in the uplink IP packet or TCP packet (defined as a packet for obtaining network information or network capability exposure) and continue to transmit the packet to the (E)AS.

In addition, the UL IP packet in the foregoing step S9, S12 (including S12a, S12b, and S12c), and S16 in FIG. 16 refers to an uplink data packet that is received by the UE and is to be transmitted to the (E)AS.

Figure 17:
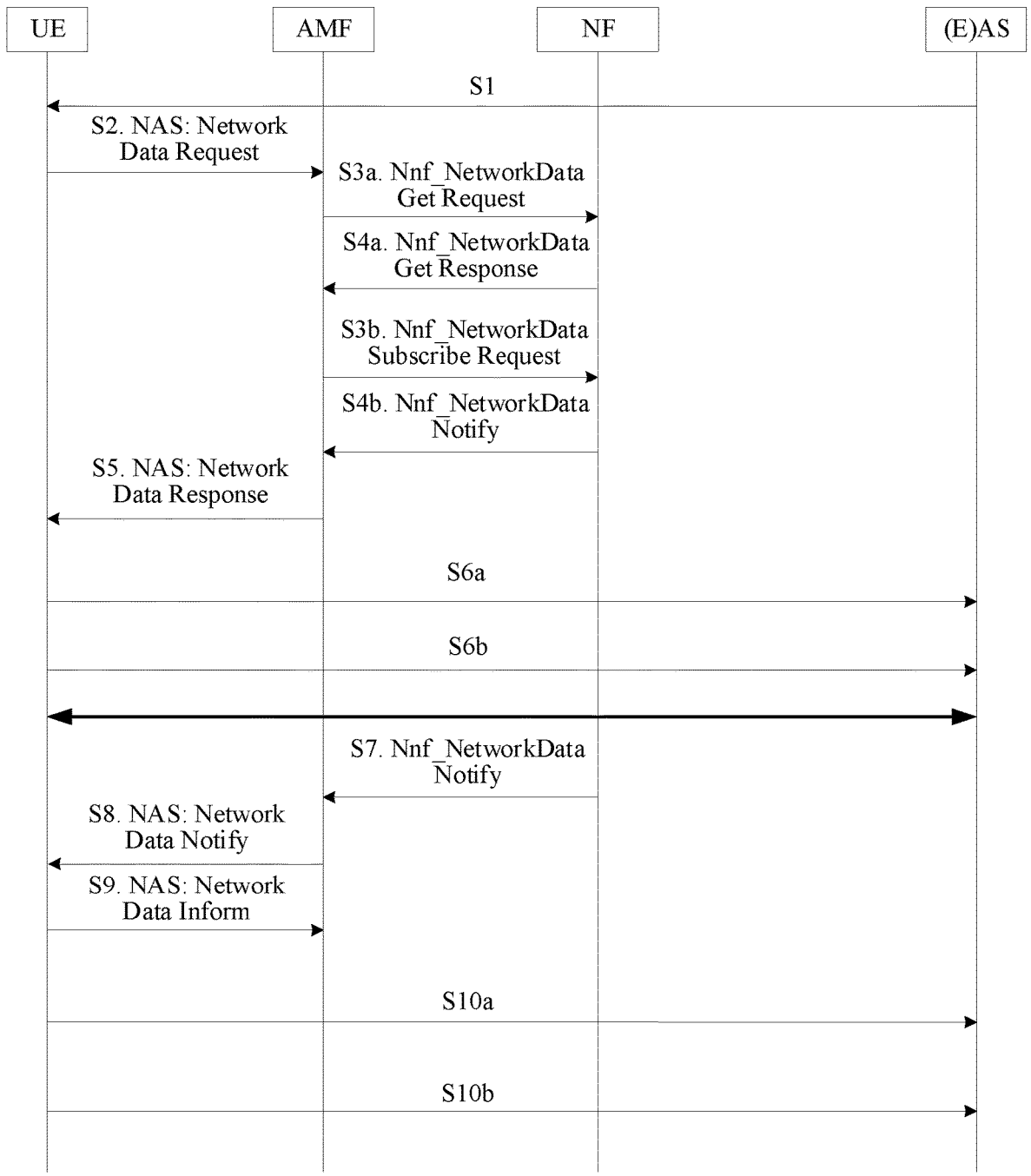
FIG. 17 is a schematic flowchart of obtaining network information by using UE according to an embodiment of this disclosure.

FIG. 17 is a schematic flowchart of obtaining network information by using UE according to an embodiment of this disclosure. FIG. 17 shows a process in which the UE obtains network information and provides the network information to an (E)AS.

In FIG. 17, when the UE can provide network information (for example, when the UE previously interacts with the AMF, the SMF, the PCF, and the RAN, the UE already has some network information. The network information may include, for example, a transmission delay between the UE and the RAN and a total transmission delay of the UE) demanded by the (E)AS, the UE does not need to interact with the AMF. When the UE only needs to acquire network information on the AMF and provide the network information to the (E)AS, the following steps S3 (including steps S3a and S3b), S4 (including steps S4a and S4b), and S7 in FIG. 17 are skipped.

FIG. 17 only shows an example in which the UE obtains network information from an NF through an AMF. In an actual case, the UE may need to obtain network information from different NFs through the AMF, and gathers the network information to report the gathered network information to the (E)AS. That is, steps S2 to S5 in FIG. 17 may be performed a plurality of times, and only the NFs are different.

FIG. 17 may include the following steps:

Step S1: An example in which the (E)AS transmits a downlink IP data packet to the UE through the UPF and the RAN is used for description. The downlink IP data packet carries an option (option-type, a target ID, a request type, request parameters, and a MAC). However, the embodiments of this disclosure are not limited thereto. For specific implementation, reference may be made to the foregoing steps S1 to S10 in FIG. 16.

Steps S2 to S5 correspond to foregoing step S11 in FIG. 16. Steps S2 to S5 are described below in detail.

Step S2: The UE transmits a Non-Access Stratum (NAS) message to the AMF to transmit a network data request. The NAS message requests the AMF to obtain a network data request currently demanded by the (E)AS. The NAS message may include a request type (that is, a type of currently requested network information, the foregoing request type) and a request parameter (the foregoing request parameters) in a network information obtaining request transmitted by the (E)AS to the UE, that is, NAS: Network Data Request (a request type and request parameters). The request parameters may include, for example, a valid time, times, and the like.

The NAS message is a new message name proposed in the embodiments of this disclosure. Therefore, the name of the message name and for example, parameters, of the NAS message may be defined in the 3GPP standard. However, a corresponding function of the NAS message is to request the AMF to obtain network information.

Step S3a: The corresponding AMF transmits Nnf_NetworkData Get Request (a request type and request parameters) to another NF (a target NF, that is, another NF from which the AMF currently requests to obtain network information), that is, an Nnf_NetworkData Get Request message includes a type of currently requested network information (a request type) and a request parameter.

Step S4*a*: The target NF returns Nnf_NetworkData Get Response (network data information) to the AMF in response to Nnf_NetworkData Get Request transmitted by the AMF. The network data information represents network information returned by the another NF to the AMF.

For example, assuming that the target NF is a UDM, the AMF may obtain some subscription data of a user from the UDM, provides a part of the subscription data to the UE, and then provides the subscription data to the (E)AS.

Nnf_NetworkData Get Request/Nnf_NetworkData Get Response in Step S3*a* and Step S4*a* are a one-off interaction process. That is, the request parameters currently transmitted by the (E)AS to the UE neither specify that the UE needs to return network information to the (E)AS once every period of time nor specify that the UE needs to automatically return updated network information to the (E)AS if the network information is changed, for example, through the foregoing valid time, times, and/or the like.

Step S3*b*: The corresponding AMF transmits an Nnf_NetworkData Subscribe Request message (a request type and request parameters) to the target NF.

Step S4*b*: The target NF returns Nnf_NetworkData Notify (network data information) to the AMF in response to the Nnf_NetworkData Subscribe Request message transmitted by the AMF.

In Step S3*b* and Step S4*b* in FIG. 17, a current network information status is reviewed. If the network information status is changed, the target NF may continuously provide updated network information to the AMF.

The meanings and processing of parameters in Nnf_NetworkData Subscribe Request and Nnf_NetworkData Notify are similar to those in step S3*a* and step S4*a* in FIG. 17.

When receiving the Nnf_NetworkData Subscribe Request message, the target NF reports a current network information status to the AMF at once. The AMF may request related network analysis information from an NWDAF. Reference may be made to the foregoing 10 pieces of network information listed in FIG. 3. For the request and response messages as well as names and specific parameters thereof, reference may be made to 3GPP Protocol TS 23.288.

Nnf_NetworkData Subscribe Request and Nnf_NetworkData Notify are not a one-off interaction process. In the following step S7 in FIG. 17, when finding that network information is changed, the target NF continuously reports updated network information to the AMF. This process may last till the times and/or the valid time set by the AMF.

Step S5: When receiving the network information returned by the target NF, the AMF transfers the network information to the UE through the NAS message, that is, transmits the NAS message to the UE. The NAS message includes a network data response, that is, NAS: Network Data Response (network data information).

When the network data request in Step S2 in FIG. 17 shows that network information needs to be continuously obtained, the AMF uses the manner of step S3*b* and step S4*b* in FIG. 17, whereas step S3*a* and step S4*a* in FIG. 17 may generally be used for obtaining some static data or configurations.

If network data information may be directly provided by the AMF, steps S3 and S4 in FIG. 17 are skipped.

In step S6*a* in FIG. 17, the UE generates a data part of an ICMP ECHO packet or a UL dummy IP packet with an option (option-type, a target ID, and responsive information) or an empty TCP packet with an option (option-kind, a target ID, and responsive information), and returns the same to the (E)AS. The target ID=the UE. The responsive information includes the network data information.

In step S6*b* in FIG. 17, the UE may generate a UL IP data packet with an option (option-type, a target ID, and responsive information) or a TCP data packet with an option (option-kind, a target ID, and responsive information), and returns the same to the (E)AS. The target ID=the UE. The responsive information includes the network data information.

For specific implementation of steps S6*a* and S6*b* in FIG. 17, reference may be made to the foregoing steps S12*a*, S12*b*, and S12*c* in FIG. 16.

For steps S7 to S9 in FIG. 17, reference may be made to the foregoing step S14 in FIG. 16. Step S7 to S9 in FIG. 17 are described below.

Step S7: When detecting that the network information is changed, the target NF transmits Nnf_NetworkData Notify (network data information) to the AMF to provide new network data information, that is, the updated network information to the AMF. The network data information refers to the updated network information. (For many examples, reference may be made to the 3GPP Protocol TS 23.288).

If network data information is directly provided by the AMF, step S7 in FIG. 17 is skipped.

Step S8: When receiving the network information returned by the target NF, the AMF transfers the network information to the UE through the NAS message, that is, the AMF transmits the NAS message to the UE. The NAS message includes a network data response, that is, NAS: Network Data Response (network data information).

In this case, if the UE is in a connection management-IDLE (CM-IDLE, when the UE is in a CM-IDLE state, there is neither an N2 connection nor an N3 connection for the terminal) state, the AMF may need to initiate a Network triggered service request process (see Section 4.2.3.3 of 3GPP Process TS 23.502). The AMF performs step S8 after the UE and the AMF have established a signaling connection.

Step S9: The UE acknowledges that the network information is received. That is, after receiving the network information or the updated network information transmitted by the AMF, the UE transmits a NAS message to the AMF: Network Data Notify, to notify the AMF that the RAN has received the network information transmitted by the AMF, for example, NAS: Network Data Notify acknowledge.

When the network data information transmitted by the AMF to the UE is relatively large and cannot be transmitted to the UE in a one-off process in step S8, steps S8 and S9 in FIG. 17 may perform a plurality of times (for similar processing, see Section 4.2.4.3 of 3GPP Process TS 23.502).

Similarly, when the network data information transmitted by the AMF to the UE is relatively large and cannot be transmitted to the UE in a one-off process in step S5 in FIG. 17, a signaling interaction manner similar to steps S8 and S9 in FIG. 17 may be used to transfer the remaining network data information to the UE.

For steps S10*a* to S10*b* in FIG. 17, reference may be made to the foregoing steps S15 to S17 in FIG. 16.

Figure 18:
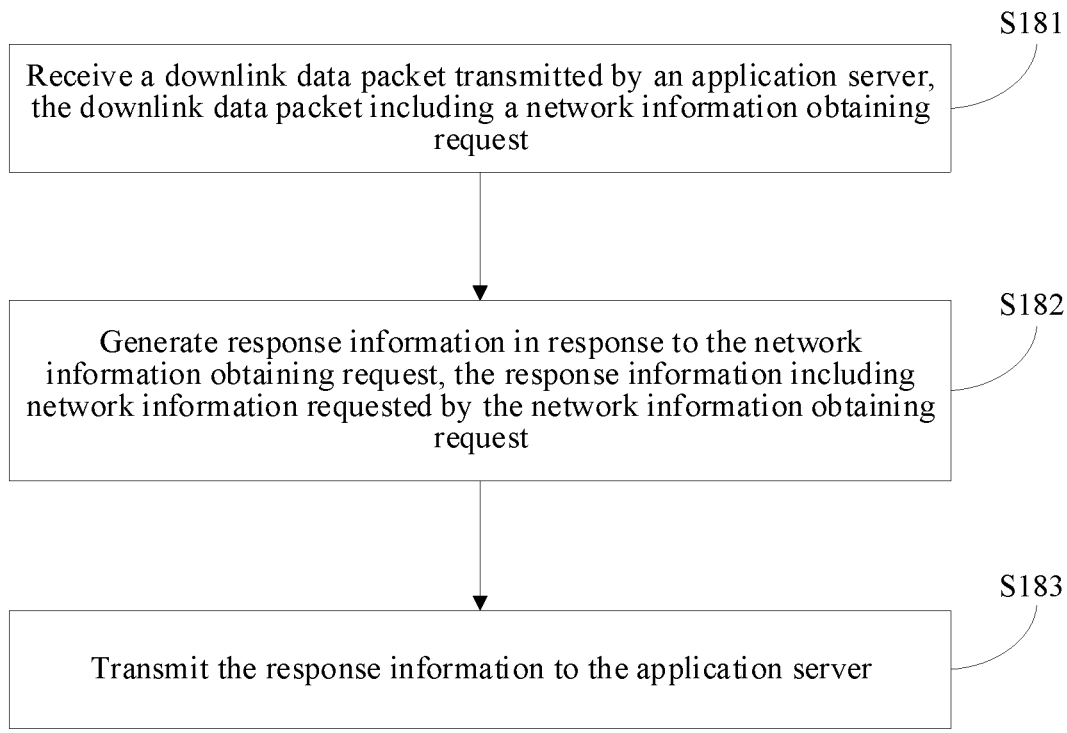
FIG. 18 is a schematic flowchart of a method for implementing network capability exposure according to an embodiment of this disclosure.

FIG. 18 is a schematic flowchart of a method for implementing network capability exposure according to an embodiment of this disclosure. The method in FIG. 18 may be performed by a target user plane node, for example, any one of UE, a RAN, or a UPF. As shown in FIG. 18, the method provided in the embodiments of this disclosure may include the following steps:

Step S181: Receive a downlink data packet transmitted by an application server, the downlink data packet including a network information obtaining request.

In some embodiments, the method may further include recording Internet Protocol five-tuple information of the downlink data packet and an identification field of an Internet Protocol header of the downlink data packet.

Step S182: Generate responsive information in response to the network information obtaining request, the responsive information including network information requested by the network information obtaining request.

Step S183: Transmit the responsive information to the application server.

Figure 19:
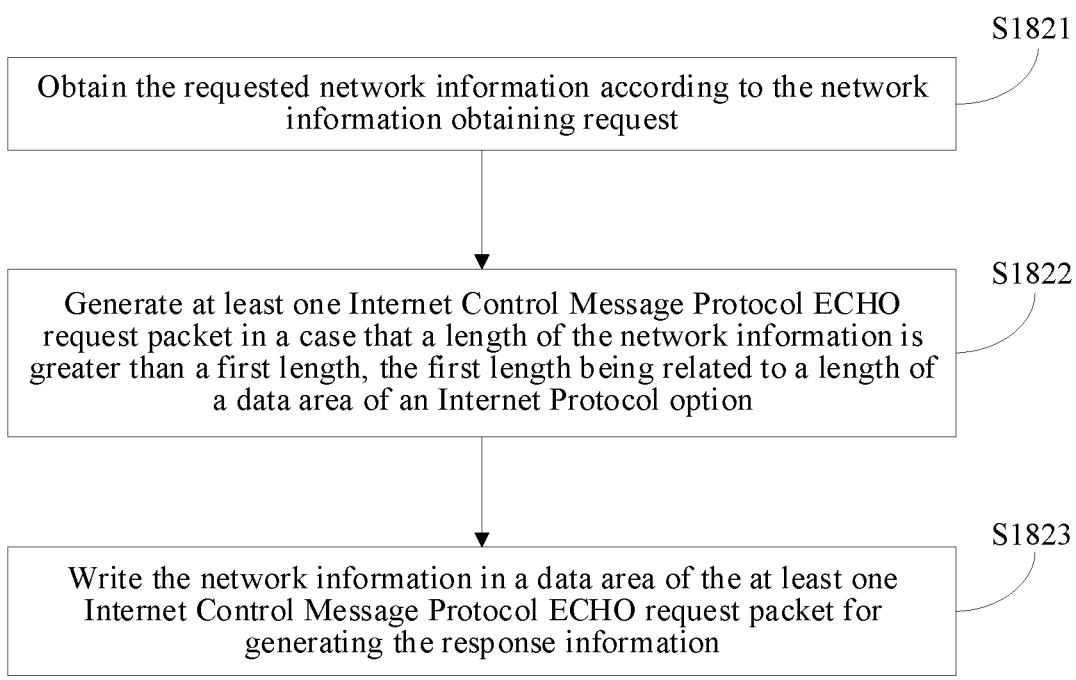
FIG. 19 is a schematic diagram of a processing process in an embodiment of step S182 in FIG. 18.

FIG. 19 is a schematic diagram of a processing process in an embodiment of step S182 in FIG. 18. As shown in FIG. 19, in the embodiments of this disclosure, the foregoing step S182 may further include the following steps:

Step S1821: Obtain the requested network information according to the network information obtaining request.

In some embodiments, the obtaining the requested network information according to the network information obtaining request includes: transmitting the network information obtaining request to a first target non-user plane node; and receiving network information of the first target non-user plane node returned by the first target non-user plane node in response to the network information obtaining request.

The first target non-user plane node in FIG. 19 may be, for example, an AMF or an SMF. When the target user plane node is UE or a RAN, the first target non-user plane node may be an AMF. When the target user plane node is a UPF, the first target non-user plane node may be an SMF. That is, the user plane node UE or RAN obtains network information provided by the AMF. In this case, the AMF does not need to interact with another NF to obtain network information. There is still another case. The target user plane node may obtain network information provided by the target user plane node itself. In this case, the UE/RAN does not need to interact with the AMF to obtain network information, and the UPF does not need to interact with the SMF to obtain network information.

In some embodiments, the obtaining the requested network information according to the network information obtaining request includes: transmitting the network information obtaining request to a first target non-user plane node, so that the first target non-user plane node transmits the network information obtaining request to a second target non-user plane node and receives network information of the second target non-user plane node returned by the second target non-user plane node in response to the network information obtaining request; and receiving network information of the second target non-user plane node returned by the first target non-user plane node.

In FIG. 19, the second target non-user plane node may be another non-user plane node other than the AMF and the SMF, for example, a control plane node, or may be the target NF in the foregoing embodiments. That is, the AMF may interact with the target NF to obtain the network information, or the SMF may interact with the target NF to obtain the network information and then provides the network information to the UE, the RAN or the UPF.

In some embodiments, the obtaining the requested network information according to the network information obtaining request may further include: receiving updated network information of the second target non-user plane node returned by the first target non-user plane node, the updated network information of the second target non-user plane node being transmitted by the second target non-user plane node to the first target non-user plane node if the network information of the second target non-user plane node is changed or reaches a predetermined time interval.

When the (E)AS requests the target user plane node to automatically return changed network information (that is, updated network information) to the (E)AS once every period of time or if the network information is changed, after a set time interval ends or the network information is changed, the target NF automatically transmits the updated network information to the AMF or SMF, so that the target user plane node provides the updated network information to the (E)AS.

Step S1822: Generate at least one Internet Control Message Protocol ECHO request packet if a length of the network information is greater than a first length, the first length being related to a length of a data area of an Internet Protocol option.

In some embodiments, the method may further include: respectively setting a source address and a destination address of the at least one Internet Control Message Protocol ECHO request packet as a destination address and a source address in the Internet Protocol five-tuple information of the downlink data packet; if the Internet Protocol five-tuple information of the downlink data packet includes a User Datagram Protocol or a Transmission Control Protocol destination port number, setting an identifier of the at least one Internet Control Message Protocol ECHO request packet as the User Datagram Protocol or the Transmission Control Protocol destination port number in the Internet Protocol five-tuple information of the downlink data packet; alternatively, if Internet Protocol five-tuple information of the downlink data packet does not includes a User Datagram Protocol or a Transmission Control Protocol destination port number, setting an identifier of the at least one Internet Control Message Protocol ECHO request packet as the identification field of the Internet Protocol header.

In some embodiments, if the length of the network information is greater than a second length, the at least one Internet Control Message Protocol ECHO request packet includes a plurality of Internet Control Message Protocol ECHO request packets, and sequence numbers of the plurality of Internet Control Message Protocol ECHO request packets start to sequentially increment from a random value. The second length is related to a length of a data area of an Internet Control Message Protocol ECHO request packet, and the second length is greater than the first length.

In some embodiments, the method may further include: generating the random value according to the Internet Protocol five-tuple information of the downlink data packet.

Step S1823: Write the network information in a data area of the at least one Internet Control Message Protocol ECHO request packet for generating the responsive information.

Figure 20:
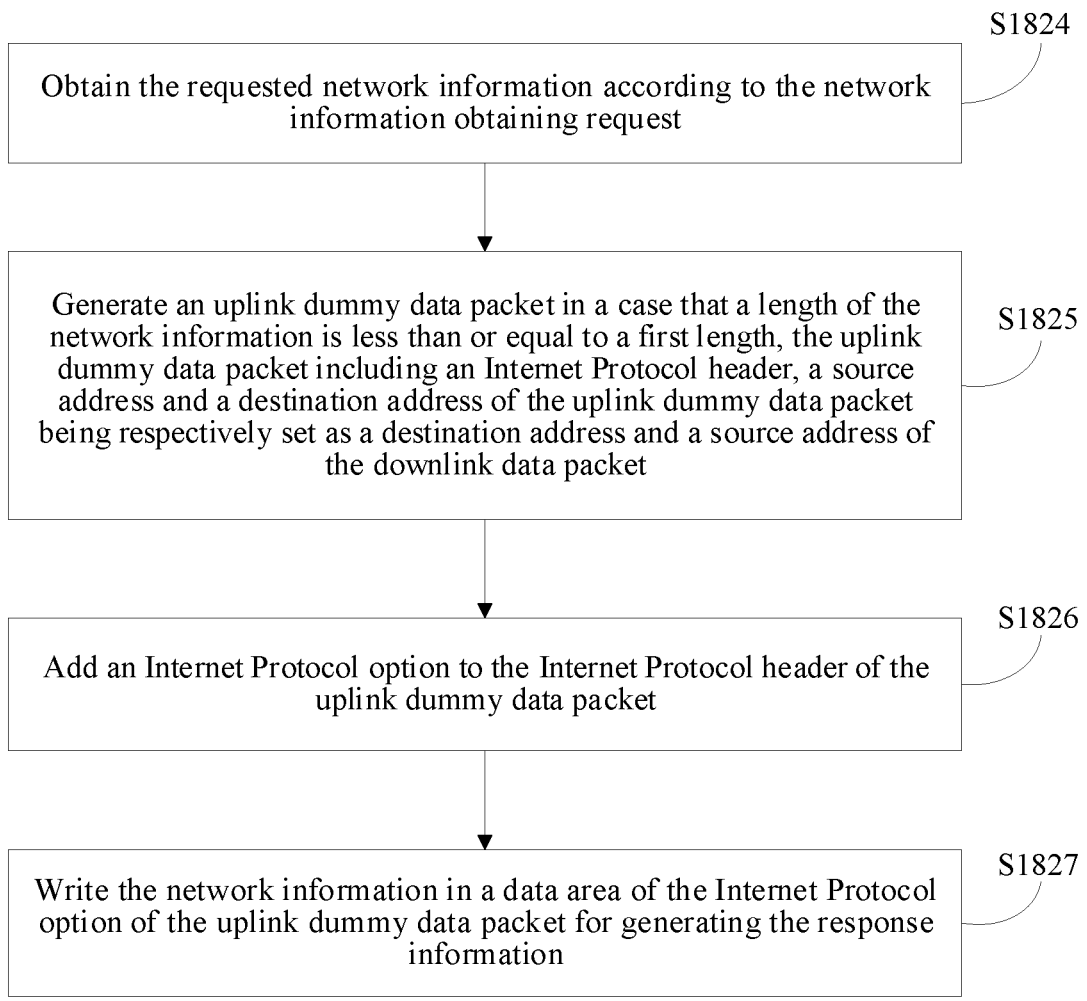
FIG. 20 is a schematic diagram of a processing process in an embodiment of step S182 in FIG. 18.

FIG. 20 is a schematic diagram of a processing process in an embodiment of step S182 in FIG. 18. As shown in FIG. 20, in the embodiments of this disclosure, the foregoing step S182 may further include the following steps:

Step S1824: Obtain the requested network information according to the network information obtaining request.

In some embodiments, the obtaining the requested network information according to the network information obtaining request includes: transmitting the network information obtaining request to a first target non-user plane node; and receiving network information of the first target non-user plane node returned by the first target non-user plane node in response to the network information obtaining request.

In some embodiments, the obtaining the requested network information according to the network information obtaining request includes: transmitting the network information obtaining request to a first target non-user plane node, so that the first target non-user plane node transmits the network information obtaining request to a second target non-user plane node and receives network information of the second target non-user plane node returned by the second target non-user plane node in response to the network information obtaining request; and receiving network information of the second target non-user plane node returned by the first target non-user plane node.

In some embodiments, the obtaining the requested network information according to the network information obtaining request may further include: receiving updated network information of the second target non-user plane node returned by the first target non-user plane node, the updated network information of the second target non-user plane node being transmitted by the second target non-user plane node to the first target non-user plane node if the network information of the second target non-user plane node is changed or reaches a predetermined time interval.

Step S1825: Generate an uplink dummy data packet if a length of the network information is less than or equal to a first length, the uplink dummy data packet including an Internet Protocol header, a source address and a destination address of the uplink dummy data packet being respectively set as a destination address and a source address of the downlink data packet.

Step S1826: Add an Internet Protocol option to the Internet Protocol header of the uplink dummy data packet.

Step S1827: Write the network information in a data area of the Internet Protocol option of the uplink dummy data packet for generating the responsive information.

Figure 21:
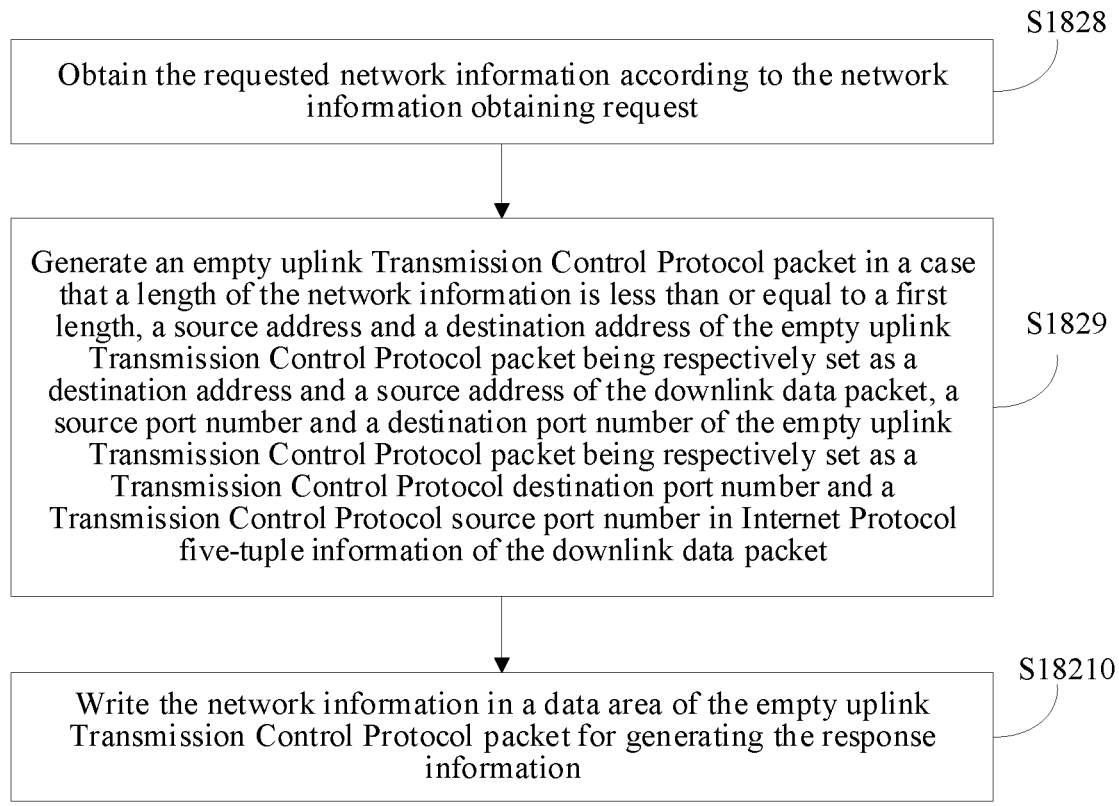
FIG. 21 is a schematic diagram of a processing process in an embodiment of step S182 in FIG. 18.

FIG. 21 is a schematic diagram of a processing process in an embodiment of step S182 in FIG. 18. As shown in FIG. 21, in the embodiments of this disclosure, the foregoing step S182 may further include the following steps:

Step S1828: Obtain the requested network information according to the network information obtaining request.

In some embodiments, the obtaining the requested network information according to the network information obtaining request includes: transmitting the network information obtaining request to a first target non-user plane node; and receiving network information of the first target non-user plane node returned by the first target non-user plane node in response to the network information obtaining request.

In some embodiments, the obtaining the requested network information according to the network information obtaining request includes: transmitting the network information obtaining request to a first target non-user plane node, so that the first target non-user plane node transmits the network information obtaining request to a second target non-user plane node and receives network information of the second target non-user plane node returned by the second target non-user plane node in response to the network information obtaining request; and receiving network information of the second target non-user plane node returned by the first target non-user plane node.

In some embodiments, the obtaining the requested network information according to the network information obtaining request may further include: receiving updated network information of the second target non-user plane node returned by the first target non-user plane node, the updated network information of the second target non-user plane node being transmitted by the second target non-user plane node to the first target non-user plane node if the network information of the second target non-user plane node is changed or reaches a predetermined time interval.

Step S1829: Generate an empty uplink Transmission Control Protocol packet if a length of the network information is less than or equal to a first length, a source address and a destination address of the empty uplink Transmission Control Protocol packet being respectively set as a destination address and a source address of the downlink data packet, a source port number and a destination port number of the empty uplink Transmission Control Protocol packet being respectively set as a Transmission Control Protocol destination port number and a Transmission Control Protocol source port number in Internet Protocol five-tuple information of the downlink data packet.

Step S18210: Write the network information in a data area of the empty uplink Transmission Control Protocol packet for generating the responsive information.

Figure 22:
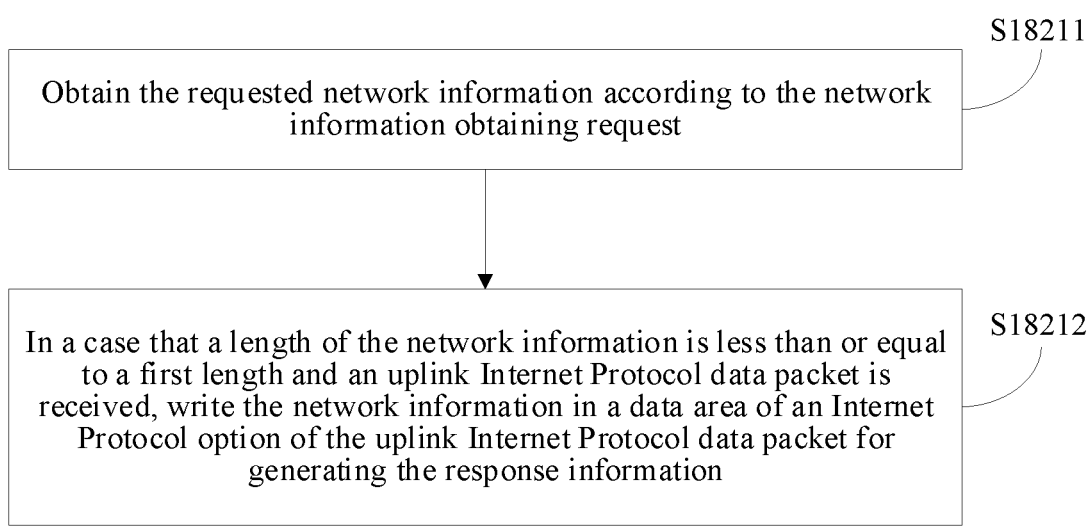
FIG. 22 is a schematic diagram of a processing process in an embodiment of step S182 in FIG. 18.

FIG. 22 is a schematic diagram of a processing process in an embodiment of step S182 in FIG. 18. As shown in FIG. 22, in the embodiments of this disclosure, the foregoing step S182 may further include the following steps:

Step S18211: Obtain the requested network information according to the network information obtaining request.

In some embodiments, the obtaining the requested network information according to the network information obtaining request includes: transmitting the network information obtaining request to a first target non-user plane node; and receiving network information of the first target non-user plane node returned by the first target non-user plane node in response to the network information obtaining request.

In some embodiments, the obtaining the requested network information according to the network information obtaining request includes: transmitting the network information obtaining request to a first target non-user plane node, so that the first target non-user plane node transmits the network information obtaining request to a second target non-user plane node and receives network information of the second target non-user plane node returned by the second target non-user plane node in response to the network information obtaining request; and receiving network information of the second target non-user plane node returned by the first target non-user plane node.

In some embodiments, the obtaining the requested network information according to the network information obtaining request may further include: receiving updated network information of the second target non-user plane node returned by the first target non-user plane node, the updated network information of the second target non-user plane node being transmitted by the second target non-user plane node to the first target non-user plane node if the network information of the second target non-user plane node is changed or reaches a predetermined time interval.

S18212: If a length of the network information is less than or equal to a first length and an uplink Internet Protocol data packet is received, write the network information in a data area of an Internet Protocol option of the uplink Internet Protocol data packet for generating the responsive information.

Figure 23:
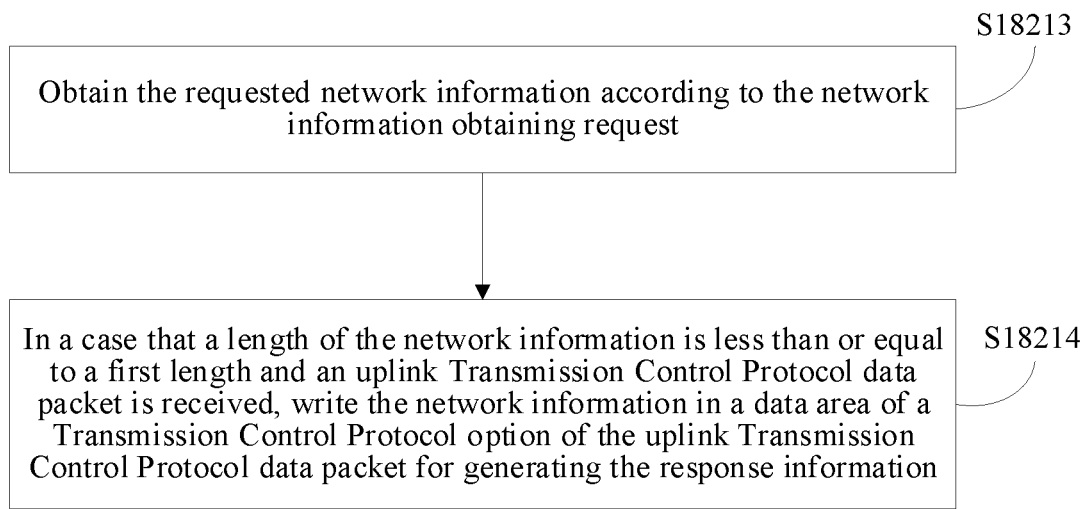
FIG. 23 is a schematic diagram of a processing process in an embodiment of step S182 in FIG. 18.

FIG. 23 is a schematic diagram of a processing process in an embodiment of step S182 in FIG. 18. As shown in FIG. 23, in the embodiments of this disclosure, the foregoing step S182 may further include the following steps:

Step S18213: Obtain the requested network information according to the network information obtaining request.

In some embodiments, the obtaining the requested network information according to the network information obtaining request includes: transmitting the network information obtaining request to a first target non-user plane node; and receiving network information of the first target non-user plane node returned by the first target non-user plane node in response to the network information obtaining request.

In some embodiments, the obtaining the requested network information according to the network information obtaining request includes: transmitting the network information obtaining request to a first target non-user plane node, so that the first target non-user plane node transmits the network information obtaining request to a second target non-user plane node and receives network information of the second target non-user plane node returned by the second target non-user plane node in response to the network information obtaining request; and receiving network information of the second target non-user plane node returned by the first target non-user plane node.

In some embodiments, the obtaining the requested network information according to the network information obtaining request may further include: receiving updated network information of the second target non-user plane node returned by the first target non-user plane node, the updated network information of the second target non-user plane node being transmitted by the second target non-user plane node to the first target non-user plane node if the network information of the second target non-user plane node is changed or reaches a predetermined time interval.

Step S18214: If a length of the network information is less than or equal to a first length and an uplink Transmission Control Protocol data packet is received, write the network information in a data area of a Transmission Control Protocol option of the uplink Transmission Control Protocol data packet for generating the responsive information.

For specific implementations of the foregoing FIG. 18 to FIG. 23, reference may be made to the content of the foregoing FIG. 7 to FIG. 17.

A maximum length of an IP option is 40 bytes, and is generally sufficient for an EAS or AS to transmit a control command to a target user plane node. If the UE/RAN/UPF provides network information to the EAS or AS, the length of 40 bytes may be insufficient. In this case, the first one or two bytes in the data of the IP option are defined as a current position of data, and the provided network data information is fragmented into a plurality of IP option packets (In this way, one IP option can only in fact transmit at most 36/37/38 bytes, that is, (40−1 (option-type)−1 (option-length)−0/1/2 (network data pointer)=38/37/36). In addition, because the IP cannot ensure that an arrival sequence and a transmission sequence of data packets are consistent, a receiver may use a network data pointer to implement recombination of data. However, if an IP packet in the middle is missing, the whole network data may fail to be recombined. In this case, the EAS or AS needs to retransmit the downlink data packet a command of the network information obtaining request.

When the EAS or AS transmits a control command to the UE/RAN/UPF or the UE/RAN/UPF transmits responsive information to the EAS/AS, in this case, if there is no downlink data or uplink data that may be transmitted, the EAS or AS or the UE/RAN/UPF keeps waiting until there is downlink data or uplink data. However, this method still encounters a problem that repeated transmission are demanded for relatively long uplink network data.

Similar to an IP header, a maximum length of a TCP option is 40 bytes, and is generally sufficient for an EAS or AS to transmit a control command to a target user plane node. If the UE/RAN/UPF provides network information to the EAS or AS, the length of 40 bytes may be insufficient. In this case, the first one or two bytes in the data of the TCP option are defined as a current position of data, and the provided network data information is fragmented into a plurality of TCP options packets (In this way, one TCP option can only in fact transmit at most 36 or 37 bytes, that is, (40−1 (option-type)−1 (option-length)−1/2(network data Pointer)=37/36). In addition, because the TCP protocol can implement sequential recombination of TCP packets, it can be indirectly ensured that a receiver sequentially receives the data of network capability exposure (a loss of a TCP packet in a transmission process is included, and a TCP option is better than an IP option in this aspect). However, this is only based on that one option is added to each existing TCP packet. When data of network capability exposure is relatively long, many TCP packets may be demanded, and the data may last a relatively long time.

In addition, an empty TCP packet of one ACK may be transmitted a plurality of times, and a part of data of network capability exposure is transmitted in each empty TCP packet. In this way, no problem is caused to a TCP connection. However, in some TCP protocol stacks, after empty TCP packets (that is, ACK numbers of TCP packets) are repeated three times, a transmission rate of transmission to a peer starts to be reduced (that is, the UE/RAN/UPF uses empty TCP ACK packets to continuously transmit data of network capability exposure to the EAS or ES), and the EAS/AS reduces a rate of transmitting actual TCP data packets to the UE, affecting experience for a user.

When the EAS or AS transmits a control command to the UE/RAN/UPF or the UE/RAN/UPF transmits responsive information to the EAS/AS, in this case, if there is no downlink data or uplink data that may be transmitted, the EAS or AS or the UE/RAN/UPF keeps waiting until there is downlink data or uplink data. However, there may be still no uplink or downlink data with a relatively long time. In this case, a dummy IP packet is generated, and an option of this dummy IP is used to transmit data related to network information. In this case, it is assumed that the dummy IP is actually an ICMP ECHO packet. ICMP ECHOes are transmitted (a plurality of times), and an identifier in an ECHO transmitted each time is set to a port number of UDP or TCP, and an SN is set to an incrementing sequence number. After receiving a corresponding ECHO reply, the UE/RAN/UPF performs comparison to determine whether an SN and an identifier of the received ECHO reply are the same as an SN and an identifier of the ECHO. If the SNs and the identifiers are the same, it indicates that the EAS/AS has received the ICMP message. In this case, option data in a dummy IP header is received. If the UE/RAN/UPF has not received the ECHO reply within a predetermined time, the ECHO is retransmitted and corresponding option data is included in the IP header.

However, the foregoing method still has low efficiency, because an IP option can only transmit content of 38 bytes each time. Because an ICMP ECHO may include data of 1472 bytes, it is proposed in the embodiments of this disclosure to transmit the network data as a data part in the ECHO. The transmission efficiency at this time is far higher than a method of an option that can transmit only 38 bytes each time. A method of ID+SN and SN+1 each time may be applied at the same time to implement repeated ECHO transmission: If an ECHO reply is not received within a particular time (ID+SN are compared to determine whether the ECHO reply is received), the ECHO is retransmitted (during retransmission, an ID+SN value is an ID+SN value of the retransmitted ECHO packet), thereby implementing reliable and sequential transmission of network data information. Because an SN of a new ECHO packet each time is added by 1, the receiver may receive a sequence of data according to SNs.

In summary, when the length of the network information (a MAC after integrity protection further needs to be included) does not exceed 38 bytes, a method of an IP option and a TCP option is selected. When the length of the network data information exceeds 38 bytes and is less than 1472 bytes, a method of an ICMP ECHO and reply is run once. When the length of the network data information exceeds 1472 bytes, a method of an ICMP Request and a reply with incrementing SNs may be run repeatedly to implement reliable and sequential transmission of the network data information.

The method provided in the embodiments of this disclosure uses a user plane to implement network capability exposure. Basically, all current Internet applications and various applications use the IP and TCP protocols. Therefore, an option extended header of an IP or TCP header is used to transmit a request and a response of network capability exposure and subscription and report data. For example, an empty TCP ACK packet is fully utilized or an IP dummy packet is generated to transmit an option extended header, so that fragmentation caused by an increased length of an IP data packet due to the introduction of an option header can be avoided.

For example, an advantage that an uplink data packet is relatively short and a downlink data packet is relatively long during actual data transmission is fully utilized to implement the upload of more data of network capability exposure to the EAS or AS. A packet transmitted by UE is referred to as an uplink data packet. Generally, there are fewer uplink data packets than downlink data packets. Uplink data packets are mostly empty ACK packets, and only a few uplink data packets carry actual data. For example, a user of UE requests a film resource on an EAS or AS. The EAS or AS needs to deliver a downlink data packet of 1 GB. In this case, it is assumed that there are 200,000 corresponding uplink data packets. Only 1000 uplink data packets carry actual data, and the rest are all ACK packets. In this case, when an option part of a UL data packet is used to transmit network information, if a UL data packet carries actual data, it is only necessary to skip the UL data packet, and the transmission of the network information is generally not affected. In addition, because a downlink data packet is generally relatively long, and a downlink data packet is transmitted by the EAS or AS to the UE. If some bytes of the downlink data packet are occupied after option data is added, the EAS or AS may automatically pack the option data in more downlink data packets. However, after the UPF or RAN receives the downlink data packet delivered by the EAS or AS, only a small amount of data can be encapsulated outside, and downlink data packets delivered by the EAS or AS cannot be discarded, and it cannot be redetermined to transmit the option data in several separate packets.

In the method for implementing network capability exposure provided in the embodiments of this disclosure, in one aspect, a user plane is used to implement the function of network capability exposure, so that the real-time performance is high, a large amount of network data is transmitted, and a large amount of network signaling is not caused. In another aspect, network capability exposure is implemented based on the IP, TCP, and ICMP, which are all basic protocols supported by all applications and networks at present. In particular, reliable and ordered transmission of massive network data information can be implemented by using the ICMP. In addition, network capability exposure does not require a dedicated control plane interface (an interface between an AF and a NEF and an interface between an (E)AS and an AF) between the EAS or AS and a network, and an IP transmission path during communication is naturally utilized to implement the exchange and transmission of data (network information) of network capability exposure. The method provided in the embodiments of this disclosure is an in-band technology, thereby reducing the difficulty and challenge of associating network capability exposure data, that is, network information with the (E)AS, especially the UE, during out-of-band capability exposure.

The method for implementing network capability exposure proposed in the embodiments of this disclosure is applicable to MEC and is also applicable to 2G, 3G, 4G, and 5G networks, proposes an IP implementation, a TCP implementation, and an ICMP implementation, and provides a selection method for each implementation. Manners of implementing network capability exposure by using UE, a RAN, and a UPF are provided, to support network capability exposure in different cases.

Figure 24:
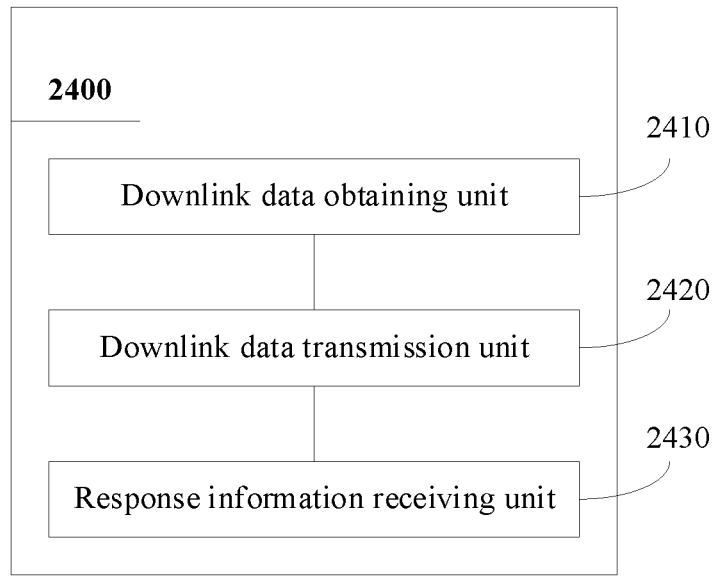
FIG. 24 is a block diagram of an apparatus for implementing network capability exposure according to an embodiment of this disclosure.

FIG. 24 is a block diagram of an apparatus for implementing network capability exposure according to an embodiment of this disclosure. As shown in FIG. 24, the apparatus 2400 for implementing network capability exposure provided in the embodiments of this disclosure includes a downlink data obtaining unit 2410, a downlink data transmission unit 2420, and a responsive information receiving unit 2430.

The downlink data obtaining unit 2410 is configured to obtain a downlink data packet, the downlink data packet including a network information obtaining request. The downlink data transmission unit 2420 is configured to transmit the downlink data packet to a target user plane node. The responsive information receiving unit 2430 is configured to receive responsive information returned by the target user plane node in response to the network information obtaining request, the responsive information including network information requested by the network information obtaining request.

In some embodiments, the downlink data obtaining unit 2410 includes: a unit for obtaining first to-be-transmitted downlink data, configured to obtain first to-be-transmitted downlink data, the first to-be-transmitted downlink data including an Internet Protocol header; a first unit for adding an Internet Protocol option, configured to add an Internet Protocol option to the Internet Protocol header of the first to-be-transmitted downlink data; and a first unit for writing Internet Protocol data, configured to write the network information obtaining request in a data area of the Internet Protocol option of the first to-be-transmitted downlink data for generating the downlink data packet.

In some embodiments, the downlink data obtaining unit 2410 includes: a unit for obtaining second to-be-transmitted downlink data, configured to obtain second to-be-transmitted downlink data, the second to-be-transmitted downlink data including a Transmission Control Protocol header; a second unit for adding Transmission Control Protocol option, configured to add a Transmission Control Protocol option to the Transmission Control Protocol header of the second to-be-transmitted downlink data; and a second unit for writing Transmission Control Protocol data, configured to write the network information obtaining request in a data area of the Transmission Control Protocol option of the second to-be-transmitted downlink data for generating the downlink data packet.

In some embodiments, the downlink data obtaining unit 2410 includes: a unit for generating a downlink dummy data packet, configured to generate a downlink dummy data packet, the downlink dummy data packet including an Internet Protocol header; a unit for adding an Internet Protocol option of a downlink dummy data packet, configured to add an Internet Protocol option to the Internet Protocol header of the downlink dummy data packet; and a unit for writing option data of a downlink dummy data packet, configured to write the network information obtaining request in a data area of the Internet Protocol option of the downlink dummy data packet for generating the downlink data packet.

In some embodiments, the target user plane node may include any one of a user plane gateway, a base station or a terminal.

In some embodiments, when the target user plane node is a terminal and the terminal returns the responsive information by using a data area of an Internet Control Message Protocol ECHO request packet, the apparatus 2400 for implementing network capability exposure further includes: a unit for switching a target user plane node, configured to: if it is detected that a length of the network information in the responsive information returned by the terminal exceeds a preset threshold, switch to using a user plane gateway or a base station to return the network information requested by the network information obtaining request.

Figure 25:
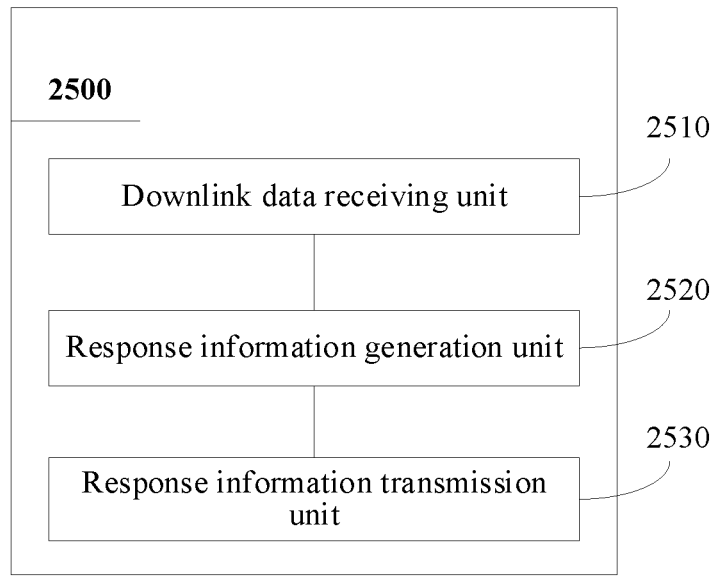
FIG. 25 is a block diagram of an apparatus for implementing network capability exposure according to an embodiment of this disclosure.

FIG. 25 is a block diagram of an apparatus for implementing network capability exposure according to an embodiment of this disclosure. As shown in FIG. 25, the apparatus 2500 for implementing network capability exposure provided in the embodiments of this disclosure includes a downlink data receiving unit 2510, a responsive information generation unit 2520, and a responsive information transmission unit 2530.

The downlink data receiving unit 2510 is configured to receive a downlink data packet transmitted by an application server, the downlink data packet including a network information obtaining request. The responsive information generation unit 2520 is configured to generate responsive information in response to the network information obtaining request, the responsive information including network information requested by the network information obtaining request. The responsive information transmission unit 2530 is configured to transmit the responsive information to the application server.

In some embodiments, the apparatus 2500 for implementing network capability exposure further includes a five-tuple information recording unit, configured to record Internet Protocol five-tuple information of the downlink data packet and an identification field of an Internet Protocol header of the downlink data packet.

In some embodiments, the responsive information generation unit 2520 includes: a network information obtaining unit, configured to obtain the requested network information according to the network information obtaining request; a unit for generating an Internet Control Message Protocol ECHO request packet, configured to generate at least one Internet Control Message Protocol ECHO request packet if a length of the network information is greater than a first length, the first length being related to a length of a data area of an Internet Protocol option; and a unit for writing data of an Internet Control Message Protocol ECHO request packet, configured to write the network information in a data area of the at least one Internet Control Message Protocol ECHO request packet for generating the responsive information.

In some embodiments, the apparatus 2500 for implementing network capability exposure includes: an address setting unit for an Internet Control Message Protocol ECHO request packet, configured to respectively set a source address and a destination address of the at least one Internet Control Message Protocol ECHO request packet as a destination address and a source address in the Internet Protocol five-tuple information of the downlink data packet; and a first identifier setting unit, configured to: if the Internet Protocol five-tuple information of the downlink data packet includes a User Datagram Protocol or a Transmission Control Protocol destination port number, set an identifier of the at least one Internet Control Message Protocol ECHO request packet as the User Datagram Protocol or the Transmission Control Protocol destination port number in the Internet Protocol five-tuple information of the downlink data packet; or a second identifier setting unit, configured to: if the Internet Protocol five-tuple information of the downlink data packet does not includes a User Datagram Protocol or a Transmission Control Protocol destination port number, set an identifier of the at least one Internet Control Message Protocol ECHO request packet as the identification field of the Internet Protocol header.

In some embodiments, if the length of the network information is greater than a second length, the at least one Internet Control Message Protocol ECHO request packet includes a plurality of Internet Control Message Protocol ECHO request packets, and sequence numbers of the plurality of Internet Control Message Protocol ECHO request packets start to sequentially increment from a random value; and the second length is related to a length of a data area of an Internet Control Message Protocol ECHO request packet, and the second length is greater than the first length.

In some embodiments, the apparatus 2500 for implementing network capability exposure further includes: a random value generation unit, configured to generate the random value according to the Internet Protocol five-tuple information of the downlink data packet.

In some embodiments, the responsive information generation unit 2520 includes: a network information obtaining unit, configured to obtain the requested network information according to the network information obtaining request; a unit for generating an uplink dummy data packet, configured to generate an uplink dummy data packet if a length of the network information is less than or equal to a first length, the uplink dummy data packet including an Internet Protocol header, a source address and a destination address of the uplink dummy data packet being respectively set as a destination address and a source address of the downlink data packet; a unit for adding an uplink dummy data packet Internet Protocol option, configured to add an Internet Protocol option to the Internet Protocol header of the uplink dummy data packet; and a unit for writing an Internet Protocol option of an uplink dummy data packet, configured to write the network information in a data area of the Internet Protocol option of the uplink dummy data packet for generating the responsive information.

In some embodiments, the responsive information generation unit 2520 includes: a network information obtaining unit, configured to obtain the requested network information according to the network information obtaining request; a unit for generating an empty uplink Transmission Control Protocol packet, configured to generate an empty uplink Transmission Control Protocol packet if a length of the network information is less than or equal to a first length, a source address and a destination address of the empty uplink Transmission Control Protocol packet being respectively set as a destination address and a source address of the downlink data packet, a source port number and a destination port number of the empty uplink Transmission Control Protocol packet being respectively set as a Transmission Control Protocol destination port number and a Transmission Control Protocol source port number in Internet Protocol five-tuple information of the downlink data packet; and a data writing unit for an empty uplink Transmission Control Protocol packet, configured to write the network information in a data area of the empty uplink Transmission Control Protocol packet for generating the responsive information.

In some embodiments, the responsive information generation unit 2520 includes: a network information obtaining unit, configured to obtain the requested network information according to the network information obtaining request; and a data writing unit for an uplink Internet Protocol data packet, configured to: if a length of the network information is less than or equal to a first length and an uplink Internet Protocol data packet is received, write the network information in a data area of an Internet Protocol option of the uplink Internet Protocol data packet for generating the responsive information.

In some embodiments, the responsive information generation unit 2520 includes: a network information obtaining unit, configured to obtain the requested network information according to the network information obtaining request; and a unit for writing option data of an uplink Transmission Control Protocol data packet, configured to: if a length of the network information is less than or equal to a first length and an uplink Transmission Control Protocol data packet is received, write the network information in a data area of a Transmission Control Protocol option of the uplink Transmission Control Protocol data packet for generating the responsive information.

In some embodiments, the network information obtaining unit includes: a first unit for forwarding a network information obtaining request, configured to transmit the network information obtaining request to a first target non-user plane node; and a first unit for receiving a network information response, configured to receive network information of the first target non-user plane node returned by the first target non-user plane node in response to the network information obtaining request.

In some embodiments, the network information obtaining unit includes: a second unit for forwarding a network information obtaining request, configured to transmit the network information obtaining request to a first target non-user plane node, so that the first target non-user plane node transmits the network information obtaining request to a second target non-user plane node and receives network information of the second target non-user plane node returned by the second target non-user plane node in response to the network information obtaining request; and a second unit for receiving a network information response, configured to receive network information of the second target non-user plane node returned by the first target non-user plane node.

In some embodiments, the network information obtaining unit includes: a unit for receiving updated network information, configured to receive updated network information of the second target non-user plane node returned by the first target non-user plane node, the updated network information of the second target non-user plane node being transmitted by the second target non-user plane node to the first target non-user plane node if the network information of the second target non-user plane node is changed or reaches a predetermined time interval.

For specific implementation of various units in the apparatus for implementing network capability exposure provided in the embodiments of this disclosure, reference may be made to the foregoing content in the method for implementing network capability exposure. Details are not described herein again.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Although a plurality of units of a device configured to perform actions are discussed in the foregoing detailed description, such division is not mandatory. In fact, according to the implementations of this disclosure, the features and functions of two or more units described above may be embodied in one unit. On the contrary, the features and functions of one unit described above may be further divided into a plurality of units to be specified.

According to the foregoing descriptions of the implementations, a person skilled in the art may readily understand that the exemplary implementations described herein may be implemented by using software, or may be implemented by combining software and necessary hardware. Therefore, the technical solutions of the embodiments of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this disclosure.

What is claimed is:

1. A method for implementing network capability exposure, comprising:
obtaining first to-be-transmitted downlink data, the first to-be-transmitted downlink data comprising an Internet Protocol header or a Transmission Control Protocol header;
adding an Internet Protocol option to the Internet Protocol header or a Transmission Control Protocol option to the Transmission Control Protocol header of the first to-be-transmitted downlink data:
writing a network information obtaining request in a data area of the Internet Protocol option or the Transmission Control Protocol option of the first to-be-transmitted downlink data for generating a downlink data packet, the downlink data packet comprising a network information obtaining request;
transmitting the downlink data packet to a target user plane node; and
receiving responsive information returned by the target user plane node in response to the network information obtaining request, the responsive information comprising network information requested by the network information obtaining request.

2. The method according to claim 1, wherein obtaining the downlink data packet comprises:
- generating a downlink dummy data packet, the downlink dummy data packet comprising an Internet Protocol header;
- adding an Internet Protocol option to the Internet Protocol header of the downlink dummy data packet; and
- writing the network information obtaining request in a data area of the Internet Protocol option of the downlink dummy data packet for generating the downlink data packet.

3. The method according to claim 1, wherein the target user plane node comprises any one of a user plane gateway, a base station, or a terminal.

4. The method according to claim 1, wherein when the target user plane node is a terminal and the terminal returns the responsive information by using a data area of an Internet Control Message Protocol ECHO request packet, the method further comprises:
- when it is detected that a length of the network information in the responsive information returned by the terminal exceeds a preset threshold, switching to using a user plane gateway or a base station to return the network information requested by the network information obtaining request.

5. A non-transitory computer-readable storage medium, storing a computer program, the computer program being executed by a processor to perform the method of claim 1.

6. A method for implementing network capability exposure, performed by an electronic device, the method comprising:
- receiving a downlink data packet transmitted by an application server, the downlink data packet comprising a network information obtaining request;
- obtaining requested network information according to the network information obtaining request;
- generating an uplink dummy data packet when a length of the requested network information is less than or equal to a first length, the uplink dummy data packet comprising an Internet Protocol header, a source address and a destination address of the uplink dummy data packet being respectively set as a destination address and a source address of the downlink data packet;
- adding an Internet Protocol option to the Internet Protocol header of the uplink dummy data packet;
- writing the requested network information in a data area of the Internet Protocol option of the uplink dummy data packet for generating responsive information to the network information obtaining request;
- transmitting the responsive information to the application server; and
- recording Internet Protocol five-tuple information of the downlink data packet and an identification field of an Internet Protocol header of the downlink data packet.

7. The method according to claim 6, wherein generating the responsive information in response to the network information obtaining request comprises:
- obtaining the requested network information according to the network information obtaining request;
- generating an empty uplink Transmission Control Protocol packet when a length of the network information is less than or equal to a first length, a source address and a destination address of the empty uplink Transmission Control Protocol packet being respectively set as a destination address and a source address of the downlink data packet, a source port number and a destination port number of the empty uplink Transmission Control Protocol packet being respectively set as a Transmission Control Protocol destination port number and a Transmission Control Protocol source port number in Internet Protocol five-tuple information of the downlink data packet; and
- writing the network information in a data area of the empty uplink Transmission Control Protocol packet for generating the responsive information.

8. The method according to claim 6, wherein generating the responsive information in response to the network information obtaining request comprises:
- obtaining the requested network information according to the network information obtaining request; and
- writing the network information in a data area of an Internet Protocol option of an uplink Internet Protocol data packet for generating the responsive information, when a length of the network information is less than or equal to a first length and the uplink Internet Protocol data packet is received, or
- writing the network information in a data area of a Transmission Control Protocol option of an uplink Transmission Control Protocol data packet for generating the responsive information, when the length of the network information is less than or equal to the first length and an uplink Transmission Control Protocol data packet is received.

9. The method according to claim 6, wherein generating the responsive information in response to the network information obtaining request comprises:
- obtaining the requested network information according to the network information obtaining request;
- generating at least one Internet Control Message Protocol ECHO request packet when a length of the network information is greater than a first length, the first length being related to a length of a data area of an Internet Protocol option; and
- writing the network information in a data area of the at least one Internet Control Message Protocol ECHO request packet for generating the responsive information.

10. The method according to claim 9, wherein the method further comprises:
- respectively setting a source address and a destination address of the at least one Internet Control Message Protocol ECHO request packet as a destination address and a source address in the Internet Protocol five-tuple information of the downlink data packet; and
- when the Internet Protocol five-tuple information of the downlink data packet comprises a User Datagram Protocol or a Transmission Control Protocol destination port number, setting an identifier of the at least one Internet Control Message Protocol ECHO request packet as the User Datagram Protocol or the Transmission Control Protocol destination port number in the Internet Protocol five-tuple information of the downlink data packet; or
- when the Internet Protocol five-tuple information of the downlink data packet does not comprise a User Datagram Protocol or a Transmission Control Protocol destination port number, setting an identifier of the at least one Internet Control Message Protocol ECHO request packet as the identification field of the Internet Protocol header.

11. The method according to claim 9, wherein when the length of the network information is greater than a second length, the at least one Internet Control Message Protocol ECHO request packet comprises a plurality of Internet Control Message Protocol ECHO request packets, and sequence numbers of the plurality of Internet Control Message Protocol ECHO request packets start to sequentially increment from a random value wherein the second length is related to a length of a data area of an Internet Control Message Protocol ECHO request packet, and the second length is greater than the first length.

12. The method according to claim 11, wherein the method further comprises:
generating the random value according to an Internet Protocol five-tuple information of the downlink data packet.

13. The method according to claim 6, wherein obtaining the requested network information according to the network information obtaining request comprises:
transmitting the network information obtaining request to a first target non-user plane node; and
receiving network information of the first target non-user plane node returned by the first target non-user plane node in response to the network information obtaining request.

14. The method according to claim 6, wherein obtaining the requested network information according to the network information obtaining request comprises:
transmitting the network information obtaining request to a first target non-user plane node, so that the first target non-user plane node transmits the network information obtaining request to a second target non-user plane node and receives network information of the second target non-user plane node returned by the second target non-user plane node in response to the network information obtaining request; and
receiving network information of the second target non-user plane node returned by the first target non-user plane node.

15. The method according to claim 14, wherein the method further comprises:
receiving updated network information of the second target non-user plane node returned by the first target non-user plane node, the updated network information of the second target non-user plane node being transmitted by the second target non-user plane node to the first target non-user plane node when the network information of the second target non-user plane node is changed or reaches a predetermined time interval.

16. An electronic device, comprising:
one or more processors; and
a storage apparatus, configured to store one or more programs, the one or more programs, when executed by the one or more processors, causing the one or more processors to perform the method of claim 6.

17. An electronic device, comprising:
one or more processors; and
a storage apparatus, configured to store one or more programs, the one or more programs, when executed by the one or more processors, causing the one or more processors to:
obtaining first to-be-transmitted downlink data, the first to-be-transmitted downlink data comprising an Internet Protocol header or a Transmission Control Protocol header;
adding an Internet Protocol option to the Internet Protocol header or a Transmission Control Protocol option to the Transmission Control Protocol header of the first to-be-transmitted downlink data;
writing a network information obtaining request in a data area of the Internet Protocol option or the Transmission Control Protocol option of the first to-be-transmitted downlink data for generating a downlink data packet, the downlink data packet comprising a network information obtaining request;
transmitting the downlink data packet to a target user plane node; and
receiving responsive information returned by the target user plane node in response to the network information obtaining request, the responsive information comprising network information requested by the network information obtaining request.

\* \* \* \* \*